(12) United States Patent
Yamashita et al.

(10) Patent No.: US 9,953,562 B2
(45) Date of Patent: Apr. 24, 2018

(54) SIGNAL PROCESSING DEVICE, SIGNAL PROCESSING METHOD, PROGRAM, AND ELECTRONIC APPARATUS

(71) Applicant: JOLED Inc., Tokyo (JP)

(72) Inventors: Junichi Yamashita, Tokyo (JP); Katsuhide Uchino, Kanagawa (JP); Yuki Seo, Kanagawa (JP)

(73) Assignee: JOLED Inc., Tokyo (JP)

( * ) Notice: Subject to any disclaimer, the term of this patent is extended or adjusted under 35 U.S.C. 154(b) by 440 days.

(21) Appl. No.: 14/351,746

(22) PCT Filed: Nov. 8, 2012

(86) PCT No.: PCT/JP2012/078917
§ 371 (c)(1),
(2) Date: Apr. 14, 2014

(87) PCT Pub. No.: WO2013/073438
PCT Pub. Date: May 23, 2013

(65) Prior Publication Data
US 2014/0267465 A1    Sep. 18, 2014

(30) Foreign Application Priority Data

Nov. 16, 2011   (JP) ................. 2011-250638
Nov. 16, 2011   (JP) ................. 2011-250639
(Continued)

(51) Int. Cl.
*G09G 3/3233*    (2016.01)
*G09G 3/30*      (2006.01)
(Continued)

(52) U.S. Cl.
CPC .............. *G09G 3/30* (2013.01); *G09G 3/3225* (2013.01); *G09G 3/3233* (2013.01); *H04N 5/70* (2013.01);
(Continued)

(58) Field of Classification Search
CPC .......... G09G 3/3233; G09G 5/10; G09G 3/30; G09G 3/3225; G09G 2300/0819;
(Continued)

(56) References Cited

U.S. PATENT DOCUMENTS

2005/0156867 A1    7/2005  Edelbrock
2009/0091559 A1*   4/2009  Smith ................. G09G 3/3216
                                                         345/205

(Continued)

FOREIGN PATENT DOCUMENTS

CN           1623180 A    6/2005
CN         101739956 A    6/2010
(Continued)

OTHER PUBLICATIONS

Chinese Office Actions dated Oct. 10, 2015 for corresponding Chinese Application No. 201280061078.3.
(Continued)

*Primary Examiner* — Premal Patel
(74) *Attorney, Agent, or Firm* — Michael Best & Friedrich LLP

(57) ABSTRACT

Provided is a signal processing device including a signal synthesis unit that generates a first synthesis signal configured from an image signal to cause a first light emitting element used for displaying an image to emit light and a dummy pixel signal to cause a second light emitting element used for measuring brightness to emit light, a conversion unit that converts the generated first synthesis signal into a second synthesis signal to cause only the first light emitting (Continued)

element of the first light emitting element and the second light emitting element to emit light at identical brightness, regardless of a degradation degree of the first light emitting element, and a light emission control unit that causes the first light emitting element and the second light emitting element to emit light, on a basis of the second synthesis signal.

8 Claims, 52 Drawing Sheets

(30) Foreign Application Priority Data

Nov. 16, 2011 (JP) ................................ 2011-250640
Nov. 16, 2011 (JP) ................................ 2011-250641
Nov. 16, 2011 (JP) ................................ 2011-250642

(51) Int. Cl.
*H04N 5/70* (2006.01)
*G09G 3/3225* (2016.01)

(52) U.S. Cl.
CPC .............. *G09G 2300/0819* (2013.01); *G09G 2320/029* (2013.01); *G09G 2320/045* (2013.01); *G09G 2320/046* (2013.01); *G09G 2360/145* (2013.01)

(58) Field of Classification Search
CPC ....... G09G 2320/029; G09G 2320/045; G09G 2320/046; G09G 2360/145; H04N 5/70
USPC .................................................. 345/207, 690
See application file for complete search history.

(56) References Cited

U.S. PATENT DOCUMENTS

| | | | | |
|---|---|---|---|---|
| 2010/0265228 A1* | 10/2010 | Kimura | ................ | G09G 3/3233 345/207 |
| 2011/0080437 A1* | 4/2011 | Yamashita | ........... | G09G 3/3233 345/690 |
| 2011/0102622 A1* | 5/2011 | Ebihara | ................ | H04N 5/3456 348/222.1 |
| 2011/0115952 A1* | 5/2011 | Watanabe | ............ | H04N 5/3595 348/243 |
| 2011/0248975 A1* | 10/2011 | Takuma | ............... | G09G 3/3225 345/207 |
| 2012/0147029 A1* | 6/2012 | Aragaki | ............... | H04N 9/3105 345/589 |

FOREIGN PATENT DOCUMENTS

| | | |
|---|---|---|
| JP | 2001-195026 A | 7/2001 |
| JP | 2003-255856 A | 9/2003 |
| JP | 2003-271095 A | 9/2003 |
| JP | 2004-029791 A | 1/2004 |
| JP | 2004-093682 A | 3/2004 |
| JP | 2004-133240 A | 4/2004 |
| JP | 2005-181967 | 7/2005 |
| JP | 2007-240798 A | 9/2007 |
| JP | 2007-240803 A | 9/2007 |
| JP | 2009-075320 | 4/2009 |
| JP | 2010-139837 | 6/2010 |
| JP | 2010-250171 A | 11/2010 |
| JP | 2011-209369 A | 10/2011 |
| KR | 2010-012247 A | 2/2010 |

OTHER PUBLICATIONS

International Search Report; International Application No. PCT/JP2012/078917: dated Nov. 8, 2012. (Form PCT/ISA/210).
Written Opinion of the International Searching Authority; International Application No. PCT/2012/078917; dated Feb. 12, 2013. (Form PCT/ISA/220 and PCT/ISA/237).
Japanese Office Action for Application No. 2013-544231 dated Apr. 20, 2016.
Korean Office Action for Application No. 10-2014-7009791 dated Jun. 22, 2016.

* cited by examiner

FIG. 4
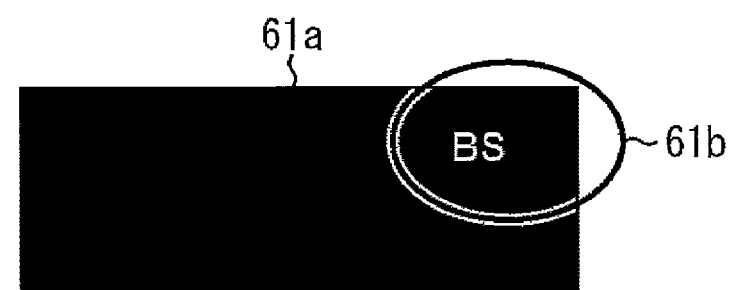
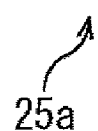

SIGNAL PROCESSING DEVICE, SIGNAL PROCESSING METHOD, PROGRAM, AND ELECTRONIC APPARATUS

TECHNICAL FIELD

The present invention relates to a signal processing device, a signal processing method, a program, and an electronic apparatus and more particularly, to a signal processing device, a signal processing method, a program, and an electronic apparatus that can prevent burn-in from arising at a display screen.

BACKGROUND ART

Recently, a flat self-luminous panel (EL panel) using an organic electro luminescent (EL) element as a light emitting element has been developed. The organic EL element is a light emitting element that has a diode characteristic and uses the phenomenon of emitting light when an electric field is applied to an organic thin film. The organic EL element consumes low power because the organic EL element is driven with an application voltage of 10 V or less and is a self-luminous element that emits light by itself. Therefore, weight and thickness of the organic EL element are easily decreased without requiring an illumination member. In addition, because a response speed of the organic EL element is very high as about several μs, a residual image at the time of displaying a moving image is not generated in the EL panel.

Among flat self-luminous panels using an organic EL device in a pixel, an active matrix type panel in which a thin film transistor is integrated as a driving element into each pixel has been developed in particular. For example, the active matrix type panel is described in the following Patent Literatures 1 to 5.

CITATION LIST

Patent Literature

Patent Literature 1: JP 2003-255856A
Patent Literature 2: JP 2003-271095A
Patent Literature 3: JP 2004-133240A
Patent Literature 4: JP 2004-029791A
Patent Literature 5: JP 2004-093682A

SUMMARY OF INVENTION

Technical Problem

However, in the organic EL element, brightness efficiency decreases in proportional to a light emission amount and a light emission time. Because light emission brightness of the organic EL element is represented by a product of a current value and the brightness efficiency, the decrease in the brightness efficiency leads to the decrease in the light emission brightness. A display image in which uniform display is performed in each pixel is rare as a display image displayed on a display screen and a light emission amount is different for each pixel in a general display image.

Therefore, a decrease degree of the light emission brightness in each pixel is different under the same driving condition, due to differences of the past light emission amounts and light emission times, and the phenomenon of a variation of the brightness decrease being visually recognized arises. The phenomenon of the variation of the brightness decrease being visually recognized is referred to as the burn-in phenomenon.

Therefore, in the EL panel according to the related art, a burn-in correction process for causing the organic EL element to emit light at the light emission brightness before the brightness decreases and preventing the burn-in phenomenon from arising is executed.

That is, for example, the EL panel has an organic EL element (hereinafter, referred to as the organic EL element for display) and an organic EL element (hereinafter, referred to as the organic EL element for measurement) built therein, the organic EL element for display emitting light for display of the display image, the organic EL element for measurement emitting light for measurement of the brightness decrease.

The EL panel estimates a brightness degradation characteristic showing the decrease degree of the light emission brightness of the organic EL element, on the basis of a measurement result obtained by measuring the brightness of the organic EL element for the measurement.

In addition, the EL panel executes a burn-in correction process for causing the organic EL element for the display and the organic EL element for the measurement to emit light at the light emission brightness before the decrease, on the basis of the estimated brightness degradation characteristic.

Thereby, both the organic EL element for the display and the organic EL element for the measurement emit light at the light emission brightness before the decrease.

However, in the EL panel according to the related art, because the organic EL element for the measurement emits light at the light emission brightness before the decrease, the brightness degradation characteristic may not be accurately estimated from a measurement result obtained from the EL element for the measurement. In this case, in the burn-in correction process, the burn-in phenomenon cannot be prevented from arising.

The present invention has been made in view of the above-described circumstances and prevents burn-in from arising at a display screen.

Solution to Problem

According to a first embodiment of the present disclosure, there is provided a signal processing device including a signal synthesis unit that generates a first synthesis signal configured from an image signal to cause a first light emitting element used for displaying an image to emit light and a dummy pixel signal to cause a second light emitting element used for measuring brightness to emit light, a conversion unit that converts the generated first synthesis signal into a second synthesis signal to cause only the first light emitting element of the first light emitting element and the second light emitting element to emit light at identical brightness, regardless of a degradation degree of the first light emitting element, and a light emission control unit that causes the first light emitting element and the second light emitting element to emit light, on a basis of the second synthesis signal.

The conversion unit may convert the first synthesis signal into the second synthesis signal, on a basis of a measurement result of brightness by a measurement unit to measure brightness of the second light emitting element.

The conversion unit may correct the image signal included in the first synthesis signal to an image signal to cause the first light emitting element to emit light at identical brightness, regardless of the degradation degree of the first light emitting element, and convert the first synthesis signal into the second synthesis signal including the image signal after correction.

The conversion unit further may correct the dummy pixel signal included in the first synthesis signal to an identical dummy pixel signal with the dummy pixel signal included in the first synthesis signal, and convert the first synthesis signal into the second synthesis signal.

The signal processing device may further include a display unit that includes a display screen to display an image and has the first light emitting element, the second light emitting element, and the measurement unit built therein. The light emission control unit may cause the first light emitting element to emit light, on a basis of the image signal included in the second synthesis signal, and display an image on the display screen. The light emission control unit may cause the second light emitting element to emit light, on a basis of the dummy pixel signal included in the second synthesis signal, and cause the measurement unit to measure brightness.

According to the first embodiment of the present disclosure, there is provided a signal processing method of a signal processing device to process a signal, the signal processing method including a signal synthesis step of generating a first synthesis signal configured from an image signal to cause a first light emitting element used for displaying an image to emit light and a dummy pixel signal to cause a second light emitting element used for measuring brightness to emit light, by the signal processing device, a conversion step of converting the generated first synthesis signal into a second synthesis signal to cause only the first light emitting element of the first light emitting element and the second light emitting element to emit light at identical brightness, regardless of a degradation degree of the first light emitting element, by the signal processing device, and a light emission control step of causing the first light emitting element and the second light emitting element to emit light, on a basis of the second synthesis signal, by the signal processing device.

According to the first embodiment of the present disclosure, there is provided a program for causing a computer to function as a signal synthesis unit that generates a first synthesis signal configured from an image signal to cause a first light emitting element used for displaying an image to emit light and a dummy pixel signal to cause a second light emitting element used for measuring brightness to emit light, a conversion unit that converts the generated first synthesis signal into a second synthesis signal to cause only the first light emitting element of the first light emitting element and the second light emitting element to emit light at identical brightness, regardless of a degradation degree of the first light emitting element, and a light emission control unit that causes the first light emitting element and the second light emitting element to emit light, on a basis of the second synthesis signal.

According to the first embodiment of the present disclosure, there is an electronic apparatus that has a signal processing device to process a signal built therein. The signal processing device includes a signal synthesis unit that generates a first synthesis signal configured from an image signal to cause a first light emitting element used for displaying an image to emit light and a dummy pixel signal to cause a second light emitting element used for measuring brightness to emit light, a conversion unit that converts the generated first synthesis signal into a second synthesis signal to cause only the first light emitting element of the first light emitting element and the second light emitting element to emit light at identical brightness, regardless of a degradation degree of the first light emitting element, and a light emission control unit that causes the first light emitting element and the second light emitting element to emit light, on a basis of the second synthesis signal.

According to the first embodiment of the present invention, the first synthesis signal configured from the image signal to cause the first light emitting element used for displaying the image to emit light and the dummy pixel signal to cause the second light emitting element used for measuring the brightness to emit light is generated. The generated first synthesis signal is converted into the second synthesis signal to cause only the first light emitting element in the first light emitting element and the second light emitting element to emit light at the same brightness, regardless of the degradation degree of the first light emitting element. The first light emitting element and the second light emitting element are caused to emit light, on the basis of the second synthesis signal.

According to a second embodiment of the present disclosure, there is a signal processing device including a signal synthesis unit that generates a first synthesis signal configured from an image signal to cause a first light emitting element used for displaying an image to emit light and a dummy pixel signal to cause a second light emitting element used for measuring brightness to emit light, a conversion unit that converts the generated first synthesis signal into a second synthesis signal to increase an amount of a current flowing to only the first light emitting element of the first light emitting element and the second light emitting element, according to a light emission time of the first light emitting element, and a light emission control unit that causes the first light emitting element and the second light emitting element to emit light, on a basis of the second synthesis signal.

According to the second aspect of the present invention, the first synthesis signal configured from the image signal to cause the first light emitting element used for displaying the image to emit light and the dummy pixel signal to cause the second light emitting element used for measuring the brightness to emit light is generated. The generated first synthesis signal is converted into the second synthesis signal to increase the amount of the current flowing to only the first light emitting element in the first light emitting element and the second light emitting element, according to the light emission time of the first light emitting element. The first light emitting element and the second light emitting element are caused to emit light, on the basis of the second synthesis signal.

Advantageous Effects of Invention

According to the present invention, burn-in can be prevented from arising at a display screen.

BRIEF DESCRIPTION OF DRAWINGS

FIG. 4 is a first diagram illustrating burn-in arising at a display screen.

DESCRIPTION OF EMBODIMENTS

The following description will be made in the order described below.
1. First embodiment (example when a burn-in correction process is executed for only image signal)
2. Second embodiment (example when correction amount and offset amount are calculated using image signal after inclination correction process)
3. Third embodiment (example when gradation correction process is executed for image signal having gamma characteristic)
4. Fourth embodiment (example when brightness degradation curve is estimated on the basis of temperature change of organic EL element)
5. Fifth embodiment (example when dummy image is synthesized at upper side or lower side of display image)
6. Modifications

1. First Embodiment

Configuration Example of Display Device 1

Figure 1:
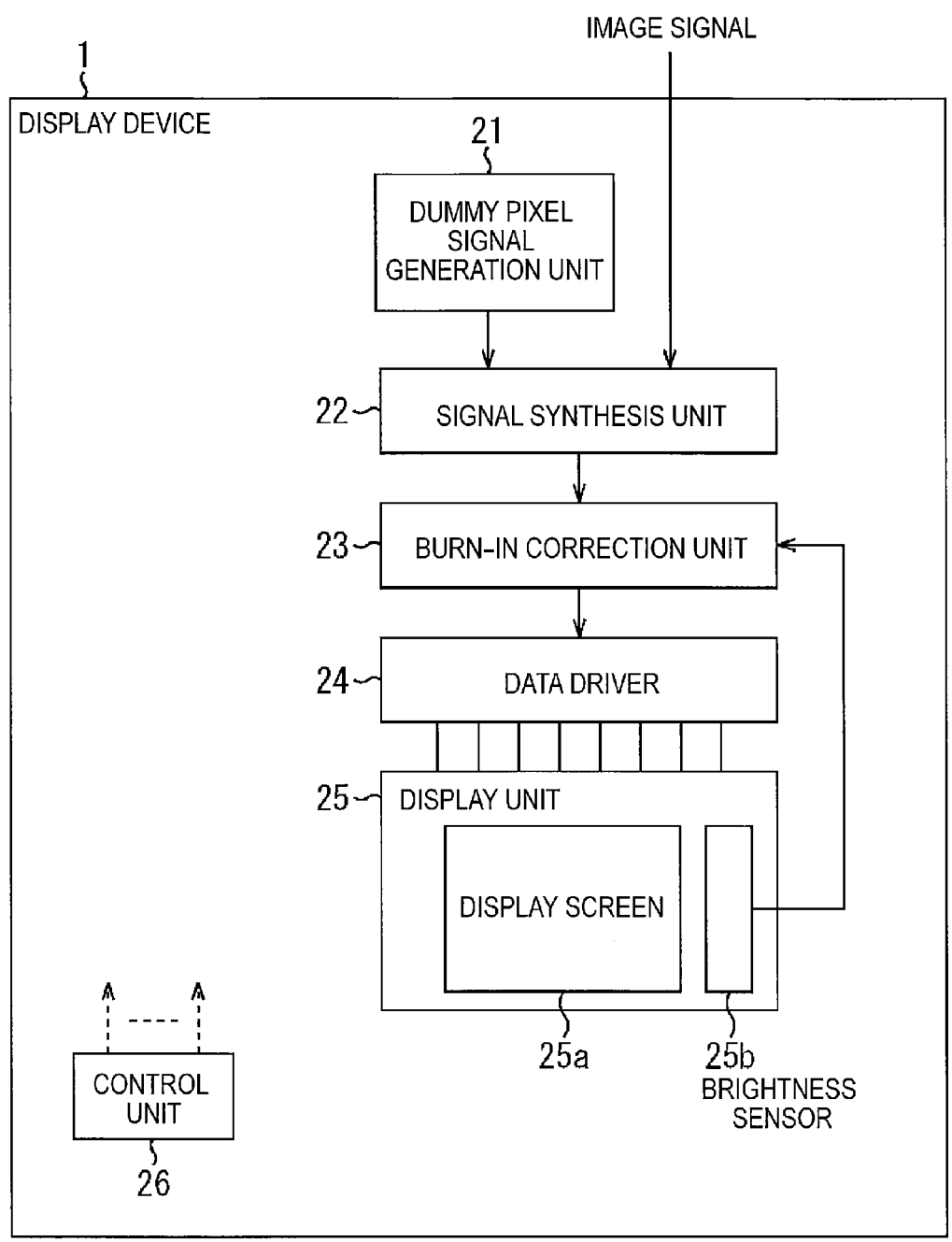
FIG. 1 is a block diagram illustrating a configuration example of a display device to be a first embodiment.

FIG. 1 illustrates a configuration example of a display device 1 to be a first embodiment.

The display device 1 includes a dummy pixel signal generation unit 21, a signal synthesis unit 22, a burn-in correction unit 23, a data driver 24, a display unit 25, and a control unit 26.

Here, the display unit 25 is, for example, an active matrix type display using an organic electro luminescent (EL) element as a light emitting element. The display unit 25 has a display screen 25a to display a display image corresponding to an image signal from the outside (for example, an antenna or the like).

In addition, the display unit 25 has an organic EL element (hereinafter, referred to as an organic EL element for display) built therein, the organic EL element emitting light to display the display image on the display screen 25a. The organic EL element for the display will be described below with reference to FIG. 15. However, the organic EL element for the display emits light as a sub-pixel of the display image.

In addition, the display unit 25 has an organic EL element (hereinafter, referred to as an organic EL element for measurement) and a brightness sensor 25b, the organic EL element for measurement emitting light to cause brightness to be measured by the brightness sensor 25b, the brightness sensor 25b measuring brightness of the organic EL element for the measurement. The light emitted from the organic EL element for the measurement does not leak to the outside of the display unit 25.

The dummy pixel signal generation unit 21 generates a dummy pixel signal to cause the organic EL element for the measurement built in the display unit 25 to light emit and supplies the dummy pixel signal to the signal synthesis unit 22.

An image signal to cause the organic EL element for the display to emit light is supplied from the outside to the signal synthesis unit 22.

The signal synthesis unit 22 synthesizes the image signal from the outside and the dummy pixel signal from the dummy pixel signal generation unit 21 and supplies a synthesis signal obtained as a result thereof to the burn-in correction unit 23.

Figure 2:
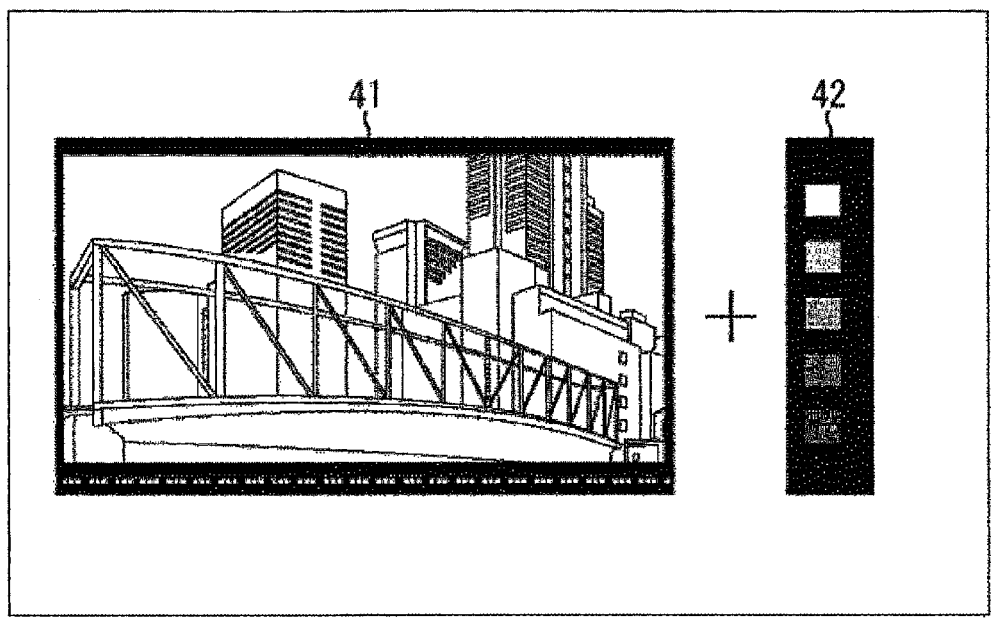
FIG. 2 is a diagram illustrating an example of a synthesis process executed by a signal synthesis unit of FIG. 1.

Next, FIG. 2 illustrates an example of a synthesis process for synthesizing the image signal and the dummy pixel signal by the signal synthesis unit 22.

At a left side of FIG. 2, an example of a display image 41 that is displayed on the display screen 25a by light emission of the organic EL element for the display included in the display unit 25 according to an image signal is illustrated.

In addition, at a right side of FIG. 2, an example of a dummy image 42 that is obtained by light emission of the organic EL element for the measurement included in the display unit 25 according to a dummy pixel signal is illustrated. The dummy image 42 is not displayed on the display screen 25a and is used for only the measurement of the brightness by the brightness sensor 25b.

The signal synthesis unit 22 synthesizes the image signal and the dummy pixel signal such that the dummy image 42 is arranged at the right side of the display image 41, for example, as illustrated in FIG. 2.

Figure 3:
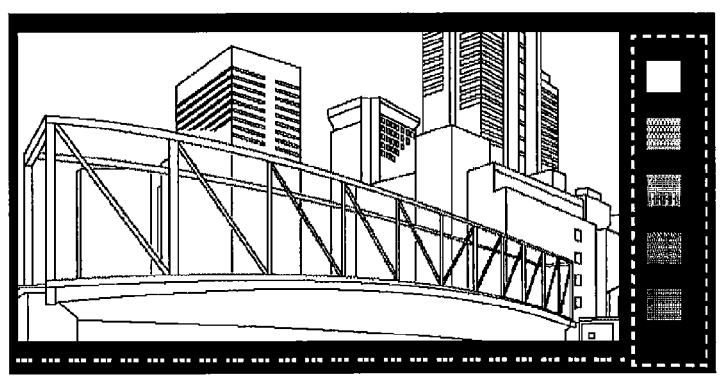
FIG. 3 is a diagram illustrating an example of a synthesis image obtained by a synthesis process.

Thereby, the signal synthesis unit 22 synthesizes the image signal and the dummy pixel signal to generate a synthesis signal showing a synthesis image 43 illustrated in FIG. 3 and supplies the synthesis signal to the burn-in correction unit 23.

In addition, the signal synthesis unit 22 may synthesize the image signal and the dummy pixel signal such that the dummy image 42 is arranged on the left side of the display image 41. In this case, in the display unit 25, the brightness sensor 25b is provided at the left side of the display screen 25a.

The burn-in correction unit 23 executes a burn-in correction process for correcting the image signal (display image 41) included in the synthesis signal from the signal synthesis unit 22 and preventing burn-in from arising at the display screen 25a of the display unit 25. The burn-in arising at the display screen 25a will be described in detail with reference to FIGS. 4 and 5.

That is, for example, the burn-in correction unit 23 executes the burn-in correction process for the image signal, on the basis of a measurement result from the brightness sensor 25, and supplies a synthesis signal including the image signal after the burn-in correction process to the data driver 24. The detail of the burn-in correction unit 23 will be described with reference to FIG. 6.

The data driver 24 executes analog/digital (AD) conversion for the synthesis signal from the burn-in correction unit 23 and supplies the synthesis signal after the AD conversion to the display unit 25.

The display unit 25 causes the organic EL element for the display to emit light, on the basis of the image signal included in the synthesis signal from the data driver 24. Thereby, the display image 41 corresponding to the image signal is displayed on the display screen 25a.

In addition, the display unit 25 causes the organic EL element for the measurement to emit light, on the basis of the dummy pixel signal included in the synthesis signal from the data driver 24.

The brightness sensor 25b is provided near the organic EL element for the measurement and measures the brightness of the organic EL element for the measurement and supplies a measurement result to the burn-in correction unit 23.

The detail of the display unit 25 will be described with reference to FIGS. 13 to 17.

The control unit 26 controls the dummy pixel signal generation unit 21, the signal synthesis unit 22, the burn-in correction unit 23, the data driver 24, the display unit 25, and the brightness sensor 25b.

Meanwhile, the organic EL element for the display emits light at brightness L according to the image signal input from the data driver 24 to the display unit 25.

That is, for example, a current I according to a signal potential Vsig shown by an image signal flows to the organic EL element for the display and the organic EL element for the display emits light at the brightness L.

Here, the brightness L is represented by the following formula (1), using the current I flowing to the organic EL element and an inclination α showing conversion efficiency (brightness efficiency) when the current I is converted into the brightness L.

$$L = \alpha \times I \quad (1)$$

The inclination α is determined previously according to the organic EL element and when the inclination α is large, the organic EL element can efficiently convert the current I into the brightness L.

In addition, the brightness L can be represented by the following formula (2), using the signal potential Vsig shown by the image signal.

$$L = \alpha \times \beta \times V\text{sig}^2 \quad (2)$$

In addition, $\alpha \times \beta 1$ shows conversion efficiency when the signal potential $V\text{sig}^2$ is converted into the brightness L.

In addition, the brightness L can be represented by the following formula (3), using a gradation k and the inclination α corresponding to the current I.

$$L = \alpha \times \beta 2 \times k^{2.2} \quad (3)$$

In addition, $\alpha \times \beta 2$ shows conversion efficiency when $k^{2.2}$ is converted into the brightness L.

Meanwhile, the organic EL element for the measurement has the same configuration as the organic EL element for the display. The organic EL element for the measurement emits light at brightness according to the dummy pixel signal input from the data driver 24 to the display unit 25.

If a signal potential shown by the dummy pixel signal is set as Vsig, the brightness of the organic EL element for the measurement can be represented by the above-described formulas (1) to (3), similar to the brightness L of the organic EL for the display. For this reason, only the brightness L of the organic EL element for the display is described and description of the brightness of the organic EL element for the measurement is omitted.

In the organic EL element for the display, the brightness L may decrease due to degradation of the organic EL element according to a time passage, regardless of whether the current I is the same. Brightness L' after the decrease can be represented by the following formula (4) corresponding to the formula (1).

$$L'=\alpha'\times I \quad (4)$$

That is, for example, the organic EL element for the display is degraded according to the magnitude of the current flowing to the organic EL element for the display or the length of a time for which the current has flown. In addition, degradation of conversion efficiency (inclination) where the inclination $\alpha$ decreases to the inclination $\alpha'$ ($<\alpha$) as illustrated in the formula (4) may arise according to the degradation of the organic EL element for the display.

The organic EL element for the display is degraded in proportional to the magnitude of the current flowing to the organic EL element and the time for which the current has flown. In addition, the inclination $\alpha$ decreases to the small inclination $\alpha$,' when the degradation of the organic EL element for the display is large.

The degradation of the conversion efficiency can be represented by a formula for the signal potential Vsig, as illustrated in the following formula (5) corresponding to the formula (2).

$$L'=\alpha'\times\beta 1\times V\text{sig}^2 \quad (5)$$

In addition, the degradation of the conversion efficiency can be represented by a formula for the gradation k, as illustrated in the following formula (6) corresponding to the formula (3).

$$L'=\alpha'\times\beta 2\times k^{2.2} \quad (6)$$

For example, in the organic EL element for the display, degradation of the current where the current I flowing to the organic EL element for the display decrease to a current I=(I−ΔI) may arise according to the degradation of the organic EL element for the display.

A current degradation amount ΔI increases in proportional to the magnitude of the current flowing to the organic EL element for the display and the time for which the current has flown.

The degradation of the current is equivalent to that the signal potential Vsig of the image signal decreases to the signal potential Vsig=(Vsig−ΔVsig). In addition, the degradation of the current is equivalent to that the gradation k decreases to the gradation k=(k−Δk).

In the organic EL element for the display, the brightness L may decrease to the brightness L' due to the degradation of the conversion efficiency where the inclination $\alpha$, decreases and the degradation of the current where the current I decreases, as described above. Thereby, the so-called burn-in phenomenon where an immediately previously displayed image appears to remain may arise at the display screen 25a.

[With Respect to Burn-In]

Next, burn-in arising at the display screen 25a will be described with reference to FIGS. 4 and 5.

FIG. 4 illustrates an example of the display screen 25a. On the display screen 25a of FIG. 4, a black image 61a showing a black image is displayed and a white image 61b showing a white character "BS" (in the drawing, a character surrounded with a black circle) using the black image 61a as a background is displayed.

For example, in the display screen 25a, a current $I_1$ flows to a first organic EL element emitting light to display the black image 61a in the organic EL elements for the display and the first organic EL element emits light at brightness $L_1$ (for example, a brightness value 0).

Thereby, in the first organic EL element after the current supply that has emitted light by supplying the current $I_1$, efficiency degradation and current degradation arise due to the supply of the current $I_1$. Therefore, the brightness $L_1'$ of the first organic EL element in which the efficiency degradation and the current degradation have arisen is represented by the following formula (4').

$$L_1'=\alpha_1'\times(I-\Delta I_1) \quad (4')$$

In addition, for example, in the display screen 25a, a current $I_2$ ($>I_1$) flows to a second organic EL element emitting light to display the white image 61b in the organic EL elements for the display and the second organic EL element emits light at brightness $L_2$ ($>L_1$) (for example, a brightness value 255).

Thereby, in the second organic EL element after the current supply that has emitted light by supplying the current $I_2$, efficiency degradation and current degradation arise due to the supply of the current $I_2$. Therefore, the brightness $L_2'$ of the second organic EL element in which the efficiency degradation and the current degradation have arisen is represented by the following formula (4").

$$L_2'=\alpha_2'\times(I-\Delta I_2) \quad (4'')$$

The current $I=I_1$ that is smaller than the current $I=I_2$ flowing to the second organic EL element flows to the first organic EL element, as illustrated in the formula (4').

Therefore, the efficiency degradation and the current degradation arising at the first organic EL element are smaller than the efficiency degradation and the current degradation arising at the second organic EL element.

For this reason, the inclination $\alpha_1'$ of the formula (4') becomes larger than the inclination $\alpha_2'$ of the formula (4") and the current degradation amount $\Delta I_1$ of the formula (4') becomes smaller than the current degradation amount $\Delta I_2$ of the formula (4").

Therefore, when the same current I flows to the first organic EL element and the second organic EL element, the brightness $L_1'$ of the first organic EL element becomes larger than the brightness $L_2'$ of the second organic EL element.

Figure 5:
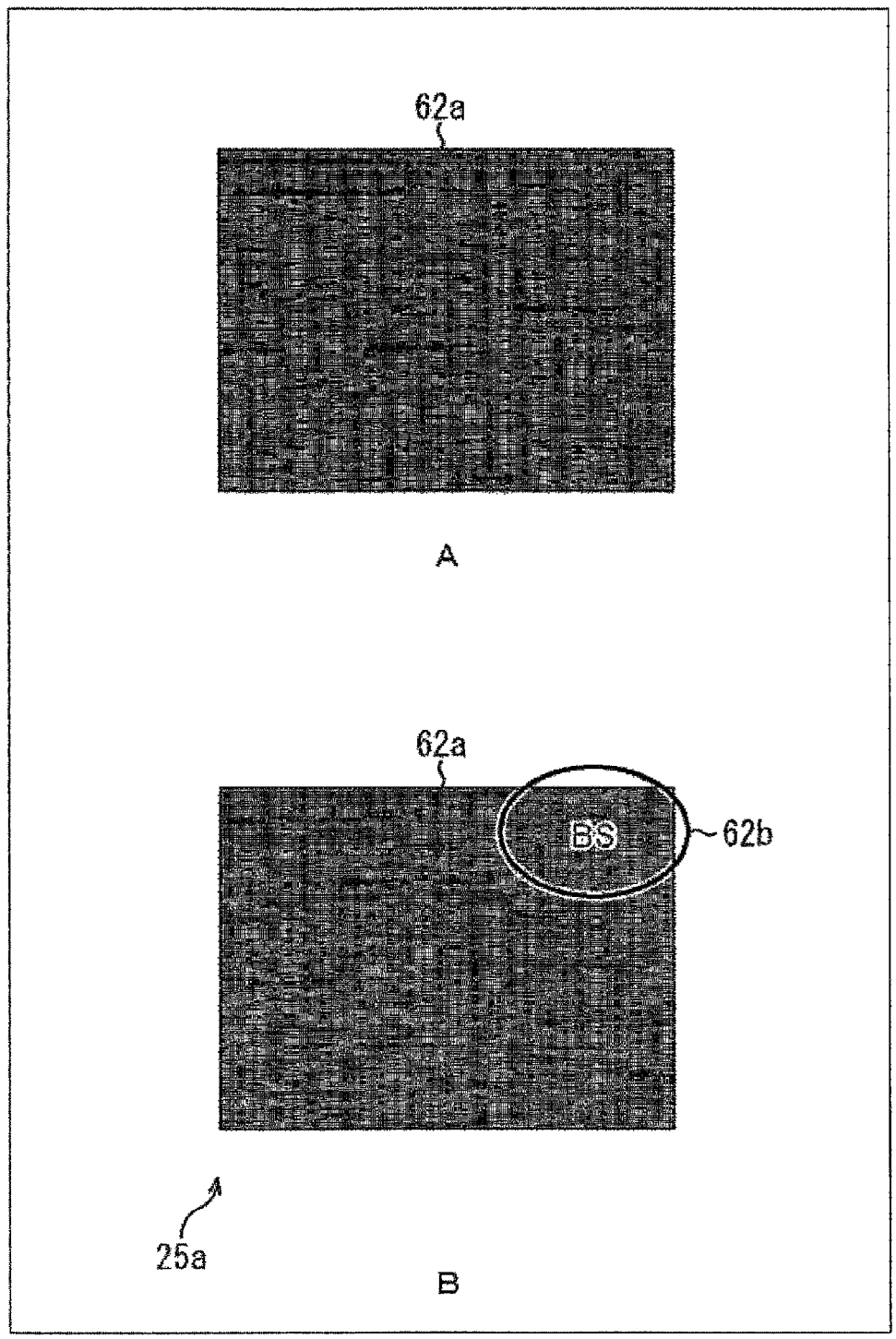
FIG. 5 is a second diagram illustrating burn-in arising at a display screen.

Next, FIG. 5 illustrates an example when a gray image 62a showing a gray image is displayed on the display screen 25a immediately after the black image 61a and the white image 61b are displayed.

In A of FIG. 5, the gray image 62a is illustrated. The gray image 62a is configured from a plurality of pixels and brightness of each pixel configuring the gray image 62a becomes the same brightness corresponding to a gray color.

In B of FIG. 5, the display screen 25a when the gray image 62a is displayed immediately after the black image 61a and the white image 61b are displayed is illustrated.

In order to display the gray image 62a on the display screen 25a, the same current I corresponding to the brightness (the same brightness corresponding to the gray color) of the gray image 62a flows to the organic EL element for the display configured from the first organic EL element and the second organic EL element.

For this reason, the brightness $L_1'$ of the first organic EL element becomes larger than the brightness $L_2'$ of the second organic EL element, as described above.

Therefore, in order to display the gray image 62a on the display screen 25a, the first organic EL element emits light at the brightness $L_1'$ and the second organic EL element emits light at the brightness $L_2'$ smaller than the brightness $L_1'$.

In addition, the second organic EL element is a light emitting element that emits light to display the white image 61b showing the white character "BS", as illustrated in FIG. 4.

Therefore, as illustrated in B of FIG. 5, the burn-in phenomenon where the immediately previously displayed character "BS" appears to remain arises at an upper right portion in the display screen 25a.

That is, the immediately previously displayed character "BS" may appear to remain at the upper right portion on the display screen 25a to which the second organic EL element emits light, due to a brightness difference of the brightness $L_1'$ of the first organic EL element and the brightness $L_2'$ of the second organic EL element.

[Detail of Burn-In Correction Unit 23]

Figure 6:
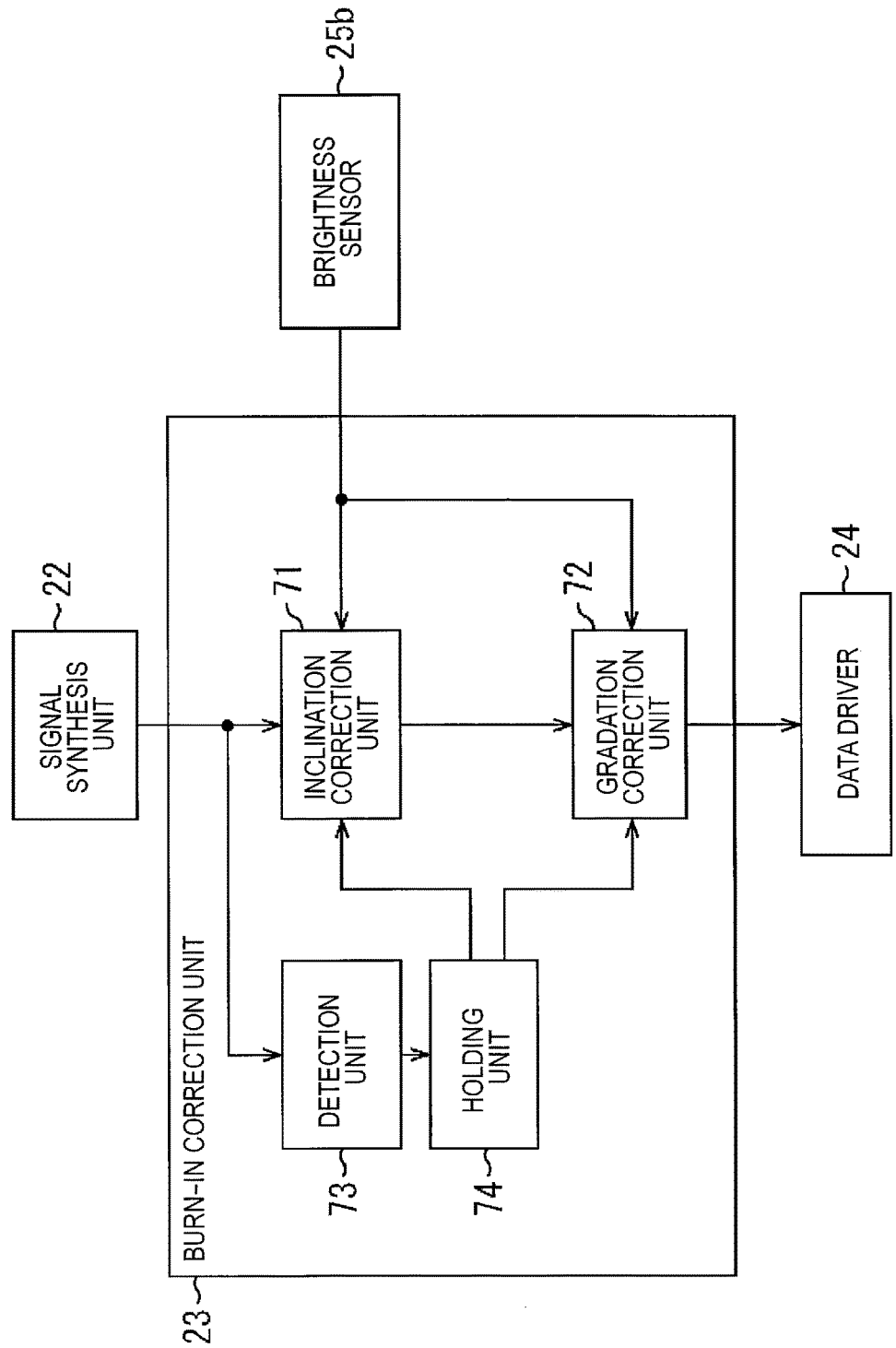
FIG. 6 is a block diagram illustrating a detailed configuration example of a burn-in correction unit of FIG. 1.

Next, FIG. 6 illustrates a detailed configuration example of the burn-in correction unit 23 of FIG. 1.

The burn-in correction unit 23 includes an inclination correction unit 71, a gradation correction unit 72, a detection unit 73, and a holding unit 74.

A synthesis signal $C_n$ (n=1, 2, from the signal synthesis unit 22 is supplied to the inclination correction unit 71. Here, the synthesis signal $C_n$ shows an n-th supplied synthesis signal (synthesis image).

The inclination correction unit 71 reads a signal potential $(Vsig)_{n-1}$ of an image signal $S_{n-1}$ input immediately before an image signal $S_n$ included in the synthesis signal $C_n$ from the signal synthesis unit 22, from the holding unit 74.

Although described below, the signal potential $(Vsig)_{n-1}$ of the image signal $S_{n-1}$ that is included in a synthesis signal $C_{n-1}$ supplied from the signal synthesis unit 22 to the inclination correction unit 71 is held in the holding unit 74.

The inclination correction unit 71 calculates a correction amount $\pm\sqrt{(\alpha/\alpha')}$ to correct the inclination $\alpha'$ decreased by efficiency degradation with the original inclination $\alpha$, on the basis of the signal potential $(Vsig)_{n-1}$ read from the holding unit 74 and a measurement result of the brightness from the brightness sensor 25b.

In addition, the inclination correction unit 71 multiplies the signal potential $(Vsig)_n$ of the image signal $S_n$ included in the synthesis signal $C_n$ from the signal synthesis unit 22 with the calculated correction amount $\pm\sqrt{(\alpha/\alpha')}$. The inclination correction unit 71 supplies the image signal $C_n$ including the image signal $S_n$ of a signal potential $(Vsig')_n = \{\pm\sqrt{(\alpha/\alpha')} \times (Vsig)_n\}$ obtained as a multiplication result thereof to the gradation correction unit 72.

The gradation correction unit 72 reads the signal potential $(Vsig)_n$ of the image signal $S_n$ from the holding unit 74.

In addition, the gradation correction unit 72 calculates $(\Delta Vsig)_n$ corresponding to an offset amount $\Delta k$ to correct the gradation $(k-\Delta k)$ decreased by current degradation with the original gradation k, on the basis of the signal potential $(Vsig)_n$ read from the holding unit 74 and the measurement result of the brightness from the brightness sensor 25b.

In addition, the gradation correction unit 72 adds $(\Delta Vsig)_n$ corresponding to the offset amount $\Delta k$ to $(Vsig)_n$ of the signal potential $(Vsig')_n = \{\pm\sqrt{(\alpha/\alpha')} \times (Vsig)_n\}$ of the image signal $S_n$ included in the synthesis signal $C_n$ from the inclination correction unit 71.

The gradation correction unit 72 supplies the synthesis signal $C_n$ including the image signal $S_n$ of the signal potential $(Vsig'')_n = [\pm\sqrt{(\alpha/\alpha')} \times \{(Vsig)_n + (\Delta Vsig)_n\}]$ obtained as an addition result thereof to the data driver 24.

When the efficiency degradation or the current degradation advances, an absolute value of the signal potential $(Vsig')_n$ output from the gradation correction unit 72 to the data driver 24 increases.

In addition, $I = \beta 1 \times Vsig^2$ is derived from the above-described formulas (4) and (5) and the current I (current amount) flowing to the organic EL element for the display increases according to the magnitude (absolute value) of the signal potential $(Vsig'')_n$.

Therefore, the current I flowing to the organic EL element for the display increases when the efficiency degradation or the current degradation advances.

Here, if the current degradation amount $(\Delta Vsig)_n$ by the current degradation is considered in the signal potential $(Vsig'')_n = $ the potential $[\pm\sqrt{(\alpha/\alpha')} \times \{(Vsig)_n + (\Delta Vsig)_n\}]$, a signal potential $(Vsig''')_n$ applied to a pixel circuit 184 (FIG. 14) having the organic EL element for the display built therein becomes $[\pm\sqrt{(\alpha/\alpha')} \times \{(Vsig)_n + (\Delta Vsig)_n - (\Delta Vsig)_n\}] = [\pm\sqrt{(\alpha/\alpha')} \times (Vsig)_n]$.

In addition, if the signal potential $(Vsig''')_n = [\pm\sqrt{(\alpha/\alpha')} \times (Vsig)_n]$ is substituted for the signal potential Vsig of the formula (5), $L' = \alpha' \times \beta 1 \times [\pm\sqrt{(\alpha/\alpha')} \times \{(Vsig)_n\}]^2 = \alpha' \times \beta 1 \times (\alpha/\alpha') \times \{(Vsig)_n\}]^2 = \alpha \times \beta 1 \times \{(Vsig)_n\}^2$ is obtained. In addition, $L' = \alpha \times \beta 1 \times \{(Vsig)_n\}^2 = \alpha \times \beta 2 \times \{k_n\}^2$ is obtained by the formulas (5) and (6).

Therefore, the image signal Sn output from the gradation correction unit 72 to the data driver 24 is obtained by correcting the inclination $\alpha'$ with the original inclination $\alpha$ and correcting the gradation $(k_n - \Delta k_n)$ with the original gradation $k_n$.

The detection unit 73 detects the signal potential $(Vsig)_n$ of the image signal $S_n$, on the basis of the image signal $S_n$ included in the synthesis signal $C_n$ from the signal synthesis unit 22, supplies the signal potential to the holding unit 74, and holds the signal potential by the holding unit.

The holding unit 74 holds the signal potential $(Vsig)_n$ from the detection unit 73.

[Detail of Inclination Correction Unit 71]

Figure 7:
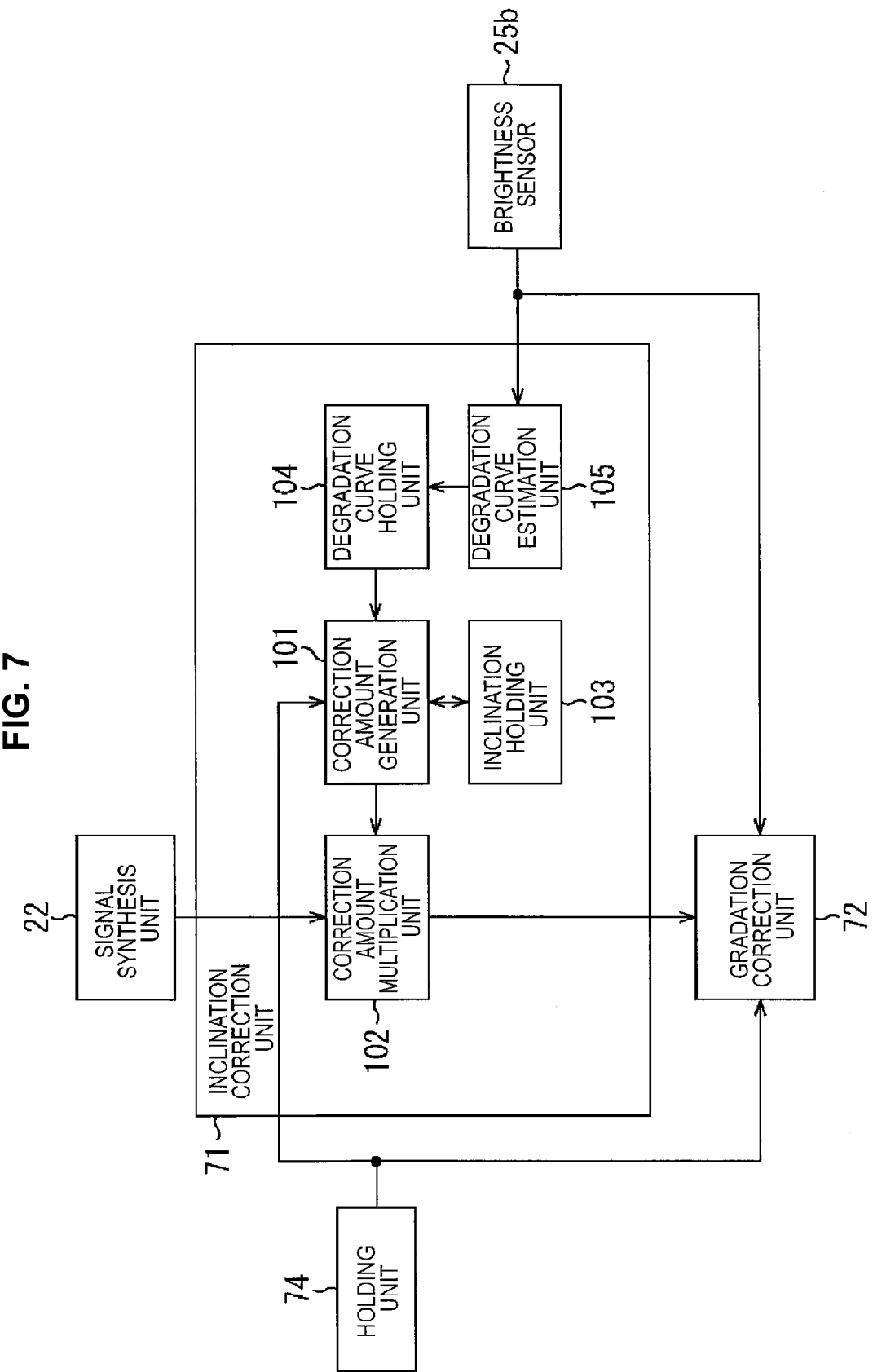
FIG. 7 is a block diagram illustrating a detailed configuration example of an inclination correction unit of FIG. 6.

Next, FIG. 7 illustrates a detailed configuration example of the inclination correction unit 71 of FIG. 6.

The inclination correction unit 71 includes a correction amount generation unit 101, a correction amount multiplication unit 102, an inclination holding unit 103, a degradation curve holding unit 104, and a degradation curve estimation unit 105.

The control unit 26 of FIG. 1 sequentially pays attention to the organic EL element for the display and sets the attention paid organic EL element as an attention element.

The correction amount generation unit 101 reads the inclination $\alpha'$ of the attention element calculated at the time of generating the previous correction amount, that is, at the time of generating the correction amount of the image signal $S_{n-1}$, from the inclination holding unit 103.

Although described below, the inclination $\alpha'$ of the attention element calculated by the correction amount generation unit 101 is held in the inclination holding unit 103.

In addition, the correction amount generation unit 101 reads the signal potential $(Vsig)_{n-1}$ (hereinafter, simply referred to as the signal potential $(Vsig)_{n-1}$ of the attention element) shown by the image signal $S_{n-1}$ and applied to the pixel circuit 184 having the attention element built therein, from the holding unit 74.

The correction amount generation unit 101 calculates the current $I_{n-1}$ flowing to the attention element, on the basis of the signal potential $(Vsig)_{n-1}$ of the attention element read from the holding unit 74.

In addition, the correction amount generation unit 101 reads a brightness degradation curve associated with the current $I_{n-1}$ flowing to the attention element among a plurality of brightness degradation curves held in the degradation curve holding unit 104, from the degradation curve holding unit 104.

The correction amount generation unit 101 calculates the latest inclination $\alpha'$ in the attention element, on the basis of the inclination $\alpha'$ read from the inclination holding unit 103 and the brightness degradation curve read from the degradation curve holding unit 104.

In addition, the correction amount generation unit 101 supplies the latest inclination $\alpha'$ to the inclination holding unit 103, sets the latest inclination as the inclination $\alpha'$ of the attention element, and holds (stores) the latest inclination by overwriting.

In addition, the correction amount generation unit 101 generates (calculates) the correction amount $\pm\sqrt{(\alpha/\alpha')}$, on the basis of the latest inclination $\alpha'$ in the attention element, and supplies the correction amount to the correction amount multiplication unit 102. A method of generating the correction amount by the correction amount generation unit 101 will be described in detail with reference to FIGS. 8 and 9.

The correction amount multiplication unit 102 multiplies the signal potential $(Vsig)_n$ of the attention element among the signal potentials $(Vsig)_n$ of each organic EL element for the display shown by the image signal $S_n$ included in the synthesis signal $C_n$ from the signal synthesis unit 22 with the correction amount $\pm\sqrt{(\alpha/\alpha')}$ from the correction amount generation unit 101.

The image signal $S_n$ shows the signal potential $(Vsig)_n$ applied to the pixel circuit having the organic EL element for the display built therein.

The correction amount multiplication unit 102 supplies the signal potential $\{\pm\sqrt{(\alpha/\alpha')}\times(Vsig)_n\}$ after correction of the inclination $\alpha'$ obtained by the multiplication as the signal potential $(Vsig')_n$ of the attention element to the gradation correction unit 72.

The inclination holding unit 103 holds the inclination $\alpha'$ of the attention element supplied from the correction amount generation unit 101. In addition, the inclination holding unit 103 previously holds the inclination $\alpha$ (inclination $\alpha$ before the decrease) of the attention element as the organic EL element for the display.

Therefore, the correction amount generation unit 101 reads the inclination $\alpha'=\alpha$ of the attention element from the inclination holding unit 103, until the inclination $\alpha$ held in the inclination holding unit 103 is updated by overwriting.

The degradation curve holding unit 104 holds a brightness degradation curve from the degradation curve estimation unit 105.

The degradation curve estimation unit 105 has a memory not illustrated in the drawings built therein and a brightness degradation basis curve becoming a basis when a brightness degradation curve showing a decrease degree of the inclination is estimated is previously held in the memory.

The brightness degradation basis curve shows an average brightness degradation curve in the plurality of organic EL elements built in the plurality of display devices 1, respectively. In addition, the brightness degradation basis curve is previously generated on the basis of an experimental result using the organic EL elements. This is the same in embodiments to be described below.

The degradation curve estimation unit 105 estimates the brightness degradation curve showing the decrease of the brightness of the organic EL element for the display by the efficiency degradation, on the basis of the measurement result of the brightness from the brightness sensor 25b and the brightness degradation basis curve previously held in the memory not illustrated in the drawings.

In addition, the degradation curve estimation unit 105 estimates the brightness degradation curve of the organic EL element for the display built in the display unit 25, because there is a variation in the brightness degradation curve of the organic EL element built in the display unit 25 for each display device 1.

The degradation curve estimation unit 105 supplies the brightness degradation curve obtained as an estimation result thereof to the degradation curve holding unit 104 and holds the brightness degradation curve by the degradation curve holding unit.

A method of estimating the brightness degradation curve by the degradation curve estimation unit 105 will be described in detail with reference to FIG. 10.

[Generation of Correction Amount Executed by Correction Amount Generation Unit 101]

Next, an example when the correction amount generation unit 101 generates a correction amount will be described with reference to FIGS. 8 and 9.

Figure 8:
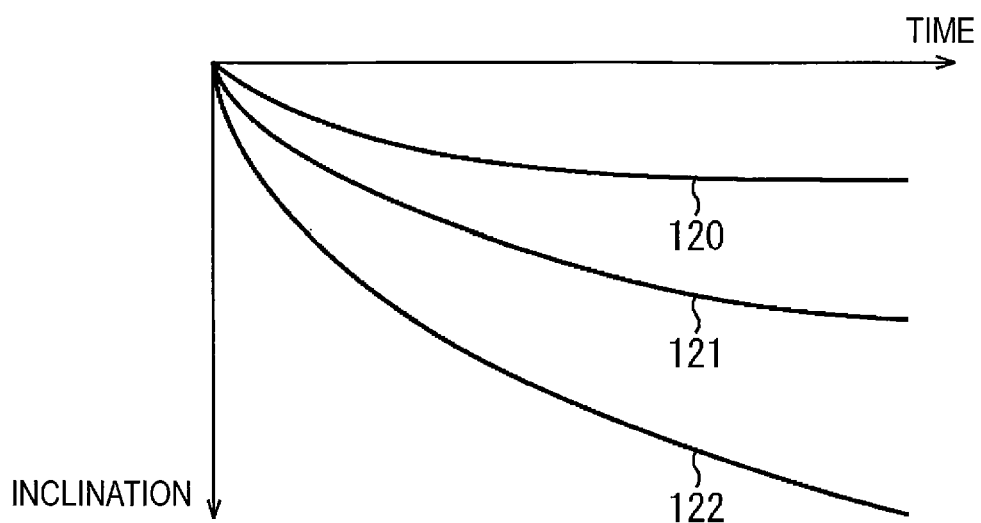
FIG. 8 is a diagram illustrating an example of a brightness degradation curve.

FIG. 8 illustrates an example of the brightness degradation curve estimated by the degradation curve estimation unit 105 and held in the degradation curve holding unit 104.

In FIG. 8, a horizontal axis shows a time and a vertical axis shows an inclination decreasing according to a time passage.

In FIG. 8, a brightness degradation curve 120 shows a decrease degree of the inclination when a current I(L=100 nit) to cause the organic EL element to emit light at the brightness L corresponding to 100 nit in the case in which the inclination is $\alpha$ flows to the organic EL element.

In addition, a brightness degradation curve 121 shows a decrease degree of the inclination when a current I(L=200 nit) to cause the organic EL element to emit light at the brightness L corresponding to 200 nit in the case in which the inclination is $\alpha$ flows to the organic EL element.

In addition, a brightness degradation curve 122 shows a decrease degree of the inclination when a current I(L=400 nit) to cause the organic EL element to emit light at the brightness L corresponding to 400 nit in the case in which the inclination is $\alpha$ flows to the organic EL element.

Here, a unit [nit] shows brightness in a direction vertical to a plane of one square meter, when the intensity of light of a light source (organic EL element) to be the plane of one square meter is 1 cd (candela) in the direction.

The correction amount generation unit 101 calculates the current $I_{n-1}$ flowing to the attention element, on the basis of the signal potential $(Vsig)_{n-1}$ of the attention element read from the holding unit 74. In addition, the correction amount generation unit 101 reads a brightness degradation curve corresponding to the calculated current $I_{n-1}$ among the plurality of brightness degradation curves (for example, the brightness degradation curves 120 to 122) held in the degradation curve holding unit 104, from the degradation curve holding unit 104.

That is, for example, when the calculated current $I_{n-1}$ is the current I(L=200 nit), the correction amount generation unit 101 reads the brightness degradation curve 121 corresponding to the current I(L=200 nit) from the degradation curve holding unit 104.

In addition, the correction amount generation unit 10 reads the inclination α' of the attention element from the inclination holding unit 103.

In addition, the correction amount generation unit 101 calculates the latest inclination α' of the attention element, on the basis of the inclination α' of the attention element read from the inclination holding unit 103 and the brightness degradation curve 121 read from the degradation curve holding unit 104.

Figure 9:
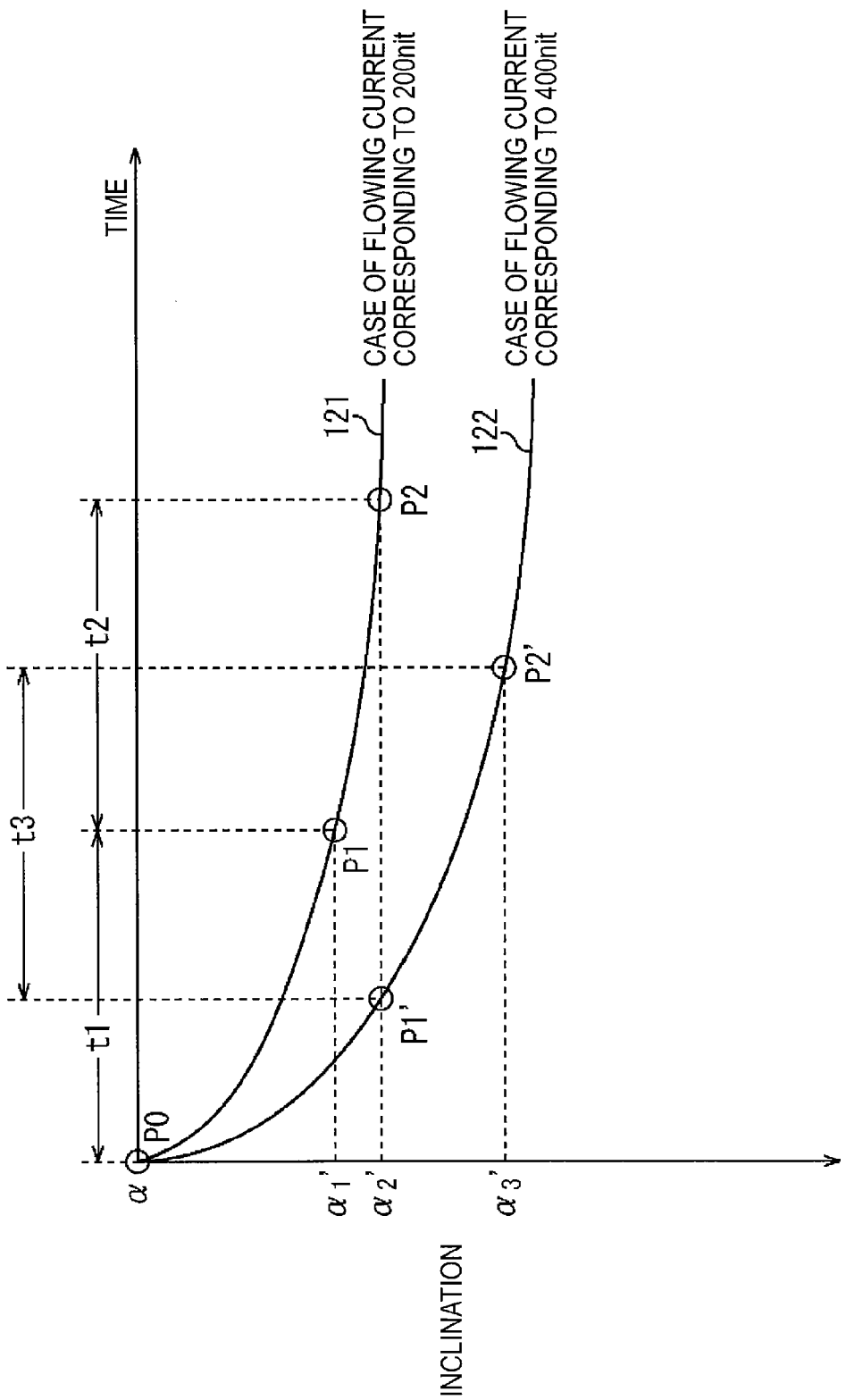
FIG. 9 is a diagram illustrating an example when a latest inclination of an attention element is calculated.

Next, FIG. 9 illustrates an example when the correction amount generation unit 101 calculates the latest inclination α' of the attention element, on the basis of the inclination α' of the attention element read from the inclination holding unit 103 and the brightness degradation curve 121 read from the degradation curve holding unit 104.

For example, the correction amount generation unit 101 calculates the latest inclination α' of the attention element, on the basis of the inclination α'=a of the attention element read from the inclination holding unit 103 and the time t1 for which the current $I_{n-1}$=I(L=200 nit) has flown to the attention element, using the brightness degradation curve 121 read from the degradation curve holding unit 104.

That is, for example, when the inclination α' of the attention element in the image signal $S_n$ of the correction target is P0(α')=α corresponding to a point P0, the correction amount generation unit 101 moves the point P0 on the brightness degradation curve 121 to a point P1 after a passage of the time t1 for which the current $I_{n-1}$=I(L=200 nit) has flown to the attention element.

In addition, the correction amount generation unit 101 calculates the inclination P1(α')=$α_1$' corresponding to the point P1 on the brightness degradation curve 121 as the latest inclination α'=$α_1$' of the attention element. The inclination $α_1$' shows the inclination when the current $I_{n-1}$=I(L=200 nit) has flown to the attention element for the time t1, that is, the inclination α'=$α_1$' after degradation by supplying the current $I_{n-1}$, from a state in which the inclination of the attention element is α'=α.

The correction amount generation unit 101 supplies the latest inclination α'=P1($α_1$')=$α_1$' of the attention element to the inclination holding unit 103 and holds (stores) the latest inclination by overwriting.

In addition, the correction amount generation unit 101 generates (calculates) a correction amount ±√(α/α'), on the basis of the latest inclination α'=$α_1$' of the attention element, and supplies the correction amount to the correction amount multiplication unit 102.

In addition, the correction amount multiplication unit 102 multiplies the correction amount ±√(α/α') from the correction amount generation unit 101 with the signal potential (Vsig)$_n$ of the attention element and corrects the inclination α'=$α_1$' of the attention element with the original inclination α.

The control unit 26 of FIG. 1 sets the entire organic EL elements for the display as the attention elements and a process for converting the signal potential (Vsig)$_n$ of each organic EL element for the display shown by the image signal $S_n$ into the signal potential (Vsig')$_n$ is executed in the inclination correction unit 71.

If a next image signal $S_{n+1}$ is supplied from the signal synthesis unit 22 to the inclination correction unit 71, the control unit 26 of FIG. 1 sequentially pays attention to the organic EL element for the display again and sets the attention paid organic EL element as the attention element.

In this case, the correction amount generation unit 101 reads the signal potential (Vsig)$_n$ of the attention element from the holding unit 74. In addition, the correction amount generation unit 101 calculates the current $I_n$ flowing to the attention element, on the basis of the signal potential (Vsig)$_n$ of the attention element read from the holding unit 74.

In addition, the correction amount generation unit 101 reads the brightness degradation curve corresponding to the calculated current $I_n$ among the plurality of brightness degradation curves held in the degradation curve holding unit 104, from the degradation curve holding unit 104.

That is, for example, when the calculated current $I_n$ is the current I(L=200 nit), the correction amount generation unit 101 reads the brightness degradation curve 121 corresponding to the current I(L=200 nit) from the degradation curve holding unit 104.

In addition, the correction amount generation unit 101 reads the inclination α'=$α_1$' of the attention element from the inclination holding unit 103.

In addition, the correction amount generation unit 101 calculates the latest inclination α'=$α_2$' of the attention element, on the basis of the inclination α'=$α_1$' of the attention element read from the inclination holding unit 103 and the brightness degradation curve 121 read from the degradation curve holding unit 104.

That is, for example, when the inclination α' before the correction is P1(α')=$α_1$' corresponding to a point P1, the correction amount generation unit 101 moves the point P1 on the brightness degradation curve 121 to a point P2 after a passage of the time t2 for which the current $I_n$=I(L=200 nit) has flown to the attention element.

In addition, the correction amount generation unit 101 calculates the inclination P2(α')=$α_2$' corresponding to the point P2 on the brightness degradation curve 121 as the latest inclination α'=$α_2$' of the attention element. The inclination $α_2$' shows the inclination when the current $I_{n-1}$=I (L=200 nit) has flown to the attention element for the time t2, that is, the inclination α'=$α_2$' after degradation by supplying the current $I_{n-1}$, from a state in which the inclination of the attention element is α'=$α_1$'.

The correction amount generation unit 101 supplies the latest inclination α'=P2(α')=$α_2$' of the attention element to the inclination holding unit 103 and holds (stores) the latest inclination by overwriting.

In addition, the correction amount generation unit 101 generates (calculates) a correction amount ±√(α/α'), on the basis of the latest inclination α'=$α_2$' of the attention element, and supplies the correction amount to the correction amount multiplication unit 102.

In addition, the correction amount multiplication unit 102 multiplies the correction amount ±√(α/α') from the correction amount generation unit 101 with the signal potential (Vsig)$_{n-1}$ of the attention element and corrects the inclination α'=$α_2$' of the attention element with the original inclination α.

The control unit 26 of FIG. 1 sets the entire organic EL elements for the display as the attention elements and a process for converting the signal potential (Vsig)$_{n+1}$ shown by the image signal $S_{n+1}$ into the signal potential (Vsig')$_{n+1}$ is executed in the inclination correction unit 71.

If a next image signal $S_{n+2}$ is supplied from the signal synthesis unit 22 to the inclination correction unit 71, the control unit 26 of FIG. 1 sequentially pays attention to the organic EL element for the display again and sets the attention paid organic EL element as the attention element.

In this case, the correction amount generation unit 101 reads the signal potential (Vsig)$_{n+1}$ of the attention element from the holding unit 74. In addition, the correction amount generation unit 101 calculates the current $I_{n+1}$ flowing to the attention element, on the basis of the signal potential $(Vsig)_{n+1}$ of the attention element read from the holding unit 74.

In addition, the correction amount generation unit 101 reads the brightness degradation curve corresponding to the calculated current $I_{n+1}$ among the plurality of brightness degradation curves held in the degradation curve holding unit 104, from the degradation curve holding unit 104.

That is, for example, when the calculated current $I_{n+1}$ is the current I(L=400 nit), the correction amount generation unit 101 reads the brightness degradation curve 122 corresponding to the current I(L=400 nit) from the degradation curve holding unit 104.

In addition, the correction amount generation unit 101 reads the inclination $\alpha'=\alpha_2'$ of the attention element from the inclination holding unit 103.

In addition, the correction amount generation unit 101 calculates the latest inclination $\alpha'=\alpha_3'$ of the attention element, on the basis of the inclination $\alpha'=\alpha_2'$ of the attention element read from the inclination holding unit 103 and the brightness degradation curve 122 read from the degradation curve holding unit 104.

That is, for example, when the inclination $\alpha'$ of the attention element is $P2(\alpha')=\alpha_2'$ corresponding to the point P2, the correction amount generation unit 101 moves the point P1' on the brightness degradation curve 122 corresponding to the inclination $\alpha_2'$ to a point P2' after a passage of the time t3 for which the current $I_{n+1}$=I(L=400 nit) has flown to the attention element.

In addition, the correction amount generation unit 101 calculates the inclination $P2(\alpha')=\alpha_3'$ corresponding to the point P2' on the brightness degradation curve 122 as the latest inclination $\alpha'=\alpha_3'$ of the attention element. The inclination $\alpha_3'$ shows the inclination when the current $I_{n+1}$=I(L=400 nit) has flown to the attention element for the time t3, that is, the inclination $\alpha'=\alpha_3'$ after degradation by supplying the current $I_{n+1}$, from a state in which the inclination of the attention element is $\alpha'=\alpha_2'$.

The correction amount generation unit 101 supplies the latest inclination $\alpha'=P2'(\alpha')=\alpha_3'$ of the attention element to the inclination holding unit 103 and holds (stores) the latest inclination by overwriting.

In addition, the correction amount generation unit 101 generates (calculates) a correction amount $\pm\sqrt{(\alpha/\alpha')}$, on the basis of the latest inclination $\alpha'=\alpha_3'$ of the attention element, and supplies the correction amount to the correction amount multiplication unit 102.

In addition, the correction amount multiplication unit 102 multiplies a correction amount $\pm\sqrt{(\alpha/\alpha')}$ from the correction amount generation unit 101 with the signal potential $(Vsig)_{n+2}$ of the attention element and corrects the inclination $\alpha'=\alpha_3'$ of the attention element with the original inclination $\alpha$.

In addition, the correction amount multiplication unit 102 of the inclination correction unit 71 corrects only the image signal S included in the synthesis signal $C_n$, on the basis of the correction amount from the correction amount generation unit 101.

However, the correction amount multiplication unit 102 may correct the dummy pixel signal included in the synthesis signal $C_n$, similar to the image signal $S_n$.

In this case, the correction amount of the dummy pixel signal that is generated in the correction amount generation unit 101 becomes a correction amount (for example, a value 1) where the inclination is not substantially corrected in the inclination correction unit 71.

For this reason, the correction amount multiplication unit 102 corrects the dummy pixel signal included in the synthesis signal $C_n$, on the basis of the correction amount of the dummy pixel signal from the correction amount generation unit 101, and supplies the same dummy pixel signal as the dummy pixel signal before the correction as the dummy pixel signal after the correction to the gradation correction unit 72.

[With Respect to Estimation Method of Brightness Degradation Curve]

Figure 10:
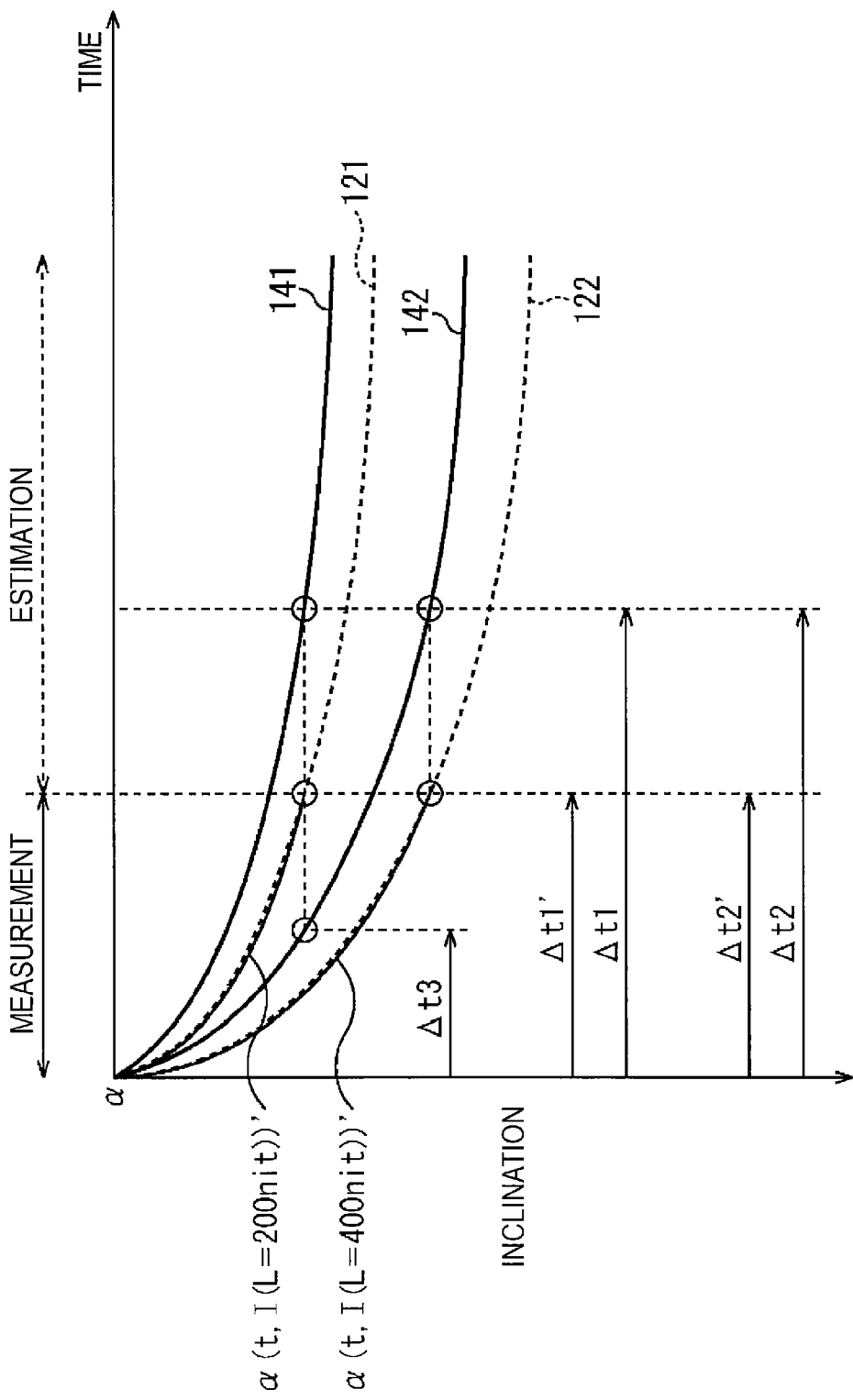
FIG. 10 is a diagram illustrating an example when a brightness degradation curve is estimated.

Next, FIG. 10 illustrates an example when the degradation curve estimation unit 105 estimates the brightness degradation curve, on the basis of the measurement result of the brightness from the brightness sensor 25b.

In FIG. 10, a horizontal axis shows a time and a vertical axis shows an inclination.

First, a method of estimating the brightness degradation curve 121 showing the brightness decrease of the organic EL element for the measurement to which the current I(L=200 nit) flows, in the degradation curve estimation unit 105, will be described.

The brightness degradation curve 121 shows the brightness decrease of the organic EL element for the display and is used when the correction amount is generated by the correction amount generation unit 101. This is based on that the organic EL element for the measurement is manufactured under the same environment as the organic EL element for the display and has the same property as the organic EL element for the display.

For example, the brightness L(t, I(L=200 nit)) obtained by measuring the brightness of the organic EL element for the measurement to which the current I(L=200 nit) flows is supplied from the brightness sensor 25b to the degradation curve estimation unit 105.

Here, the brightness L(t, I(L=200 nit)) shows the brightness measured when the time t passes from the start of the measurement by the brightness sensor 25b.

The degradation curve estimation unit 105 calculates the inclination $\alpha$(t, I(L=200 nit))' for the time t, by a formula $\alpha$(t, I(L=200 nit))'=L(t, I(L=200 nit))/I(L=200 nit)) derived on the basis of the formula 4, on the basis of the value I (L=200 nit) of the current previously held in a built-in memory not illustrated in the drawings and the measurement result L(t, I(L=200 nit)) from the brightness sensor 25b.

In addition, the degradation curve estimation unit 105 previously holds the brightness degradation basis curve 141 in the built-in memory not illustrated in the drawings. The brightness degradation basis curve 141 is an average brightness degradation curve showing the brightness decrease of the organic EL element to which the current I(L=200 nit) flows. For example, the brightness degradation basis curve 141 becomes a basis when the brightness degradation curve 121 is estimated.

In addition, the brightness degradation basis curve 141 is previously generated on the basis of a measurement result obtained by measuring the brightness of any organic EL element assumed as an organic EL element built in the display unit 25 and is held in the built-in memory not illustrated in the drawings in the degradation curve estimation unit 105. This is the same in the other brightness degradation basis curves to be described below.

The degradation curve estimation unit 105 estimates the brightness degradation curve 121 for the organic EL element for the measurement when the current I(L=200 nit) flows, on the basis of the calculated inclination $\alpha$(t, I(L=200 nit))' and the previously held brightness degradation basis curve 141.

That is, for example, the degradation curve estimation unit 105 calculates a time Δt1' until the inclination α(T, I(L=200 nit))' is obtained from when the inclination α(0, I(L=200 nit))'=α is obtained, as illustrated in FIG. 10.

In addition, for example, the degradation curve estimation unit 105 calculates a time Δt1' until the inclination α(T, I(L=200 nit))' is obtained from when the inclination α(0, I(L=200 nit))'=a is obtained, in the brightness degradation basis curve 141, as illustrated in FIG. 10.

In addition, the degradation curve estimation unit 105 calculates an acceleration coefficient Δt1'/Δt1 showing a decrease speed of the inclination α(t, I(L=200 nit))' for the brightness degradation basis curve 141, on the basis of the calculated times Δt1' and Δt1.

The degradation curve estimation unit 105 multiplies the calculated acceleration coefficient Δt1'/Δt1 with a formula A(t, 1(L=200 nit))' showing the brightness degradation basis curve 141 to estimate the brightness degradation curve 121, supplies the brightness degradation curve to the degradation curve holding unit 104, and holds the brightness degradation curve by the degradation curve holding unit.

That is, for example, the degradation curve estimation unit 105 supplies the brightness degradation curve 121 showing a new formula (Δt1'/Δt1)×A(t, I(L=200 nit)) obtained by the multiplication to the degradation curve holding unit 104 and holds the brightness degradation curve by the degradation curve holding unit, in a form of being associated with the value of the current I(L=200 nit).

Next, a method of estimating the brightness degradation curve 122 showing the brightness decrease of the organic EL element for the measurement to which the current I(L=400 nit) flows, in the degradation curve estimation unit 105, will be described. The brightness degradation curve 122 shows the brightness decrease of the organic EL element for the display and is used when the correction amount is generated by the correction amount generation unit 101.

For example, the brightness L(t, I(L=400 nit)) obtained by measuring the brightness of the organic EL element for the measurement to which the current I(L=400 nit) flows is supplied from the brightness sensor 25*b* to the degradation curve estimation unit 105.

Here, the brightness L(t, I(L=400 nit)) shows the brightness measured when the time t passes from the start of the measurement by the brightness sensor 25*b*.

The degradation curve estimation unit 105 calculates the inclination α(t, I(L=400 nit))' for the time t, by a formula α(t, I(L=400 nit))'=L(t, I(L=400 nit))/I(L=400 nit)) derived on the basis of the formula 4, on the basis of the value I(L=400 nit) of the current previously held in a built-in memory not illustrated in the drawings and the measurement result L(t, I(L=400 nit)) from the brightness sensor 25*b*.

In addition, the degradation curve estimation unit 105 previously holds the brightness degradation basis curve 142 in the built-in memory not illustrated in the drawings. The brightness degradation basis curve 142 is an average brightness degradation curve showing the brightness decrease of the organic EL element to which the current I(L=400 nit) flows. For example, the brightness degradation basis curve 142 becomes a basis when the brightness degradation curve 122 is estimated.

The degradation curve estimation unit 105 estimates the brightness degradation curve 122 for the organic EL element for the measurement when the current I(L=400 nit) flows, on the basis of the calculated inclination α(t, I(L=400 nit)) and the previously held brightness degradation basis curve 142.

That is, for example, the degradation curve estimation unit 105 calculates a time Δt2' until the inclination α(T, I(L=400 nit))' is obtained from when the inclination α(0, I(L=400 nit))'=a is obtained, as illustrated in FIG. 10.

In addition, for example, the degradation curve estimation unit 105 calculates a time Δt2 until the inclination α(T, I(L=400 nit))' is obtained from when the inclination α(0, I(L=400 nit))'=α is obtained, in the brightness degradation basis curve 142, as illustrated in FIG. 10.

In addition, the degradation curve estimation unit 105 calculates an acceleration coefficient Δt2'/Δt2 showing a decrease speed of the inclination α(t, I(L=400 nit))' for the brightness degradation basis curve 142, on the basis of the calculated times Δt2' and Δt2.

The degradation curve estimation unit 105 multiplies the calculated acceleration coefficient Δt2'/Δt2 with a formula A(t, I(L=400 nit)) showing the brightness degradation basis curve 142 to estimate the brightness degradation curve 122, supplies the brightness degradation curve to the degradation curve holding unit 104, and holds the brightness degradation curve by the degradation curve holding unit.

That is, for example, the degradation curve estimation unit 105 supplies the brightness degradation curve 122 showing a new formula (Δt2'/Δt2)×A(t, I(L=400 nit)) obtained by the multiplication to the degradation curve holding unit 104 and holds the brightness degradation curve by the degradation curve holding unit, in a form of being associated with the value of the current I(L=400 nit).

In addition, the degradation curve estimation unit 105 previously holds the plurality of brightness degradation basis curves (for example, the brightness degradation basis curves 141 and 142) in the built-in memory not illustrated in the drawings.

However, when the degradation curve estimation unit 105 estimates the brightness degradation curve for the organic EL element for the measurement to which the current I(L=Xnit) flows, for each of a plurality of different currents I(L=Xnit) (X is any positive integer), it is necessary to hold brightness degradation basis curves of the number corresponding to the number of the plurality of different currents I(L=Xnit) in the built-in memory.

In this case, it is necessary to increase a storage capacity of the memory according to the number of brightness degradation basis curves.

Therefore, in the degradation curve estimation unit 105, any brightness degradation basis curve of the plurality of brightness degradation basis curves may be held as a master curve that can be used even when any brightness degradation curve is estimated and the storage capacity of the memory may be saved.

That is, for example, when the brightness degradation basis curve 142 is held as the master curve in the memory not illustrated in the drawings in the degradation curve estimation unit 105, the brightness degradation curve 121 is estimated as follows.

The degradation curve estimation unit 105 estimates the brightness degradation curve 121 for the organic EL element for the measurement when the current I(L=200 nit) flows, on the basis of the inclination α(t, I(L=200 nit))' calculated as described above and the previously stored brightness degradation basis curve 142 functioning as the master curve.

That is, for example, the degradation curve estimation unit 105 calculates a time Δt1' until the inclination α(T, I(L=200 nit))' is obtained from when the inclination α(0, I(L=200 nit))'=α is obtained, as illustrated in FIG. 10.

In addition, for example, the degradation curve estimation unit 105 calculates a time Δt3 until the inclination α(T, I(L=200 nit))' is obtained from when the inclination α(0, I(L=200 nit))'=α is obtained, in the brightness degradation basis curve 142 functioning as the master curve, as illustrated in FIG. 10.

In addition, the degradation curve estimation unit 105 calculates an acceleration coefficient Δt1'/Δt3 showing a decrease speed of the inclination α(t, I(L=200 nit))' for the brightness degradation basis curve 142, on the basis of the calculated times Δt1' and Δt3.

The degradation curve estimation unit 105 multiplies the calculated acceleration coefficient Δt1'/Δt3 with a formula A (t, I(L=400 nit)) showing the brightness degradation basis curve 142 functioning as the master curve to estimate the brightness degradation curve 121, supplies the brightness degradation curve to the degradation curve holding unit 104, and holds the brightness degradation curve by the degradation curve holding unit.

That is, for example, the degradation curve estimation unit 105 supplies the brightness degradation curve 121 showing a new formula (Δt1'/Δt3)×A(t, I(L=400 nit)) obtained by the multiplication to the degradation curve holding unit 104 and holds the brightness degradation curve by the degradation curve holding unit, in a form of being associated with the value of the current I(L=400 nit).

In addition, the master curve is not limited to the brightness degradation basis curve 142 and any brightness degradation basis curve may be adopted.

[Detail of Gradation Correction Unit]

Figure 11:
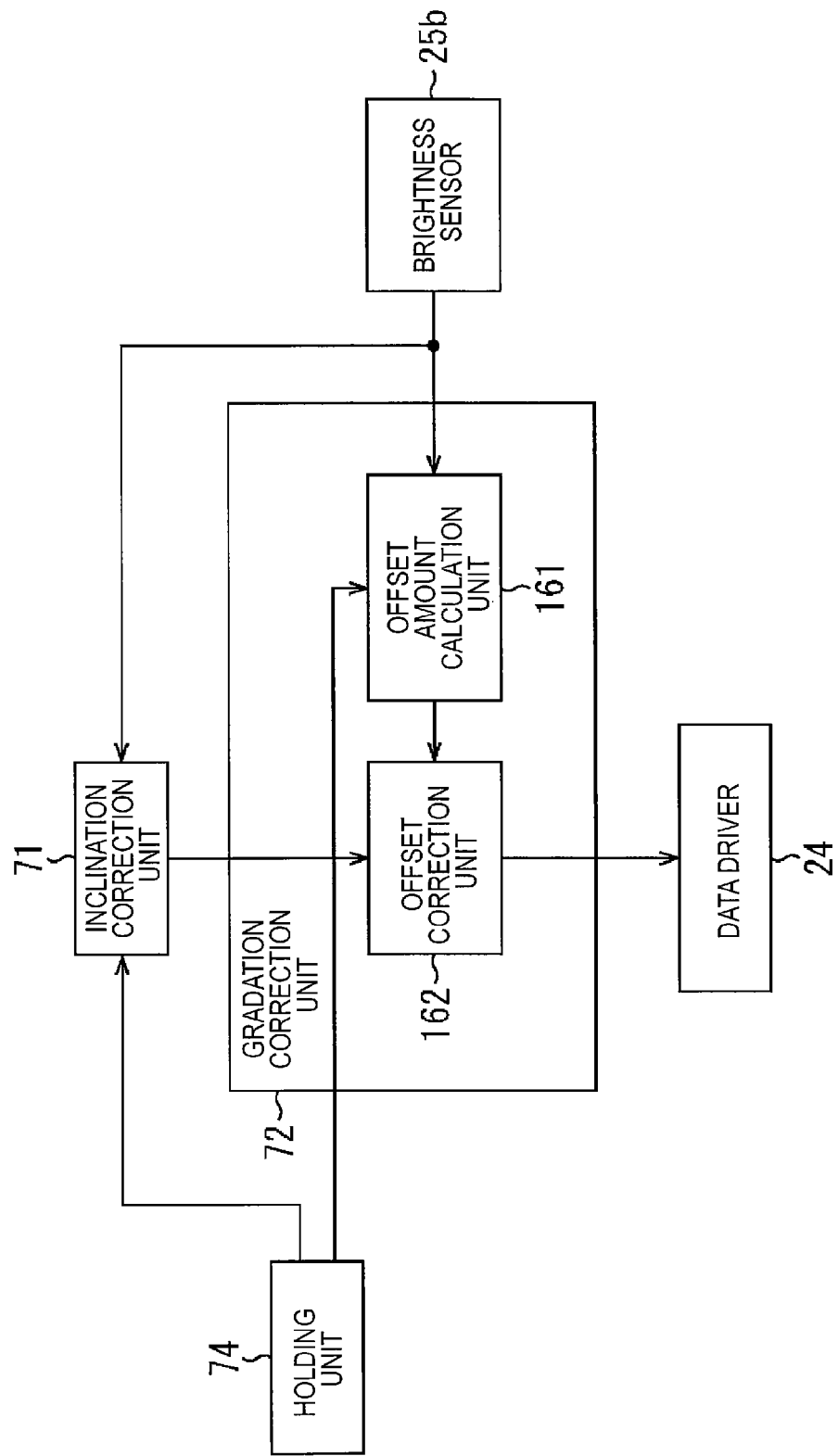
FIG. 11 is a block diagram illustrating a detailed configuration example of a gradation correction unit of FIG. 6.

Next, FIG. 11 illustrates a detailed configuration example of the gradation correction unit 72 of FIG. 6.

The gradation correction unit 72 includes an offset amount calculation unit 161 and an offset correction unit 162.

A measurement result of the brightness is supplied from the brightness sensor 25b to the offset amount calculation unit 161.

The offset amount calculation unit 161 reads the signal potential (Vsig)$_n$ of the attention element from the holding unit 74.

In addition, the offset amount calculation unit 161 calculates an offset amount (ΔVsig)$_n$ added to the signal potential (Vsig)$_n$ of the attention element, on the basis of the read signal potential (Vsig), of the attention element, the information for offset amount calculation previously stored in the memory not illustrated in the drawings, and the measurement result of the brightness from the brightness sensor 25b, and supplies the offset amount to the offset correction unit 162.

A method of calculating the offset amount by the offset amount calculation unit 161 will be described in detail with reference to FIG. 12.

The offset correction unit 162 adds (Vsig)$_n$ of the signal potential (Vsig')$_n$ (={±√(α/α')×(Vsig)$_n$}) of the attention element from the inclination correction unit 71 and the offset amount (ΔVsig)$_n$ from the offset amount calculation unit 161.

The offset correction unit 162 supplies a signal potential [±√(α/α')×{(Vsig)$_n$+(ΔVsig)$_n$}] obtained as an addition result thereof as a signal potential (Vsig")$_n$ of the attention element to the data driver 24.

In addition, the offset correction unit 162 of the gradation correction unit 72 corrects only the image signal S$_n$ included in the synthesis signal C$_n$, on the basis of the offset amount from the offset amount calculation unit 161.

However, the offset correction unit 162 may correct the dummy pixel signal included in the synthesis signal C$_n$, similar to the image signal S$_n$.

In this case, the offset amount for the dummy pixel signal that is calculated in the offset amount calculation unit 161 becomes an offset amount (for example, a value 0) where the gradation is not substantially corrected in the gradation correction unit 72.

For this reason, the offset correction unit 162 corrects the dummy pixel signal included in the synthesis signal C$_n$, on the basis of the offset amount for the dummy pixel signal from the offset amount calculation unit 161, and supplies the same dummy pixel signal as the dummy pixel signal before the correction as the dummy pixel signal after the correction to the data driver 24.

[With Respect to Calculation of Offset Amount]

Figure 12:
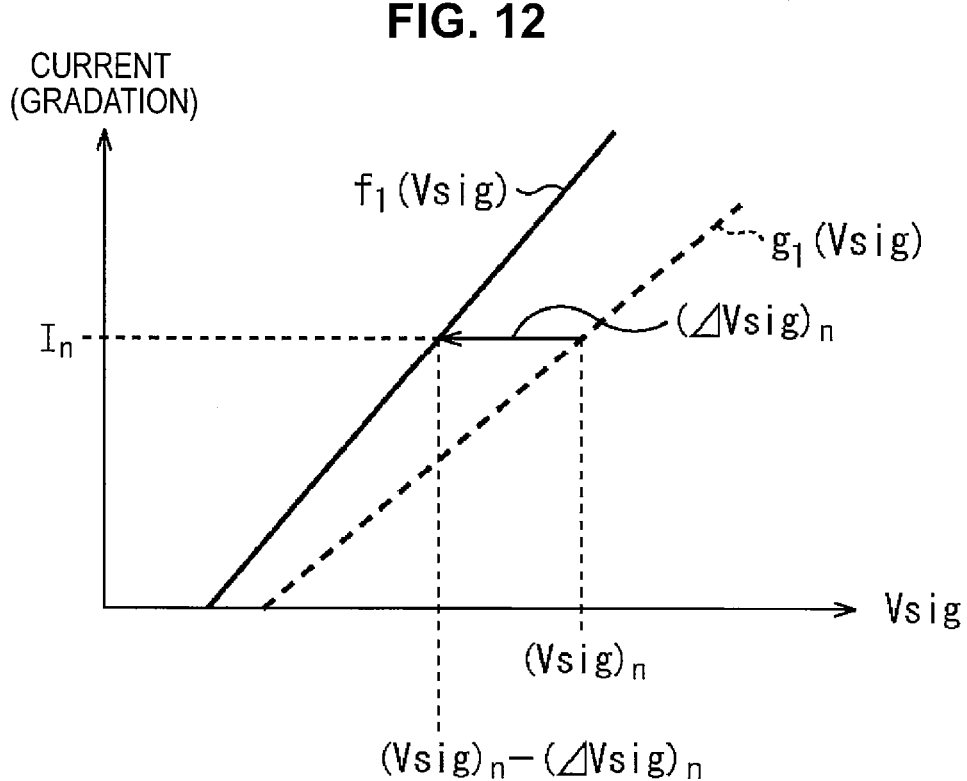
FIG. 12 is a diagram illustrating an example when an offset amount is calculated.

Next, FIG. 12 illustrates an example when the offset amount calculation unit 161 of FIG. 11 calculates an offset amount.

In FIG. 12, a function $f_1$(Vsig) is a function showing a relation of the signal potential Vsig and the current I before degradation of the current.

The function $f_1$(Vsig) is previously held as the information for the offset amount calculation in the memory not illustrated in the drawings in the offset amount calculation unit 161.

In addition, the function $f_1$(Vsig) is previously generated on the basis of the measurement result obtained by measuring the brightness of any organic EL element assumed as an organic EL element built in the display unit 25 and is held in the built-in memory not illustrated in the drawings in the offset amount calculation unit 161.

In addition, the function $f_1$(Vsig) may be generated by the offset amount calculation unit 161, on the basis of the measurement result obtained before degradation of the current arises at the organic EL element for the measurement included in the display unit 25 and measured by the brightness sensor 25b, and may be held in the built-in memory not illustrated in the drawings.

In FIG. 12, a function $g_1$(Vsig) is a function showing a relation of the signal potential Vsig and the current I after the degradation of the current.

The function $g_1$(Vsig) is generated by the offset amount calculation unit 161, on the basis of the measurement result of the brightness from the brightness sensor 25b. In FIG. 12, a horizontal axis shows Vsig and a vertical axis shows a current (gradation).

The offset amount calculation unit 161 calculates the function $g_1$(Vsig) by a least-squares method, on the basis of the measurement result of the brightness from the brightness sensor 25b.

In addition, the offset amount calculation unit 161 reads the signal potential (Vsig)$_n$ of the attention element from the holding unit 74. In addition, the offset amount calculation unit 161 calculates the current $I_n=g_1((Vsig)_n)$, on the basis of the read signal potential (Vsig)$_n$.

In addition, the offset amount calculation unit 161 generates an equality $I_n=g((Vsig)_n)=f_1((Vsig)_n-(ΔVsig)_n)$, on the basis of the read signal potential (Vsig)$_n$ of the attention element, the function $f_1$(Vsig) previously held in the built-in memory not illustrated in the drawings, and the calculated $I_n=g_1((Vsig)_n)$.

In addition, the offset amount calculation unit 161 solves the generated equality $I_n=g_1((Vsig)_n)=f((Vsig)_n-(ΔVsig)_n)$ for the offset amount (ΔVsig)$_n$, generates the offset amount (ΔVsig)$_n$, and supplies the offset amount to the offset correction unit 162.

However, the offset amount (ΔVsig)$_n$ is different for each signal potential (Vsig)$_n$ of the attention element. That is, for example, as illustrated in FIG. 12, when the signal potential $(Vsig)_n$ of the attention element increases, the offset amount $(\Delta Vsig)_n$ also increases.

Therefore, the offset amount calculation unit 161 needs to calculate the offset amount $(\Delta Vsig)_n$ for each signal potential $(Vsig)_n$ of the attention element.

Therefore, in a third embodiment to be described below, the signal potential $(Vsig)_n$ of the attention element and the offset amount $(\Delta Vsig)_n$ are added in a gamma space and the gradation can be corrected with the same offset amount $(\Delta Vsig)_n$ in any signal potential (Vsig), of the organic EL element for the display set as the attention element. The third embodiment will be described in detail with reference to FIGS. 30 to 33.

[Detail of Display Unit 25]

Next, the detail of the display unit 25 will be described with reference to FIGS. 13 to 17.

Figure 13:
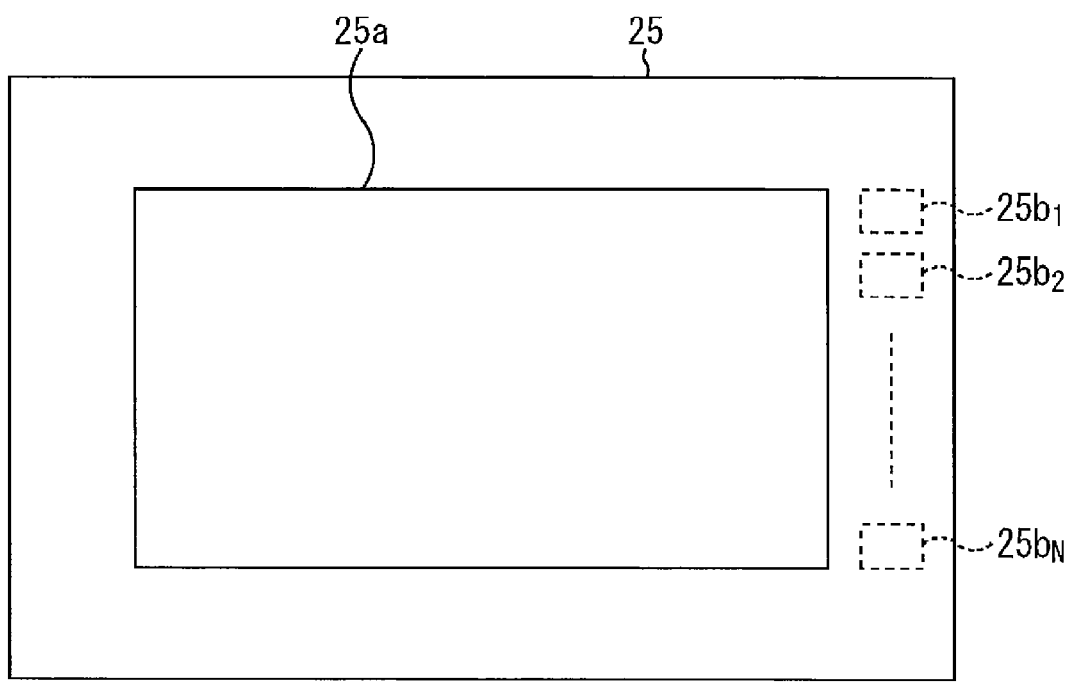
FIG. 13 is a front view of a display unit of FIG. 1.

FIG. 13 illustrates a front view of the display unit 25.

The display unit 25 is made of a three-dimensional casing with a rectangular shape and a pixel circuit including an organic EL element is built in the casing.

In addition, in the display unit 25, a display screen 25a is provided at the center of the casing, as illustrated in FIG. 13. In FIG. 13, in the display unit 25, a plurality of brightness sensors $25b_1$ to $25b_M$ are arranged to be built in the casing, at a right side of the display screen 25a.

Figure 14:
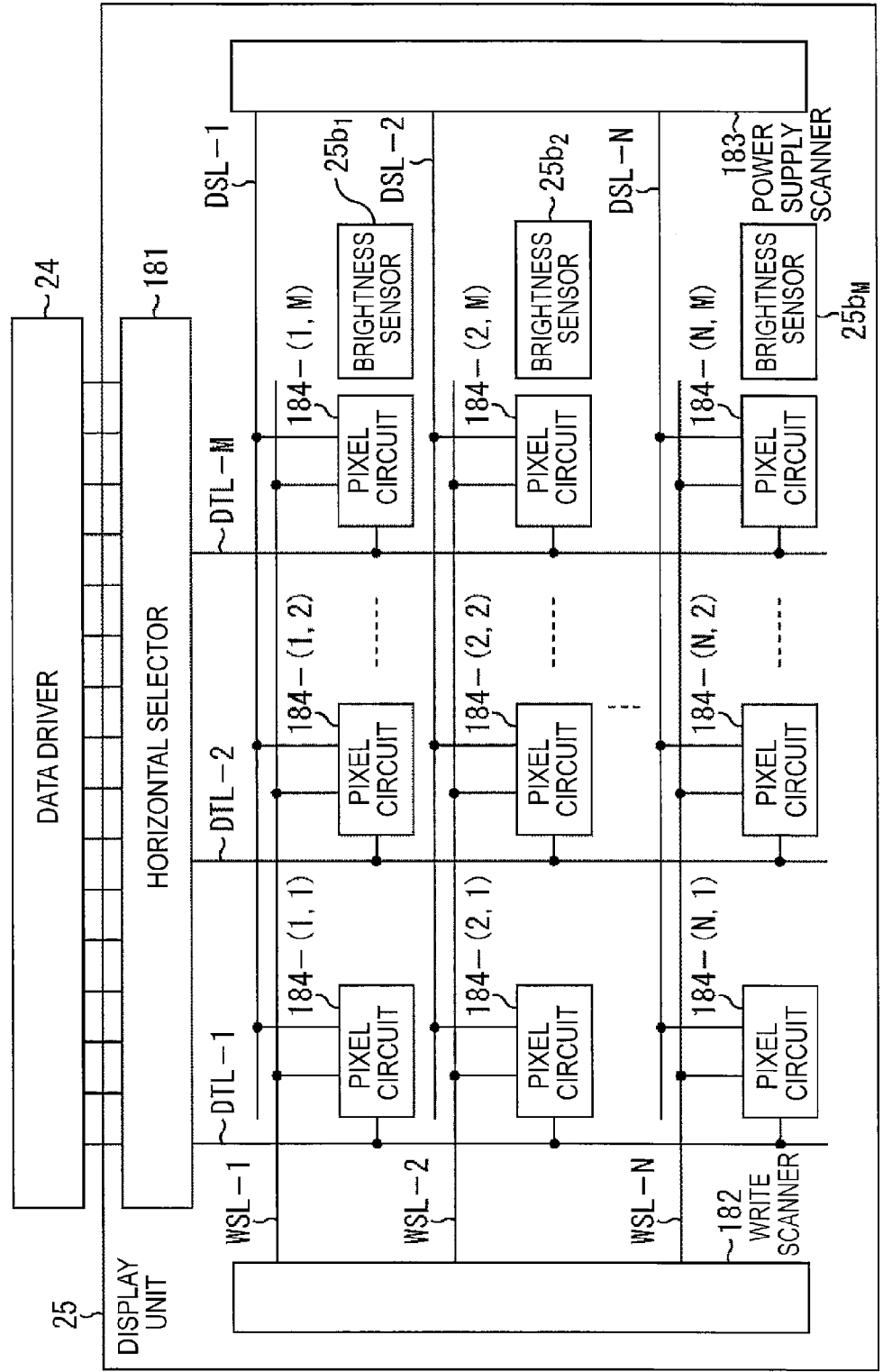
FIG. 14 is a block diagram illustrating a detailed configuration example of a display unit of FIG. 1.

FIG. 14 illustrates a detailed configuration example of the display unit 25.

The display unit 25 has a horizontal selector 181, a write scanner 182, a power supply scanner (drive scanner) 183, pixel circuits 184-(1, 1) to 184-(N, M) including organic EL elements, and brightness sensors $25b_1$ to $25b_M$ are built therein.

The organic EL elements that are included in the pixel circuit 184-(1, M), the pixel circuit 184-(2, M), . . . , and the pixel circuit 184-(N, M) among the pixel circuits 184-(1, 1) to 184-(N, M) are the organic EL elements for the measurement.

In addition, the organic EL elements that are included in the plurality of pixel circuits other than the pixel circuit 184-(1, M), the pixel circuit 184-(2, M), . . . , and the pixel circuit 184-(N, M) among the pixel circuits 184-(1, 1) to 184-(N, M) are the organic EL elements for the display.

The pixel circuits 184-(1, 1) to 184-(N, M) are configured by arranging the N×M (N and M are integer values of 1 or more independent from each other) pixel circuits 184 in a matrix. The horizontal selector 181, the write scanner 182, and the power supply scanner 183 are operated as a driving unit to drive the pixel circuits 184-(1, 1) to 184-(N, M).

In addition, the display unit 25 has N scanning lines WSL-1 to WSL-N,N power supply lines DSL-1 to DSL-N, and M video signal lines DTL-1 to DTL-M.

In the following description, when it is not necessary to distinguish the scanning lines WSL-1 to WSL-N from each other, the scanning lines WSL-1 to WSL-N are simply referred to as the scanning lines WSL. In addition, when it is not necessary to distinguish the power supply lines DSL-1 to DSL-N from each other, the power supply lines DSL-1 to DSL-N are simply referred to as the power supply lines DSL.

In addition, when it is not necessary to distinguish the video signal lines DTL-1 to DTL-M from each other, the video signal lines DTL-1 to DTL-M are simply referred to as the video signal lines DTL. In addition, when it is not necessary to distinguish the pixel circuits 184-(1, 1) to 184-(N, M) from each other, the pixel circuits 184-(1, 1) to 184-(N, M) are simply referred to as the pixel circuits 184.

In addition, the pixel circuits 184-(1, x) to 184-(N, x) of the x-th column (x=1, 2, . . . , and M) among the pixel circuits 184-(1, 1) to 184-(N, M) are connected to the horizontal selector 181 by the video signal line DTL-x.

The write scanner 182 sequentially supplies a control signal to the scanning lines WSL-1 to WSL-N with a horizontal period (1H) and line-sequentially scans the pixel circuits 184 in a row unit. The power supply scanner 183 supplies a power supply voltage of a first potential (Vcc to be described below) or a second potential (Vss to be described below) to the power supply lines DSL-1 to DSL-N according to the line-sequential scanning. The horizontal selector 181 switches a signal potential corresponding to a reference potential Vofs and a signal potential Vsig corresponding to an image signal (when the organic EL element included in the pixel circuit 184 is the organic EL element for the measurement, the dummy pixel signal is used, instead of the image signal) in each horizontal period (1H) according to the line-sequential scanning and supplies the reference potential and the signal potential to the video signal lines DTL-1 to DTL-M of a column shape.

The brightness sensor $25b_1$ is provided near the pixel circuit 184-(1, M) and measures the brightness of the organic EL element included in the pixel circuit 184-(1, M) and supplies the brightness to the burn-in correction unit 23 of FIG. 1.

The brightness sensors $25b_2$ to $25b_M$ are provided near the pixel circuits 184-(2, M) to 184-(N, M), respectively, and execute the same process as the brightness sensor $25b_1$.

When it is not necessary to distinguish the brightness sensors $25b_1$ to $25b_M$ from each other, the brightness sensors $25b_1$ to $25b_M$ are simply referred to as the brightness sensors 25b.

Figure 15:
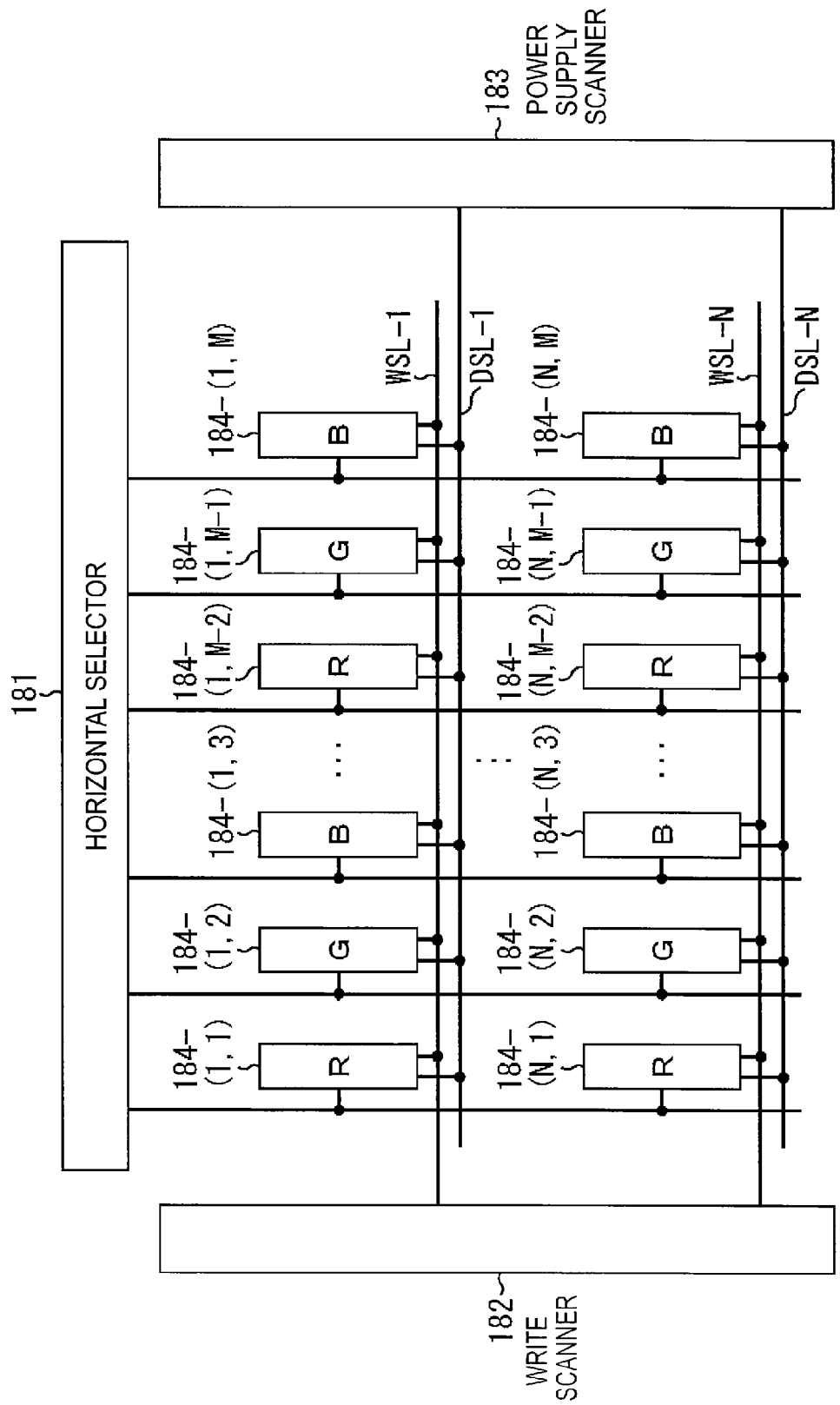
FIG. 15 is a block diagram illustrating an example of an array of light emission colors of a pixel circuit of FIG. 14.

FIG. 15 illustrates an example of an array of light emission colors of the pixel circuit 184.

The pixel circuit 184 corresponds to a so-called sub-pixel that emits light with any color of red (R), green (G), and blue (B), using the organic EL element as a built-in light emitting element. One pixel (1 pixel of a display image) of a display unit is configured from three pixel circuits 184 of red, green, and blue arranged in a row direction (horizontal direction in the drawings).

In addition, FIG. 15 is different from FIG. 14 in that the scanning line WSL and the power supply line DSL are connected from the lower side of the pixel circuit 184. A wiring line that is connected to the horizontal selector 181, the write scanner 182, the power supply scanner 183, and each pixel circuit 184 can be arranged at an appropriate position according to necessity.

[Configuration of Pixel Circuit 184]

Figure 16:
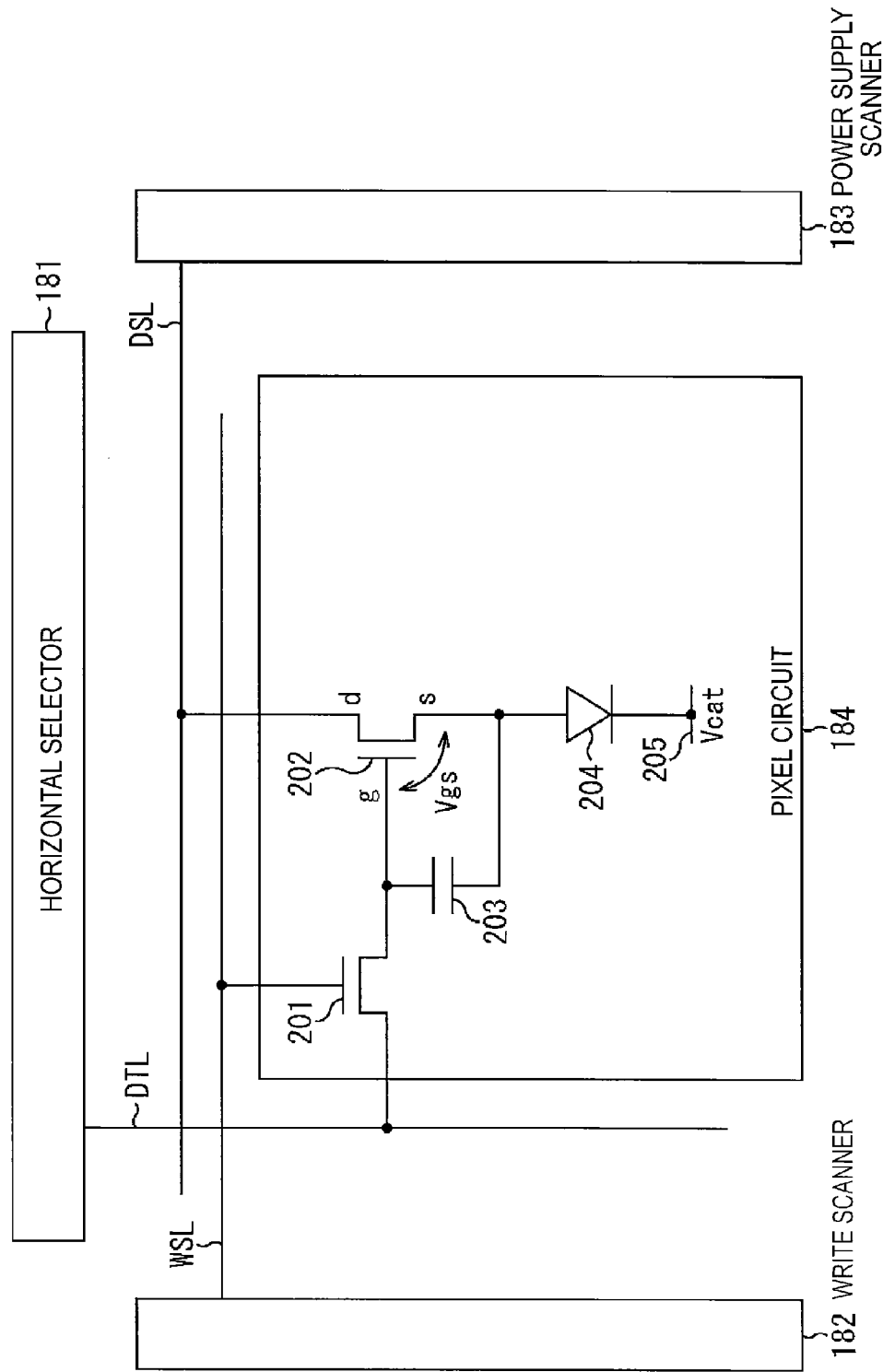
FIG. 16 is a diagram illustrating a detailed configuration example of a pixel circuit of FIG. 14.

FIG. 16 illustrates a detailed configuration example of the pixel circuit 184.

The pixel circuit 184 has a sampling transistor 201, a driving transistor 202, a storage capacitor 203, and a light emitting element 204. A gate of the sampling transistor 201 is connected to the scanning line WSL, a drain of the sampling transistor 201 is connected to the video signal line DTL, and a source is connected to a gate g of the driving transistor 202.

One of a source and a drain of the driving transistor 202 is connected to an anode of the light emitting element 204 and the other is connected to the power supply line DSL. The storage capacitor 203 is connected to the gate g of the driving transistor 202 and the anode of the light emitting element 204. In addition, a cathode of the light emitting element 204 is connected to a wiring line 205 set to a predetermined potential Vcat. The potential Vcat is at a GND level. Therefore, the wiring line 205 is a ground wiring line.

Each of the sampling transistor 201 and the driving transistor 202 is an N channel type transistor. Therefore, the sampling transistor 201 and the driving transistor 202 can be made of amorphous silicon cheaper than low temperature polysilicon. Thereby, a manufacturing cost of the pixel circuit 184 can be further decreased. Of course, the sampling transistor 201 and the driving transistor 202 can be made of the low temperature polysilicon or monocrystal silicon.

The light emitting element 204 is an organic EL element. The organic EL element is a current light emitting element that has a diode characteristic. Therefore, the light emitting element 204 performs light emission of a gradation according to a supplied current value Ids.

In the pixel circuit 184 configured as described above, the sampling transistor 201 is turned on (supplied with a current) according to a control signal from the scanning line WSL and samples a video signal of the signal potential Vsig according to the gradation through the video signal line DTL. The storage capacitor 203 accumulates a charge supplied from the horizontal selector 181 through the video signal line DTL and holds the charge. The driving transistor 202 receives a current supplied from the power supply line DSL of the first potential Vcc and flows (supplies) a driving current Ids to the light emitting element 204 according to the signal potential Vsig held in the storage capacitor 203. The predetermined driving current Ids flows to the light emitting element 204, so that the light emitting element 204 emits light.

The pixel circuit 184 has a threshold correction function. The threshold correction function is a function of holding a voltage corresponding to a threshold voltage Vth of the driving transistor 202 in the storage capacitor 203. By showing the threshold correction function, an influence of the threshold voltage Vth of the driving transistor 202 becoming the cause of a variation of each pixel of the display unit 25 can be cancelled.

In addition to the above-described threshold correction function, the pixel circuit 184 has a mobility correction function. The mobility correction function is a function of applying correction for the mobility t of the driving transistor 202 to the signal potential Vsig, when the signal potential Vsig is held in the storage capacitor 203.

In addition, the pixel circuit 184 has a bootstrap function. The bootstrap function is a function of linking the variation of the source potential Vs of the driving transistor 202 with the gate potential Vg. By showing the bootstrap function, a voltage Vgs between the gate and the source of the driving transistor 202 can be constantly maintained.

[Explanation of Operation of Pixel Circuit 184]

Figure 17:
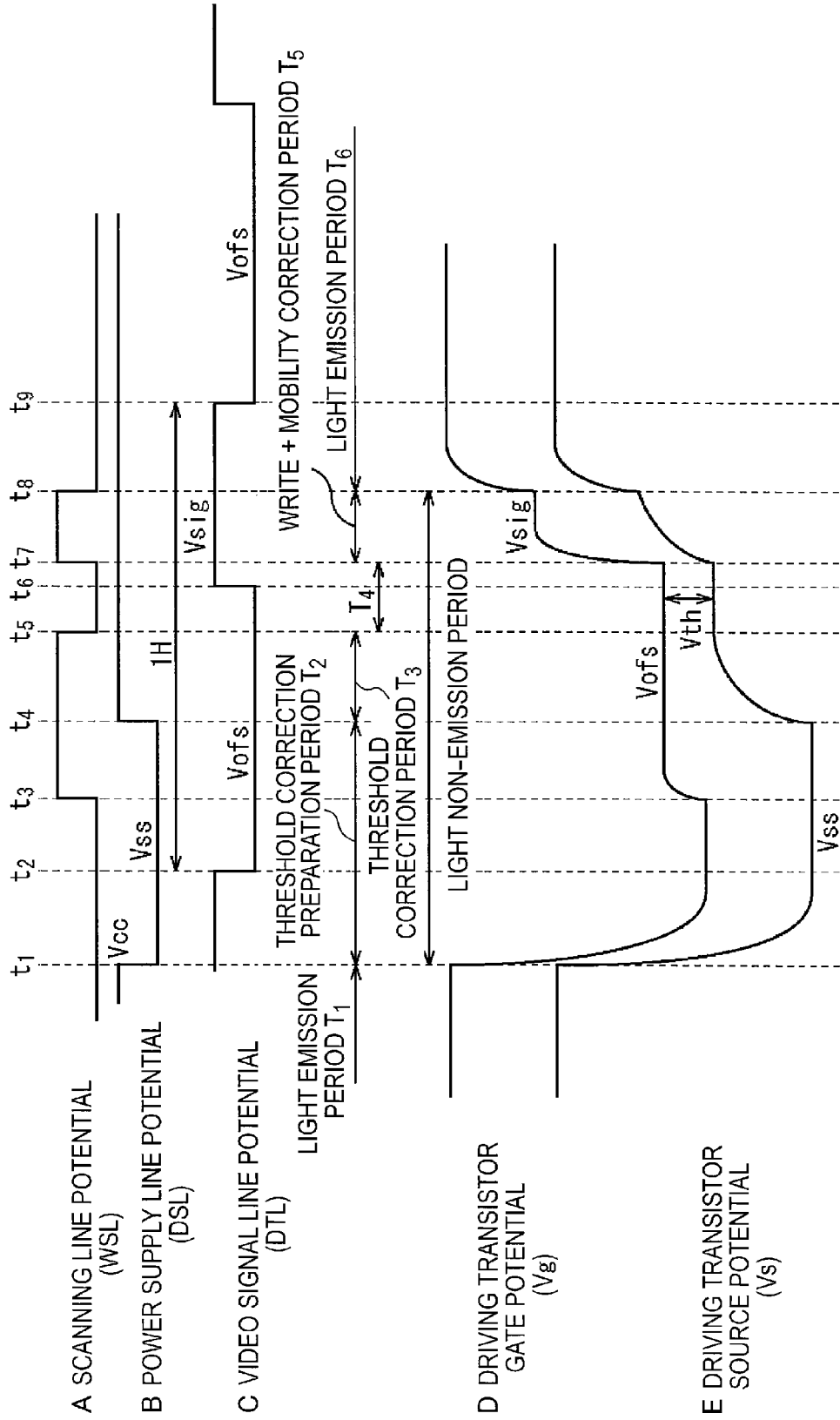
FIG. 17 is a timing chart illustrating an operation of a pixel circuit of FIG. 14.

FIG. 17 is a timing chart illustrating an operation of the pixel circuit 184.

A of FIG. 17 to E of FIG. 17 illustrate changes of the potentials of the scanning line WSL, the power supply line DSL, and the video signal line DTL for the same time axis (horizontal direction in the drawings) and changes of the gate potential Vg and the source potential Vs of the driving transistor 202 corresponding to the changes.

In FIG. 17, a period until a time t1 is a light emission period T1 in which light emission of a previous horizontal period (1H) is performed.

A period until a time t4 from the time t1 when the light emission period T1 has ended is a threshold correction preparation period T2 in which a preparation for a threshold voltage correction operation is performed by initializing the gate potential Vg and the source potential Vs of the driving transistor 202.

In the threshold correction preparation period T2, at the time t1, the power supply scanner 183 switches the potential of the power supply line DSL from the first potential Vcc to be a high potential to the second potential Vss to be a low potential. In addition, at the time t2, the horizontal selector 181 switches the potential of the video signal line DTL from the signal potential Vsig to the reference potential Vofs. Next, at the time t3, the write scanner 182 switches the potential of the scanning line WSL into the high potential and turns on the sampling transistor 201. Thereby, the gate potential Vg of the driving transistor 202 is reset to the reference potential Vofs and the source potential Vs is reset to the second potential Vss of the video signal line DTL.

A period from the time t4 to the time t5 is a threshold correction period T3 in which the threshold correction operation is performed. In the threshold correction period T3, at the time t4, the potential of the power supply line DSL is switched into the high potential Vcc by the power supply scanner 183 and the voltage corresponding to the threshold voltage Vth is written to the storage capacitor 203 connected between the gate and the source of the driving transistor 202.

In a write+mobility correction preparation period T4 from the time t5 to the time t7, the potential of the scanning line WSL is switched once from the high potential to the low potential. In addition, at the time t6 before the time t7, the horizontal selector 181 switches the potential of the video signal line DTL from the reference potential Vofs to the signal potential Vsig according to the gradation.

In addition, in a write+mobility correction preparation period T5 from the time t7 to the time t8, writing of the video signal and a mobility correction operation are performed. That is, in the period from the time t7 to the time t8, the potential of the scanning line WSL is set to the high potential. Thereby, the signal potential Vsig corresponding to the video signal is written to the storage capacitor 203 in a form of being added to the threshold voltage Vth. In addition, a voltage $\Delta V\mu$ for mobility correction is subtracted from a voltage held in the storage capacitor 33.

At a time t8 after the write+mobility correction period T5 ends, the potential of the scanning line WSL is set to the low potential. Hereinafter, in a light emission period T6, the light emitting element 204 emits light at the light emission brightness according to the signal voltage Vsig. Because the signal voltage Vsig is adjusted by the voltage corresponding to the threshold voltage Vth and the voltage $\Delta V\mu$ for the mobility correction, the light emission brightness of the light emitting element 204 is not affected by a variation of the threshold voltage Vth or the mobility of the driving transistor 202.

In the light emission period T6, first, the bootstrap operation is performed and the gate potential Vg and the source potential Vs of the driving transistor 32 increase in a state in which a voltage Vgs=Vsig+Vth−$\Delta V\mu$ between the gate and the source of the driving transistor 202 is constantly maintained.

In addition at a time t9 after a predetermined time passes from the time t8, the potential of the video signal line DTL decreases from the signal potential Vsig to the reference potential Vofs. In FIG. 17, a period from the time t2 to the time t9 corresponds to a horizontal period (1H).

In this way, each pixel circuit 184 of the display unit 25 can cause the light emitting element 204 to emit light, without being affected by the variation of the threshold voltage Vth or the mobility j of the driving transistor 202.

[Explanation of Operation of Display Device 1]

Next, a display process (hereinafter, referred to as a first display process) executed by the display device 1 of FIG. 1 will be described with reference to a flowchart of FIG. 18.

The first display process starts when a power supply of the display device 1 is turned on.

In step S1, the dummy pixel signal generation unit 21 generates the dummy pixel signal to cause the organic EL element for the measurement built in the display unit 25 to emit light and supplies the dummy pixel signal to the signal synthesis unit 22.

In step S2, the signal synthesis unit 22 synthesizes the image signal from the outside and the dummy pixel signal from the dummy pixel signal generation unit 21 and supplies a synthesis signal obtained as a result thereof to the burn-in correction unit 23.

In step S3, the control unit 26 sequentially pays attention to the organic EL element for the display included in the display unit 25 and sets the attention paid organic EL element as the attention element.

In step S4, the detection unit 73 of the burn-in correction unit 23 detects the signal potential $(Vsig)_n$ of the attention element, on the basis of the image signal $S_n$ included in the synthesis signal $C_n$ from the signal synthesis unit 22, supplies the signal potential to the holding unit 74, and holds the signal potential by the holding unit.

In step S5, the inclination correction unit 71 of the burn-in correction unit 23 executes the inclination correction process for multiplying the signal potential $(Vsig)_n$ of the attention element supplied from the signal synthesis unit 22 with the correction amount $\pm\sqrt{(\alpha/\alpha')}$ and correcting the inclination $\alpha'$ of the attention element with the original inclination $\alpha$. The detail of the inclination correction process will be described with reference to a flowchart of FIG. 19.

The inclination correction unit 71 supplies the signal potential $(Vsig')_n=(\pm\sqrt{(\alpha/\alpha')}\times(Vsig)_n)$ of the attention element after the correction in the inclination correction process to the gradation correction unit 72.

In step S6, the gradation correction unit 72 executes the gradation correction process for adding $(\Delta Vsig)_n$ corresponding to the offset amount to $(Vsig)_n$ of the signal potential $(Vsig')_n(=\pm\sqrt{(\alpha/\alpha')}\times(Vsig)_n)$ of the attention element supplied from the inclination correction unit 71 and correcting the gradation $(k-\Delta k)$ of the attention element with the original gradation k. The detail of the gradation correction process will be described with reference to a flowchart of FIG. 20.

In step S7, the control unit 26 determines whether the entire organic EL elements for the display included in the display unit 25 have been set as the attention elements and when it is determined that the entire organic EL elements for the display have not been set as the attention elements, the control unit 26 returns the process to step S3.

In addition, in step S3, the control unit 26 pays attention to the organic EL element not yet set as the attention element among the organic EL elements for the display included in the display unit 25, sets the attention paid organic EL element as a new attention element, and causes the process to proceed to step S4. Hereinafter, the same process is repeated.

In step S7, when it is determined that the entire organic EL elements for the display included in the display unit 25 have been set as the attention elements, the control unit 26 causes the process to proceed to step S8.

After the entire organic EL elements for the display are set as the attention elements, the synthesis signal $C_n$ including the image signal $S_n$ showing the signal potential $(Vsig'')_n=$ $[\pm\sqrt{(\alpha/\alpha')}\times\{(Vsig)_n+(\Delta Vsig)_n\}]$ of the organic EL element set as the attention element is supplied to the data driver 24.

In step S8, the data driver 24 executes the AD conversion for the synthesis signal $C_n$ from the burn-in correction unit 23 and supplies the synthesis signal $C_n$ after the AD conversion to the display unit 25.

In step S9, the display unit 25 causes the organic EL element for the display to emit light, on the basis of the image signal $S_n$ included in the synthesis signal $C_n$ from the data driver 24. Thereby, the display image 41 corresponding to the image signal is displayed on the display screen 25a.

In addition, the display unit 25 causes the organic EL element for the measurement to emit light, on the basis of the dummy pixel signal included in the synthesis signal from the data driver 24.

In step S10, the brightness sensor 25b receives the light from the pixel circuit 184 including the organic EL element for the measurement, measures the brightness of the organic EL element for the measurement, and supplies the measurement result thereof to the inclination correction unit 71 and the gradation correction unit 72 of the burn-in correction unit 23. The brightness sensor 25b is provided near the pixel circuit 184 including the organic EL element for the measurement.

In step S11, the inclination correction unit 71 executes the degradation curve estimation process for estimating the brightness degradation curve for the organic EL element for the display built in the display unit 25, on the basis of the measurement result of the brightness from the brightness sensor 25b, and holding the brightness degradation curve. The degradation curve estimation process will be described in detail with reference to a flowchart of FIG. 20.

After step S11 ends, the process returns to step S1 and the same process is executed hereinafter.

The first display process ends when the power supply of the display device 1 is turned off.

As described above, according to the first display process, the burn-in correction unit 23 executes the burn-in correction process for the image signal included in the synthesis signal from the signal synthesis unit 22.

For this reason, according to the first display process, the organic EL element for the display emits light at the constant brightness according to the image signal, regardless of the efficiency degradation and the current degradation.

Therefore, the burn-in can be prevented from arising at the display screen 25a of the display unit 25.

In addition, according to the first display process, the burn-in correction process is not executed for the dummy pixel signal included in the synthesis signal and the dummy pixel signal is output from the burn-in correction unit 23 to the data driver 24.

For this reason, the organic EL element for the measurement emits light at the brightness decreasing according to the efficiency degradation and the current degradation. In addition, the brightness sensor 25b measures the decrease of the brightness of the organic EL element for the measurement and supplies the measurement result thereof to the burn-in correction unit 23.

Therefore, in the burn-in correction unit 23, the decrease of the brightness of the organic EL element for the measurement can be accurately recognized as the decrease of the brightness of the organic EL element for the display, on the basis of the measurement result of the brightness from the brightness sensor 25b. For this reason, the burn-in correction unit 23 can precisely prevent the burn-in from arising at the display screen 25a, on the basis of the accurate decrease degree of the brightness.

[Detail of Inclination Correction Process Executed by Inclination Correction Unit 71]

Figure 18:
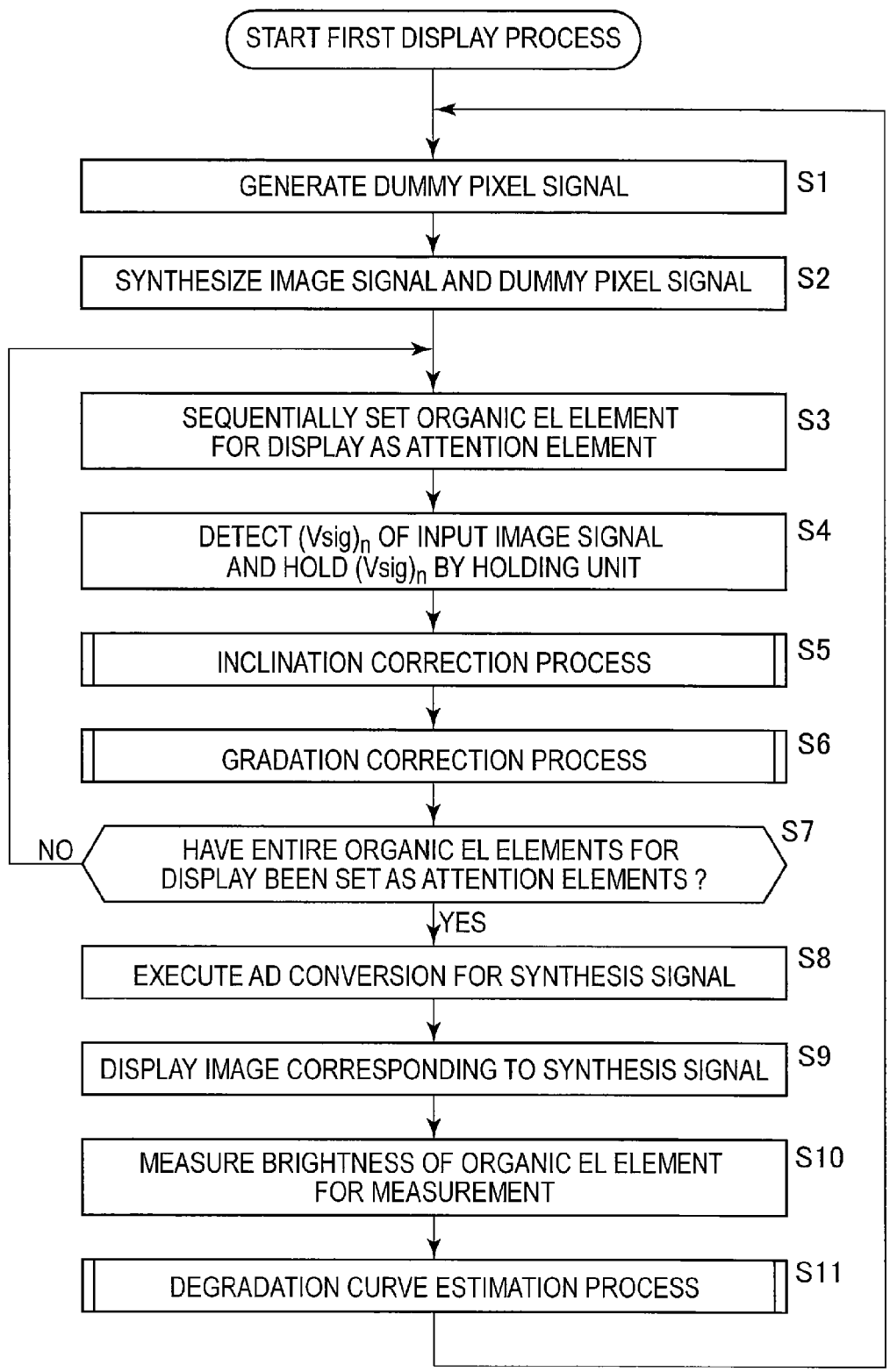
FIG. 18 is a flowchart illustrating a display process executed by a display device of FIG. 1.
Figure 19:
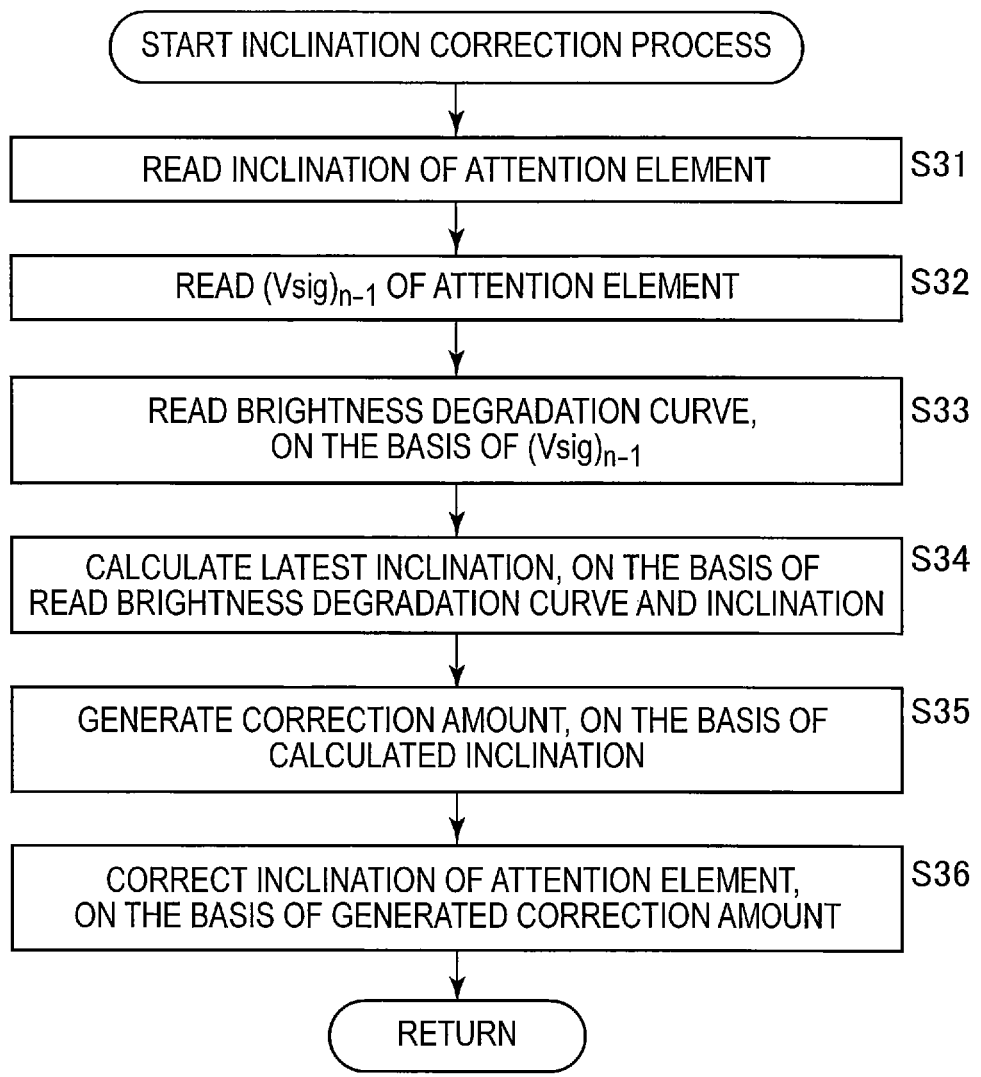
FIG. 19 is a flowchart illustrating the detail of an inclination correction process in step S5 of FIG. 18.

Next, the detail of the inclination correction process in step S5 of FIG. 18 will be descried with reference to a flowchart of FIG. 19.

In step S31, the correction amount generation unit 101 reads the inclination α' of the attention element from the inclination holding unit 103.

In step S32, the correction amount generation unit 101 reads the signal potential $(Vsig)_{n-1}$ of the attention element from the holding unit 74.

In step S33, the correction amount generation unit 101 calculates the current $I_{n-1}$ flowing to the attention element, on the basis of the signal potential $(Vsig)_{n-1}$ of the attention element read from the holding unit 74. In addition, the correction amount generation unit 101 reads a brightness degradation curve corresponding to the calculated current $I_{n-1}$ among a plurality of brightness degradation curves held in the degradation curve holding unit 104, from the degradation curve holding unit 104.

In step S34, the correction amount generation unit 101 calculates the latest inclination α' of the attention element, on the basis of the inclination α' of the attention element read from the inclination holding unit 103 and the brightness degradation curve read from the degradation curve holding unit 104.

In addition, the correction amount generation unit 101 supplies the calculated latest inclination α' of the attention element to the inclination holding unit 103 and holds (stores) the latest inclination by overwriting.

In step S35, the correction amount generation unit 101 generates (calculates) the correction amount $\pm\sqrt{(\alpha/\alpha')}$, on the basis of the latest inclination α' of the attention element, and supplies the correction amount to the correction amount multiplication unit 102.

In step S36, the correction amount multiplication unit 102 multiplies the signal potential $(Vsig)_n$ of the attention element supplied from the signal synthesis unit 22 with the correction amount $\pm\sqrt{(\alpha/\alpha')}$ from the correction amount generation unit 101.

Then, the inclination correction process of FIG. 19 ends and the process returns to step S5 of FIG. 18. The correction amount multiplication unit 102 supplies the signal potential $\{\pm\sqrt{(\alpha/\alpha')} \times (Vsig)_n\}$ obtained by the multiplication as the signal potential $(Vsig')_n$ of the attention element in which the inclination α' has been corrected with the original inclination α to the gradation correction unit 72 and the following process is executed.

[Detail of Gradation Correction Process Executed by Gradation Correction Unit 72]

Next, the detail of the gradation correction process in step S6 of FIG. 18 will be described with reference to a flowchart of FIG. 20.

In step S51, the offset amount calculation unit 161 reads the signal potential $(Vsig)_n$ of the attention element from the holding unit 74.

In step S52, the offset amount calculation unit 161 calculates the offset amount $(\Delta Vsig)_n$ added to the signal potential $(Vsig)_n$ of the attention element, on the basis of the read signal potential $(Vsig)_n$ of the attention element, the information (for example, the function $f_1(Vsig)$) for offset amount calculation previously stored in the memory not illustrated in the drawings, and the measurement result of the brightness from the brightness sensor 25b, and supplies the offset amount to the offset correction unit 162.

In step S53, the offset correction unit 162 adds $(Vsig)_n$ of the signal potential $(Vsig')_n (=\{\pm\sqrt{(\alpha/\alpha')} \times (Vsig)_n\})$ of the attention element from the inclination correction unit 71 and the offset amount $(\Delta Vsig)_n$ from the offset amount calculation unit 161.

Figure 20:
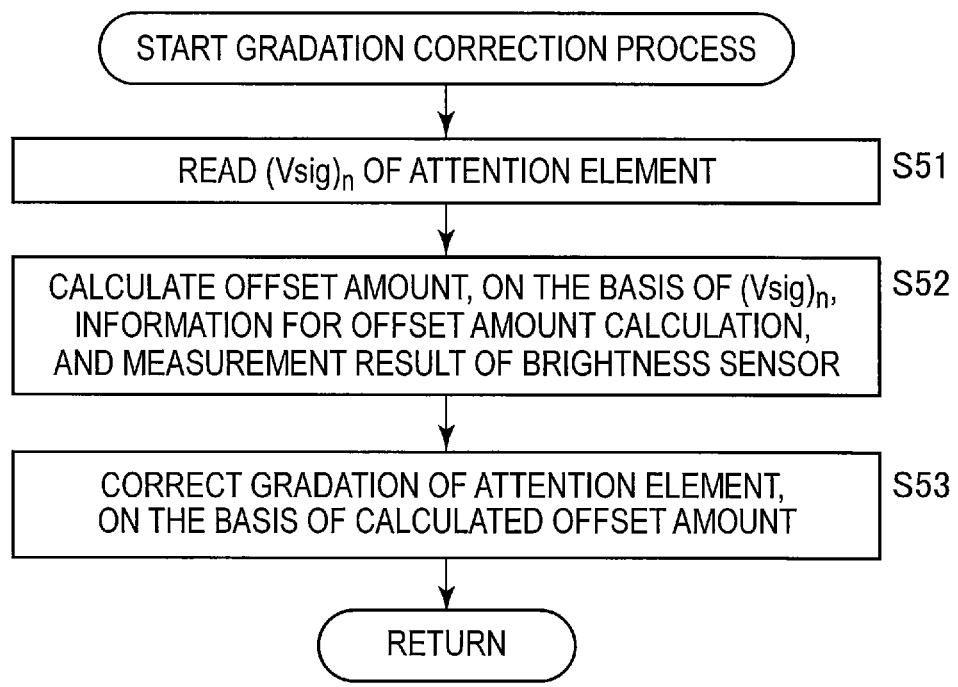
FIG. 20 is a flowchart illustrating the detail of a gradation correction process in step S6 of FIG. 18.

Then, the gradation correction process of FIG. 20 ends and the process returns to step S6 of FIG. 18. The offset correction unit 162 supplies the signal potential $[\pm\sqrt{(\alpha/\alpha')} \times \{(Vsig)_n\} + (\Delta Vsig)_n\}]$ obtained as the addition result thereof as the signal potential $(Vsig")_n$ of the attention element in which the gradation (k–Δk) has been corrected with the original gradation k to the data driver 24.

[Detail of Degradation Curve Estimation Process Executed by Inclination Correction Unit 71]

Next, the detail of the degradation curve estimation process in step S11 of FIG. 18 will be described with reference to a flowchart of FIG. 21.

In step S71, the degradation curve estimation unit 105 sequentially pays attention to the plurality of brightness sensors 25b and sets the attention paid brightness sensor 25b as the attention sensor.

The brightness L(t, I(L=Xnit)) obtained by measuring the brightness of the organic EL element for the measurement to which the current I(L=Xnit) flows is supplied from the attention sensor to the degradation curve estimation unit 105. The organic EL element for the measurement is supplied with the different current I(L=Xnit) and emits light at the different brightness L(t, I(L=Xnit)).

In step S72, the degradation curve estimation unit 105 calculates the inclination α(t, I(L=Xnit))', on the basis of the value I(L=Xnit) of the current previously held in a built-in memory not illustrated in the drawings and the brightness L(t, I(L=Xnit)) from the attention sensor.

That is, for example, the degradation curve estimation unit 105 calculates the inclination α(t, I(L=200 nit))' for the time t, by a formula α(t, I(L=200 nit))'=L(t, I(L=200 nit))/I(L=200 nit)) derived on the basis of the formula 4, on the basis of the value I(L=200 nit) of the current previously held in a built-in memory not illustrated in the drawings and the measurement result L(t, I(L=200 nit)) from the brightness sensor 25b.

In step S73, the degradation curve estimation unit 105 calculates the acceleration coefficient multiplied with the brightness degradation basis curve, on the basis of the calculated inclination α(t, I(L=Xnit))' and the brightness degradation basis curve previously held in the built-in memory not illustrated in the drawings.

That is, for example, the degradation curve estimation unit 105 calculates a time Δt1' until the inclination α(T, I(L=200 nit))' is obtained from when the inclination α(0, I(L=200 nit))'=α is obtained, as illustrated in FIG. 10.

In addition, for example, the degradation curve estimation unit 105 calculates a time Δt1' until the inclination α(T, I(L=200 nit))' is obtained from when the inclination α(0, I(L=200 nit))'=α is obtained, in the brightness degradation basis curve 141, as illustrated in FIG. 10.

In addition, the degradation curve estimation unit 105 calculates the acceleration coefficient Δt1'/Δt1, on the basis of the calculated times Δt1' and Δt1.

In step S74, the degradation curve estimation unit 105 estimates the brightness degradation curve, on the basis of the calculated acceleration coefficient and the brightness degradation basis curve previously held in the memory not illustrated in the drawings, and supplies the brightness degradation curve to the degradation curve holding unit 104, and holds the brightness degradation curve by the degradation curve holding unit.

That is, for example, the degradation curve estimation unit 105 multiplies the calculated acceleration coefficient Δt1'/Δt1 with a formula A(t, I(L=200 nit)) showing the brightness degradation basis curve 141. In addition, the degradation curve estimation unit 105 supplies the brightness degradation curve 121 showing a new formula (Δt1'/Δt1)×A(t, I(L=200 nit)) obtained by the multiplication to the degradation curve holding unit 104 and holds the brightness degradation curve by the degradation curve holding unit, in a form of being associated with the value of the current I(L=200 nit).

In step S75, the degradation curve estimation unit 105 determines whether all of the plurality of brightness sensors 25b have been set as the attention elements and when it is determined that all of the plurality of brightness sensors 25b have not been set as the attention elements, the degradation curve estimation unit 105 returns the process to step S71.

In addition, in step S71, the degradation curve estimation unit 105 sets the brightness sensor not yet set as the attention sensor among the plurality of brightness sensors 25b as a new attention sensor and causes the process to proceed to step S72. Hereinafter, the same process is executed.

Figure 21:
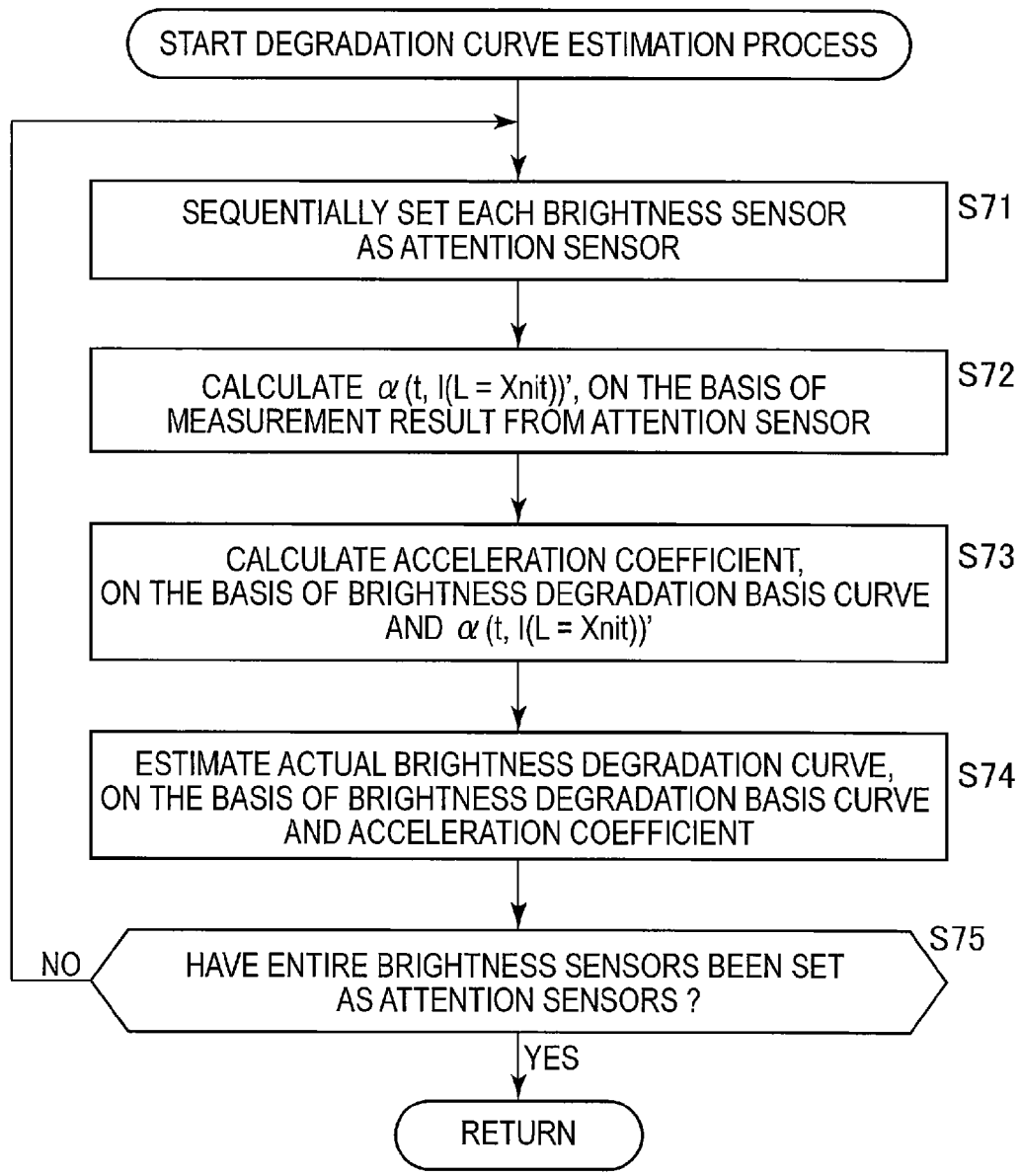
FIG. 21 is a flowchart illustrating the detail of a degradation curve estimation process in step S11 of FIG. 18.

In step S75, when it is determined by the degradation curve estimation unit 105 that all of the plurality of brightness sensors 25b have been set as the new attention sensor, the degradation curve estimation process of FIG. 21 ends, the process returns to step S11 of FIG. 18, and the following process is executed.

In the first embodiment, in the burn-in correction unit 23 of FIG. 6, the detection unit 73 detects the signal potential $(Vsig)_n$ of the attention element, on the basis of the image signal $S_n$ from the signal synthesis unit 22, supplies the detected signal potential $(Vsig)_n$ to the holding unit 74, and holds the signal potential by the holding unit.

In addition, in the inclination correction unit 71 and the gradation correction unit 72, the current $I_n$ calculated on the basis of the signal potential $(Vsig)_n$ of the attention element held in the holding unit 74 is a current that actually flows to the attention element.

In addition, in the inclination correction unit 71, it is determined that the degradation of the efficiency arises by flowing the current $I_{n-1}$ to the attention element and the correction amount to correct the inclination α' of the attention element is calculated.

In addition, in the gradation correction unit 72, it is determined that the degradation of the current arises by flowing the current $I_n$ to the attention element and the offset amount to correct the gradation of the attention element is calculated.

However, the current that actually flows to the attention element is not the current $I_n$ calculated on the basis of the signal potential $(Vsig)_n$ of the attention element, but the current $(\alpha/\alpha')\times I_n$ calculated on the basis of the signal potential $(Vsig')_n$ of the attention element in which the inclination α' has been corrected with the original inclination α.

Therefore, in the burn-in correction process, it is desirable to correct the inclination α' or the gradation (k−Δk) of the attention element, on the basis of the current $(\alpha/\alpha')\times I_n$ actually flowing to the attention element.

Figure 22:
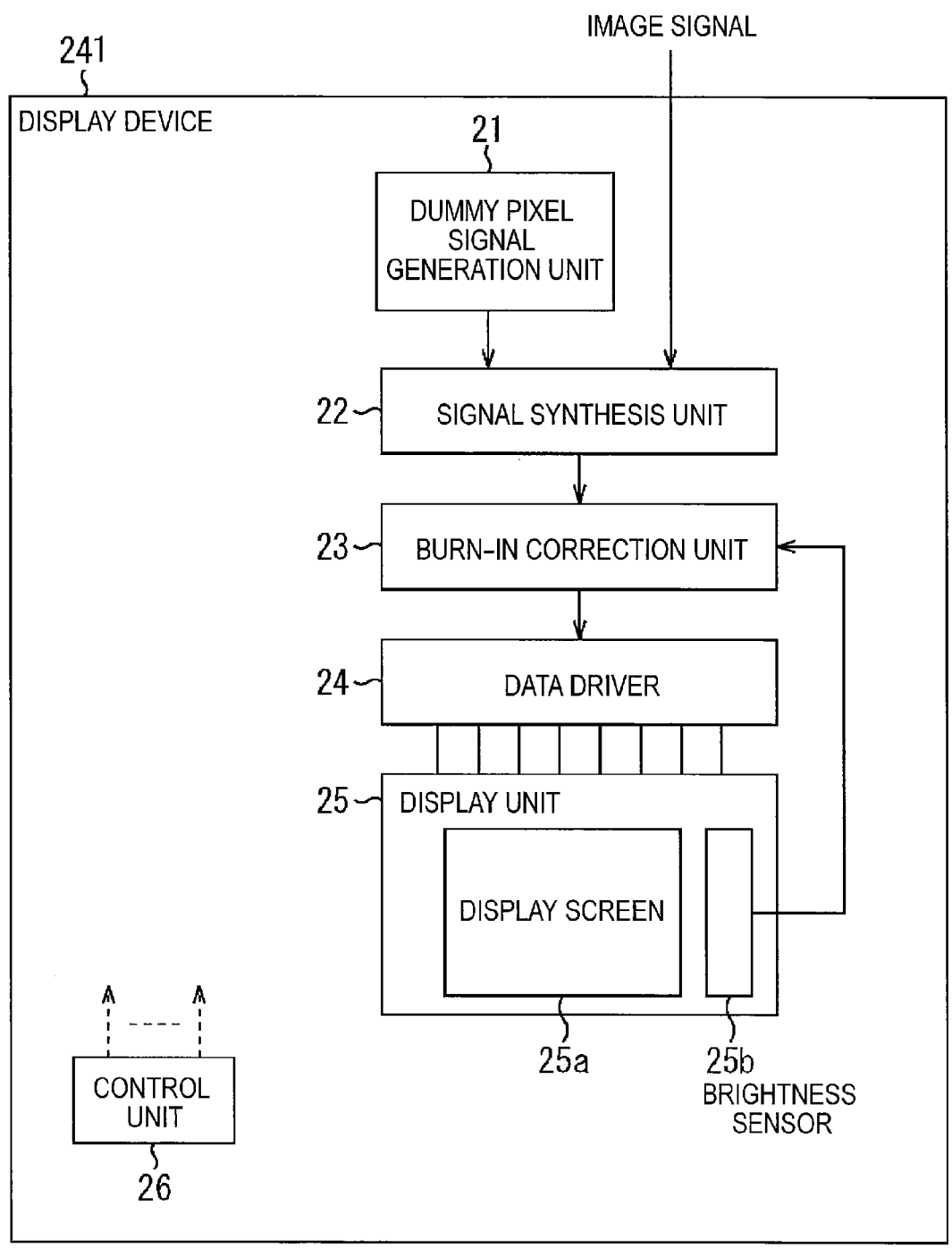
FIG. 22 is a block diagram illustrating a configuration example of a display device to be a second embodiment.

Next, a display device 241 of FIG. 22 executes the burn-in correction process, on the basis of the current actually flowing to the attention element.

2. Second Embodiment

Configuration Example of Display Device 241

FIG. 22 illustrates a configuration example of a display device 241 to be a second embodiment.

In the display device 241, portions having the same configurations as the case of the display device 1 (FIG. 1) to be the first embodiment are denoted with the same reference numerals and explanation thereof is appropriately omitted hereinafter.

That is, the display device 241 has the same configuration as the display device 1 of FIG. 1, except that a burn-in correction unit 261 is provided, instead of the burn-in correction unit 23 of FIG. 1.

The synthesis signal $C_n$ from the signal synthesis unit 22 is supplied to the burn-in correction unit 261. Similar to the burn-in correction unit 23, the burn-in correction unit 261 executes a burn-in correction process for the image signal $S_n$ included in the synthesis signal $C_n$ from the signal synthesis unit 22 and executes the burn-in correction process for preventing the burn-in from arising at the display screen 25a of the display unit 25.

However, the burn-in correction unit 261 is different from the burn-in correction unit 23 in that the burn-in correction unit 261 executes the burn-in correction process on the basis of the signal potential $(Vsig')_n$ of the image signal $S_n$ after the inclination correction process and the burn-in correction unit 23 executes the burn-in correction process on the basis of the signal potential $(Vsig)_n$ of the image signal $S_n$ before the inclination correction process.

[Detail of Burn-In Correction Unit 261]

Figure 23:
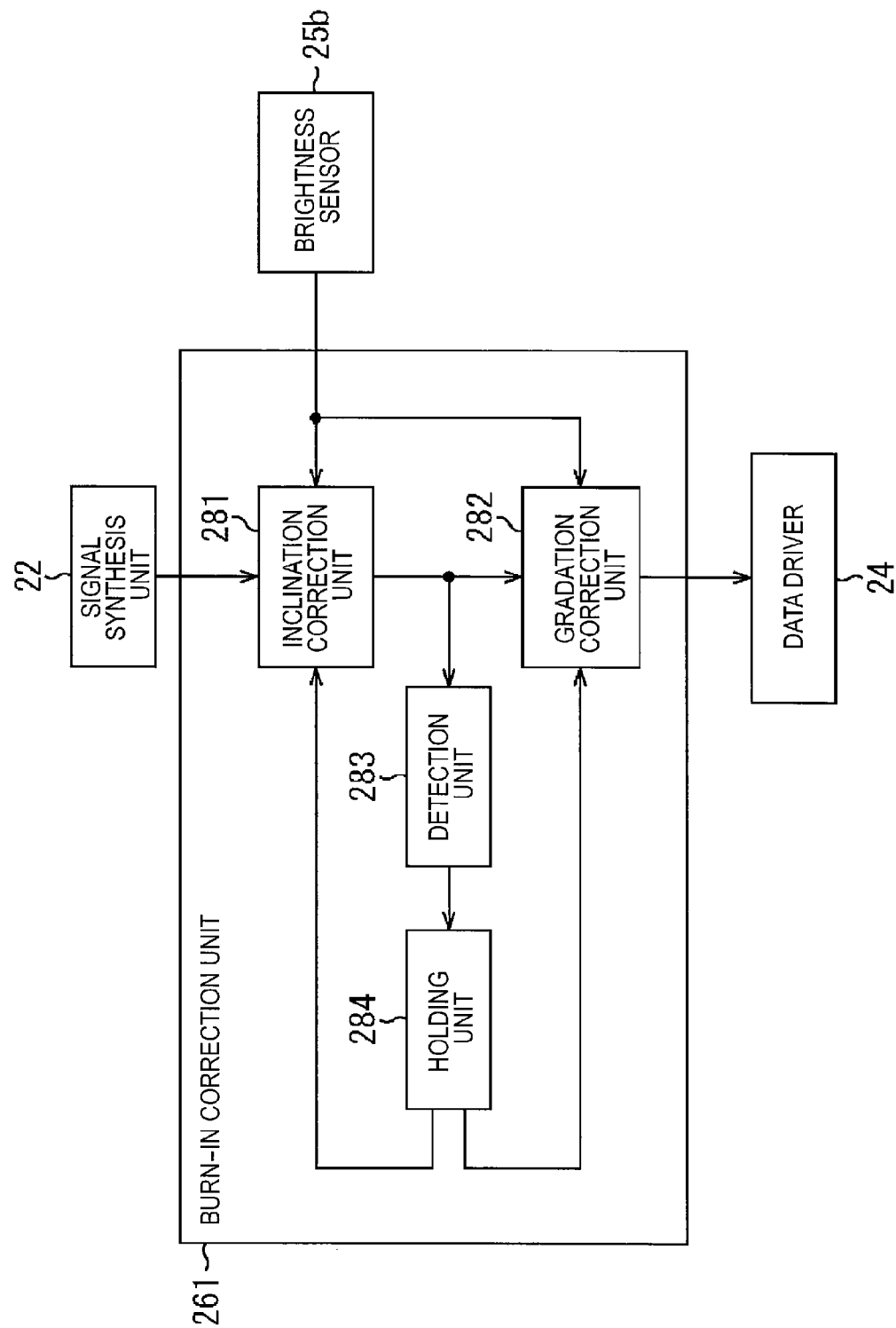
FIG. 23 is a block diagram illustrating a detailed configuration example of a burn-in correction unit of FIG. 22.

Next, FIG. 23 illustrates a detailed configuration example of the burn-in correction unit 261 of FIG. 22.

The burn-in correction unit 261 includes an inclination correction unit 281, a gradation correction unit 282, a detection unit 283, and a holding unit 284.

A synthesis signal $C_n$ from the signal synthesis unit 22 is supplied to the inclination correction unit 281.

The inclination correction unit 281 reads a signal potential $(Vsig')_{n-1}$ of an image signal $S_{n-1}$ after an inclination correction process output from the inclination correction unit 281, from the holding unit 284.

Although described below, the signal potential $(Vsig')_n$ of the image signal $S_n$ after the inclination correction process by the inclination correction unit 281 is held in the holding unit 284.

The inclination correction unit 281 calculates a correction amount $\pm\sqrt{(t\alpha')}$ to correct the inclination α' decreased by efficiency degradation with the original inclination α, on the basis of the signal potential $(Vsig')_{n-1}$ read from the holding unit 284 and a measurement result of the brightness from the brightness sensor 25b.

In addition, the inclination correction unit 281 is different from the inclination correction unit 71 of FIG. 6 in that, instead of the signal potential $(Vsig)_{n-1}$ of the image signal $S_{n-1}$ before the inclination correction process, the signal potential $(Vsig')_{n-1}$ of the image signal $S_{n-1}$ after the inclination correction process is used in calculating the correction amount $\pm\sqrt{(\alpha/\alpha')}$. In the other configuration, the inclination correction unit 281 is the same as the inclination correction unit 71.

The inclination correction unit 281 multiplies the signal potential $(Vsig)_n$ of the image signal $S_n$ included in the synthesis signal $C_n$ from the signal synthesis unit 22 with the calculated correction amount $\pm\sqrt{(\alpha/\alpha')}$. The inclination correction unit 281 supplies the synthesis signal $C_n$ including the image signal $S_n$ of a signal potential $(Vsig')_n=\{\pm\sqrt{(\alpha/\alpha')}\times(Vsig)_n\}$ obtained as a multiplication result thereof to the inclination correction unit 282 and the detection unit 283.

The gradation correction unit 282 reads the signal potential $(Vsig')_n$ of the image signal $S_n$ after the inclination correction process from the holding unit 284.

In addition, the gradation correction unit 282 calculates $(\Delta Vsig)_n$ corresponding to an offset amount $\Delta k$ to correct the gradation $(k-\Delta k)$ decreased by current degradation with the original gradation k, on the basis of the signal potential $(Vsig')_n$ read from the holding unit 284 and the measurement result of the brightness from the brightness sensor 25b.

In addition, the gradation correction unit 282 is different from the gradation correction unit 72 of FIG. 6 in that, instead of the signal potential $(Vsig)_n$ of the image signal $S_n$ before the inclination correction process, the signal potential $(Vsig')_n$ of the image signal $S_n$ after the inclination correction process is used in calculating $(\Delta Vsig)_n$ corresponding to the offset amount $\Delta k$. In the other configuration, the gradation correction unit 282 is the same as the gradation correction unit 72.

The gradation correction unit 282 adds $(\Delta Vsig)_n$ corresponding to the offset amount $\Delta k$ to $(Vsig)_n$ of the signal potential $(Vsig')_n = \{\pm\sqrt{(\alpha/\alpha')} \times (Vsig)_n\}$ of the image signal $S_n$ included in the synthesis signal $C_n$ from the inclination correction unit 281.

The gradation correction unit 282 supplies the synthesis signal $C_n$ including the image signal $S_n$ of the signal potential $(Vsig'')_n = [\pm\sqrt{(\alpha/\alpha')} \times \{(Vsig)_n + (\Delta Vsig)_n\}]$ obtained as an addition result thereof to the data driver 24.

The detection unit 283 detects the signal potential $(Vsig')_n$ of the image signal $S_n$ after the inclination correction process, on the basis of the image signal $S_n$ included in the synthesis image $C_n$, which is output from the inclination correction unit 281, supplies the signal potential to the holding unit 284, and holds the signal potential by the holding unit.

The holding unit 284 holds the signal potential $(Vsig')_n$ from the detection unit 283.

[Detail of Inclination Correction Unit 281]

Figure 24:
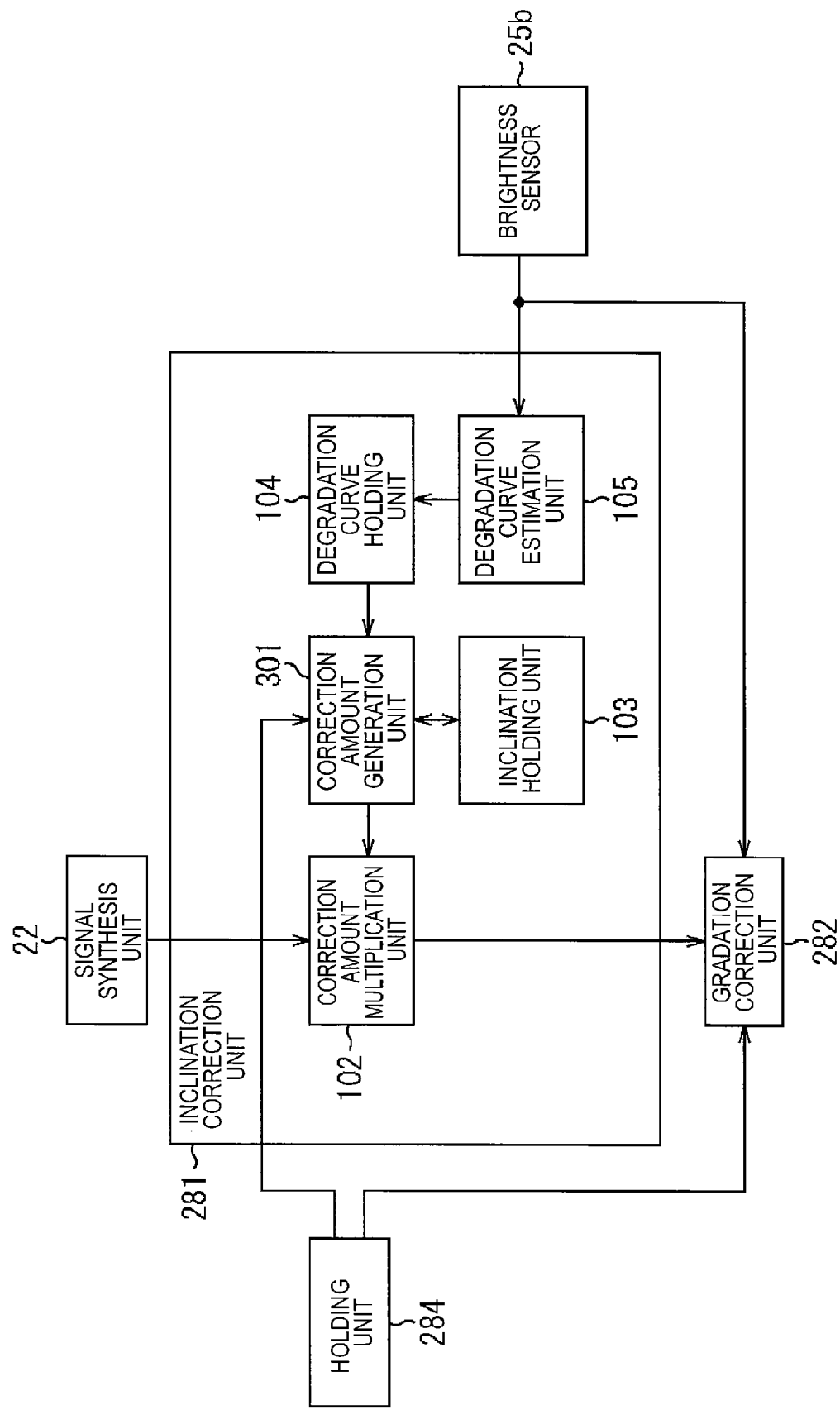
FIG. 24 is a block diagram illustrating a detailed configuration example of an inclination correction unit of FIG. 23.

Next, FIG. 24 illustrates a detailed configuration example of the inclination correction unit 281 of FIG. 23.

In the inclination correction unit 281, portions having the same configurations as the inclination correction unit 71 of FIG. 7 are denoted with the same reference numerals and explanation thereof is appropriately omitted hereinafter.

That is, the inclination correction unit 281 has the same configuration as the case of FIG. 7, except that a correction amount generation unit 301 is provided, instead of the correction amount generation unit 101 of FIG. 7.

Similar to the correction amount generation unit 101, the correction amount generation unit 301 reads the inclination $\alpha'$ of the attention element from the inclination holding unit 103. The control unit 26 of FIG. 22 sequentially pays attention to the organic EL display for the display included in the display unit 25 and sets the attention paid organic EL element as the attention element.

In addition, the correction amount generation unit 301 reads the signal potential $(Vsig)_{n-1}$ of the attention element from the holding unit 284.

The correction amount generation unit 301 calculates the current $I_{n-1}$ actually flowing to the attention element, on the basis of the signal potential $(Vsig)_{n-1}$ of the attention element read from the holding unit 284. In addition, the correction amount generation unit 301 reads a brightness degradation curve corresponding to the calculated current $I_{n-1}$ among a plurality of brightness degradation curves held in the degradation curve holding unit 104, from the degradation curve holding unit 104.

Similar to the correction amount generation unit 101, the correction amount generation unit 301 calculates the latest inclination $\alpha'$ of the attention element, on the basis of the inclination $\alpha'$ of the attention element read from the inclination holding unit 103 and the brightness degradation curve read from the degradation curve holding unit 104.

In addition, the correction amount generation unit 301 supplies the latest inclination $\alpha'$ of the attention element to the inclination holding unit 103 and holds (stores) the latest inclination by overwriting.

In addition, the correction amount generation unit 301 generates (calculates) the correction amount $\pm\sqrt{(\alpha/\alpha')}$, on the basis of the latest inclination $\alpha'$ of the attention element, and supplies the correction amount to the correction amount multiplication unit 102.

Next, a process executed by the correction amount generation unit 301 will be described while the process is compared with the process executed by the correction amount generation unit 101, with reference to FIG. 25.

In the first embodiment, when the inclination correction unit 71 of FIG. 7 multiplies the signal potential $(Vsig)_n$ of the attention element with the correction amount and corrects the inclination $\alpha'$ of the attention element, the correction amount generation unit 101 reads the signal potential $(Vsig)_{n-1}$ of the attention element held in the holding unit 74.

In addition, the correction amount generation unit 101 reads the brightness degradation curve corresponding to the current based on the signal potential $(Vsig)_{n-1}$ of the attention element among the plurality of brightness degradation curves held in the degradation curve holding unit 104, from the degradation curve holding unit 104.

Figure 25:
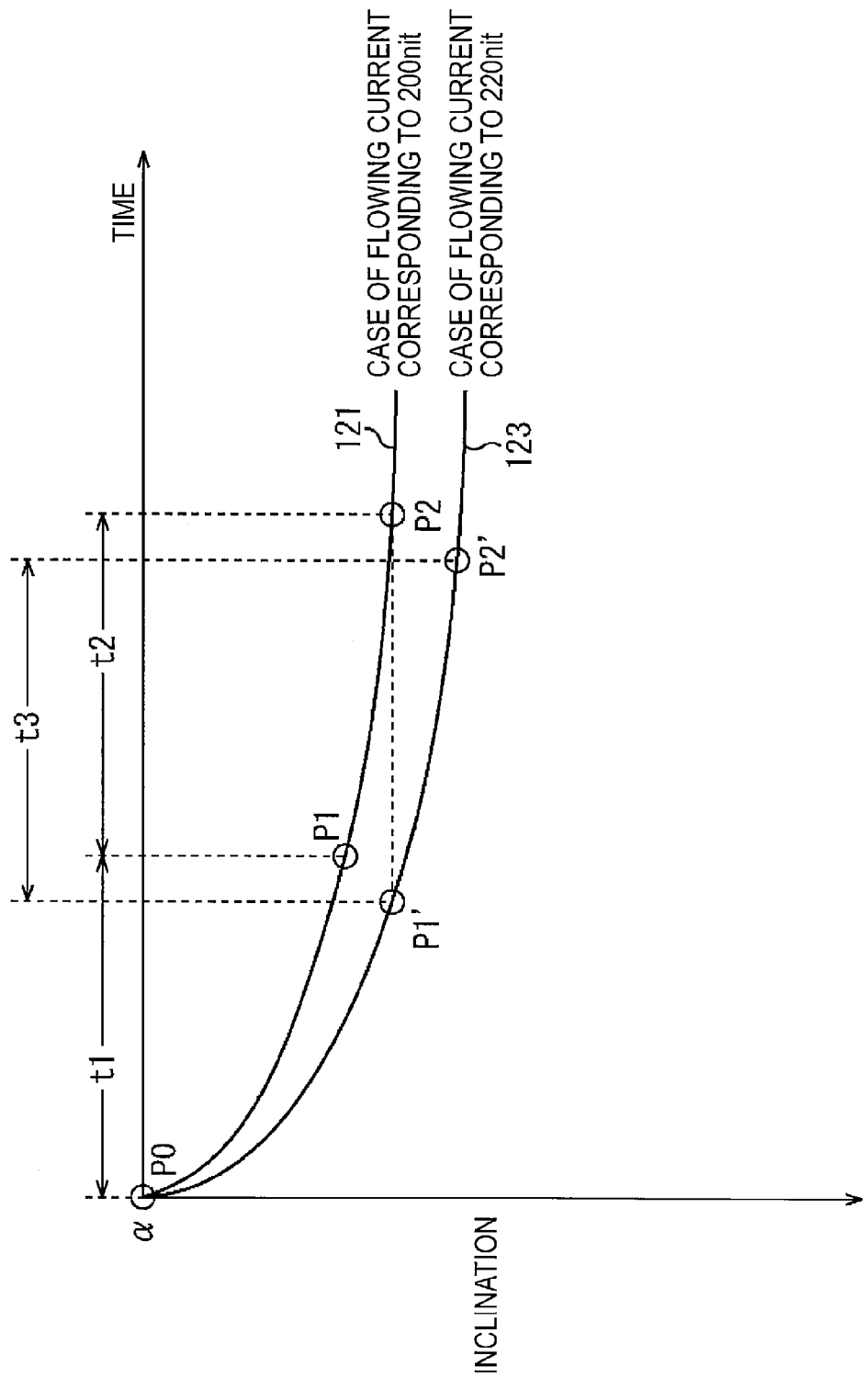
FIG. 25 is a diagram illustrating a process executed by a correction amount generation unit of FIG. 24.

That is, for example, when the current based on the signal potential $(Vsig)_{n-1}$ of the attention element is the current I(L=200 nit), the correction amount generation unit 101 reads the brightness degradation curve 121 corresponding to the current I(L=200 nit), which is illustrated in FIG. 25, from the degradation curve holding unit 104.

The correction amount generation unit 101 calculates the latest inclination $\alpha'$ of the attention element, using the read brightness degradation curve 121 and the inclination $\alpha'$ of the attention element read from the inclination holding unit 103.

However, the current flowing to the attention element is not the current (for example, the current I(L=200 nit)) based on the signal potential $(Vsig)_{n-1}$ of the attention element, but the current (for example, the current I(L=220 nit)) based on the signal potential $(Vsig')_n$ of the attention element in which the inclination $\alpha'$ has been corrected with the original inclination $\alpha$.

In order to calculate the inclination $\alpha'$ more accurately, it is desirable to read the brightness degradation curve used in calculating the inclination $\alpha'$, from the degradation curve holding unit 104, on the basis of the current actually flowing to the attention element.

Therefore, in the second embodiment, when the inclination correction unit 281 of FIG. 24 multiplies the signal potential $(Vsig)_n$ of the attention element with the correction amount and corrects the inclination $\alpha'$ of the attention element, the correction amount generation unit 301 reads the signal potential $(Vsig')_{n-1}$ of the attention element held in the holding unit 284.

In addition, the signal potential $(Vsig')_{n-1}$ corresponding to the current (for example, the current I(L=220 nit)) actually flowing to the attention element, that is, the signal potential $(Vsig')_{n-1}$ of the attention element in which the inclination α' has been corrected is held in the holding unit 284.

The correction amount generation unit 301 reads the signal potential $(Vsig')_{n-1}$ of the attention element held in the holding unit 284.

In addition, the correction amount generation unit 301 reads the brightness degradation curve corresponding to the current based on the signal potential $(Vsig')_{n-1}$ of the attention element among the plurality of brightness degradation curves held in the degradation curve holding unit 104, from the degradation curve holding unit 104.

That is, for example, when the current based on the signal potential $(Vsig')_{n-1}$ of the attention element is the current I(L=220 nit), the correction amount generation unit 301 reads the brightness degradation curve 123 corresponding to the current I(L=220 nit), which is illustrated in FIG. 25, from the degradation curve holding unit 104.

The signal potential $(Vsig')_{n-1}$ of the attention element is obtained by multiplying the signal potential $(Vsig)_{n-1}$ of the attention element with a correction amount of 1 or more. For this reason, the current (for example, the current I(L=220 nit)) based on the signal potential $(Vsig')_{n-1}$ of the attention element is equal to or more than the current (for example, the current I(L=200 nit)) based on the signal potential $(Vsig)_{n-1}$ of the attention element.

The correction amount generation unit 301 calculates the latest inclination α' of the attention element, using the read brightness degradation curve 123 and the inclination α' of the attention element read from the inclination holding unit 103.

[Detail of Gradation Correction Unit 282]

Figure 26:
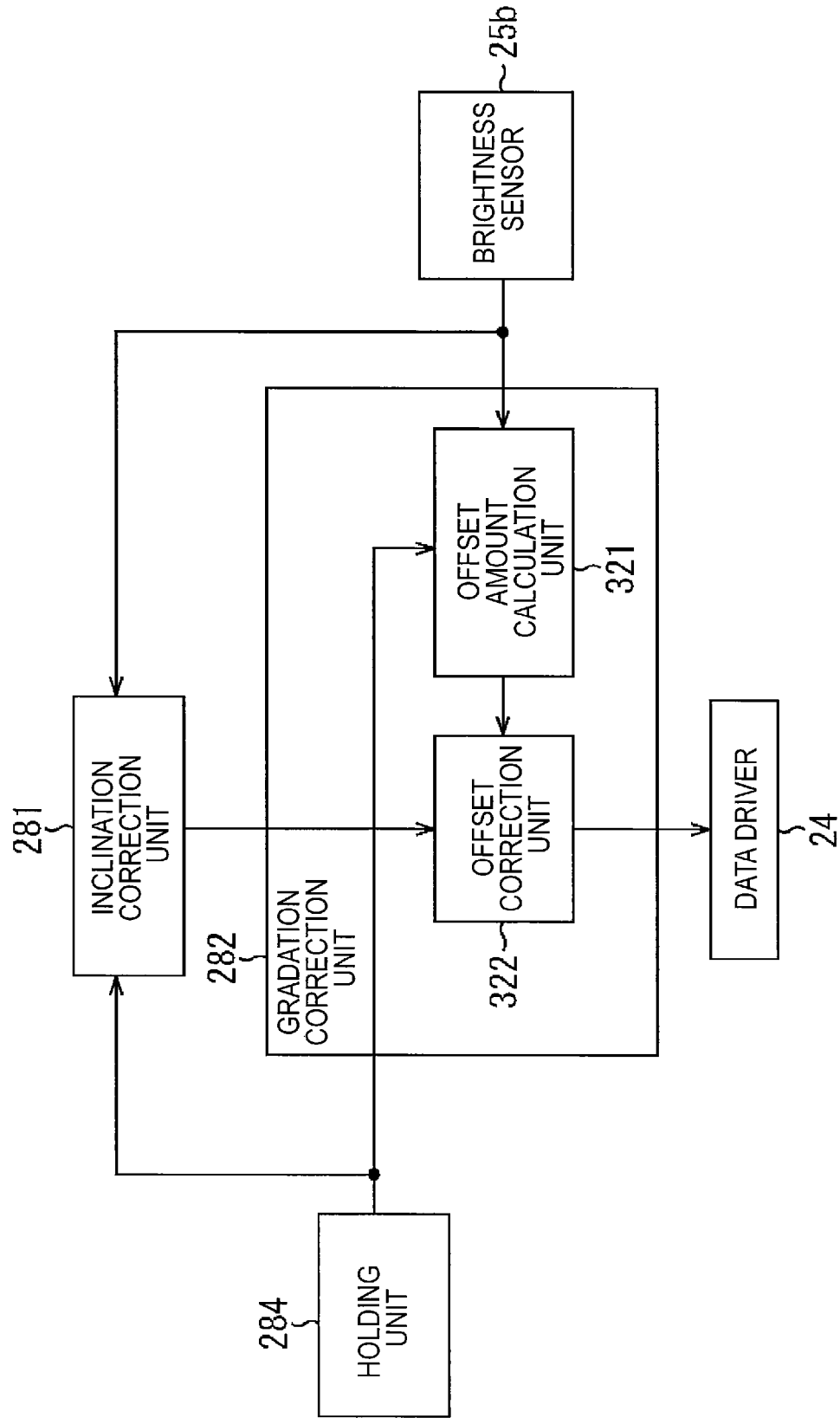
FIG. 26 is a block diagram illustrating a detailed configuration example of a gradation correction unit of FIG. 23.

Next, FIG. 26 illustrates a detailed configuration example of the gradation correction unit 282 of FIG. 23.

The gradation correction unit 282 includes an offset amount calculation unit 321 and an offset correction unit 322.

A measurement result of the brightness is supplied from the brightness sensor 25b to the offset amount calculation unit 321. The offset amount calculation unit 321 reads the signal potential $(Vsig')_n$ of the attention element from the holding unit 284.

In addition, the offset amount calculation unit 321 calculates an offset amount $(\Delta Vsig)_n$ added to $(Vsig)_n$ of the signal potential $(Vsig')_n$ $(=\{\pm\sqrt{(\alpha/\alpha')}\times(Vsig)_n\})$ of the attention element, on the basis of the read signal potential $(Vsig')_n$ of the attention element, the information for offset amount calculation previously held in the memory not illustrated in the drawings, and the measurement result of the brightness from the brightness sensor 25b, and supplies the offset amount to the offset correction unit 322.

The offset correction unit 322 adds $(Vsig)_n$ of the signal potential $(Vsig')_n$ $(=\{\pm\sqrt{(\alpha/\alpha')}\times(Vsig)_n\})$ of the attention element from the inclination correction unit 281 and the offset amount $(\Delta Vsig)_n$ from the offset amount calculation unit 321, similar to the offset correction unit 162 of FIG. 11.

In addition, the offset correction unit 322 supplies a signal potential $[\pm\sqrt{(\alpha/\alpha')}\times\{(Vsig)_n+(\Delta Vsig)_n\}]$ obtained as an addition result thereof as a signal potential $(Vsig'')_n$ of the attention element to the data driver 24.

[Explanation of Operation of Display Device 241]

Next, a display process (hereinafter, referred to as a second display process) executed by the display device 241 of FIG. 22 will be described with reference to a flowchart of FIG. 27.

The second display process starts when a power supply of the display device 241 is turned on.

In steps S91 to S93, the same processes as steps S1 to S3 of FIG. 18 are executed.

In step S94, the inclination correction unit 281 of the burn-in correction unit 261 executes the inclination correction process for multiplying the signal potential $(Vsig)_n$ of the attention element supplied from the signal synthesis unit 22 with the correction amount $\pm\sqrt{(\alpha/\alpha')}$ and correcting the inclination α' of the attention element with the original inclination α.

The inclination correction process is different from the inclination correction process in step S5 of FIG. 18 in that the correction amount $\pm\sqrt{(\alpha/\alpha')}$ multiplied with the signal potential $(Vsig)_n$ of the attention element is generated on the basis of the current actually flowing to the attention element. The detail of the inclination correction process in step S94 will be described with reference to a flowchart of FIG. 28.

The inclination correction unit 281 supplies the signal potential $(Vsig')$, $(=\pm\sqrt{(\alpha/\alpha')}\times(Vsig)_n)$ of the attention element obtained by the inclination correction process of step S94 to the gradation correction unit 282 and the detection unit 283.

In step S95, the detection unit 283 of the burn-in correction unit 261 detects the signal potential $(Vsig')_n$ of the attention element, on the basis of the signal potential $(Vsig')_n$ of the attention element from the inclination correction unit 281, supplies the signal potential to the holding unit 284, and holds the signal potential by the holding unit.

In step S96, the gradation correction unit 282 executes the gradation correction process for adding $(\Delta Vsig)_n$ corresponding to the offset amount to $(Vsig)_n$ of the signal potential $(Vsig')_n$ $(=\pm\sqrt{(\alpha/\alpha')}\times(Vsig)_n)$ of the attention element supplied from the inclination correction unit 281 and correcting the gradation (k−Δk) of the attention element with the original gradation k.

The gradation correction process is different from the gradation correction process in step S6 of FIG. 18 in that $(\Delta Vsig)_n$ corresponding to the offset amount is calculated on the basis of the current actually flowing to the attention element. The detail of the gradation correction process in step S96 will be described with reference to a flowchart of FIG. 29.

In steps S97 to S101, the same processes as steps S7 to S11 of FIG. 18 are executed.

The second display process ends when the power supply of the display device 241 is turned off.

As described above, according to the second display process, because the burn-in correction process is executed on the basis of the current actually flowing to the organic EL element for the display set as the attention element, the burn-in can be more surely prevented from arising at the display screen 25a.

[Detail of Inclination Correction Process Executed by Inclination Correction Unit 281]

Figure 27:
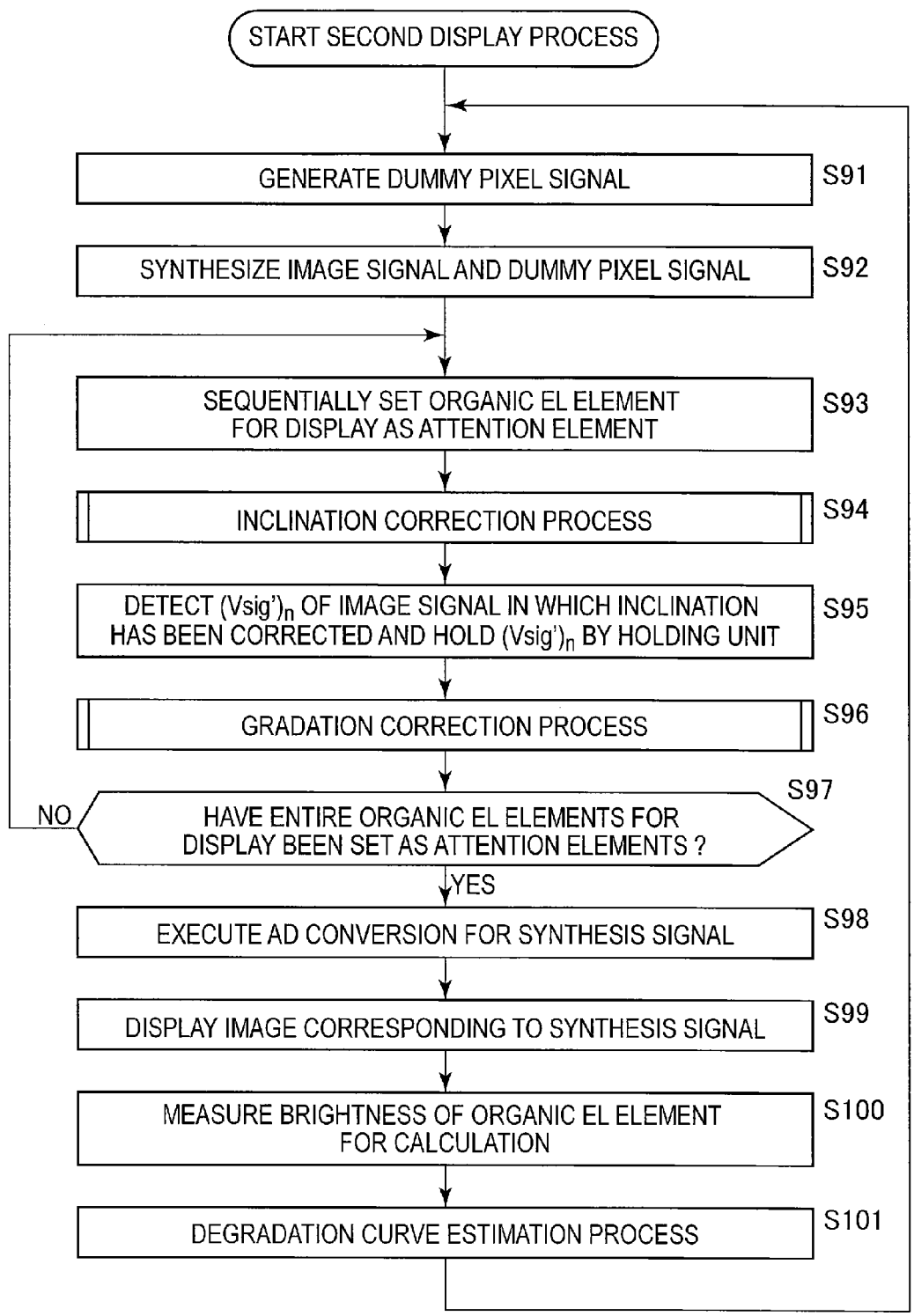
FIG. 27 is a flowchart illustrating a display process executed by a display device of FIG. 22.
Figure 28:
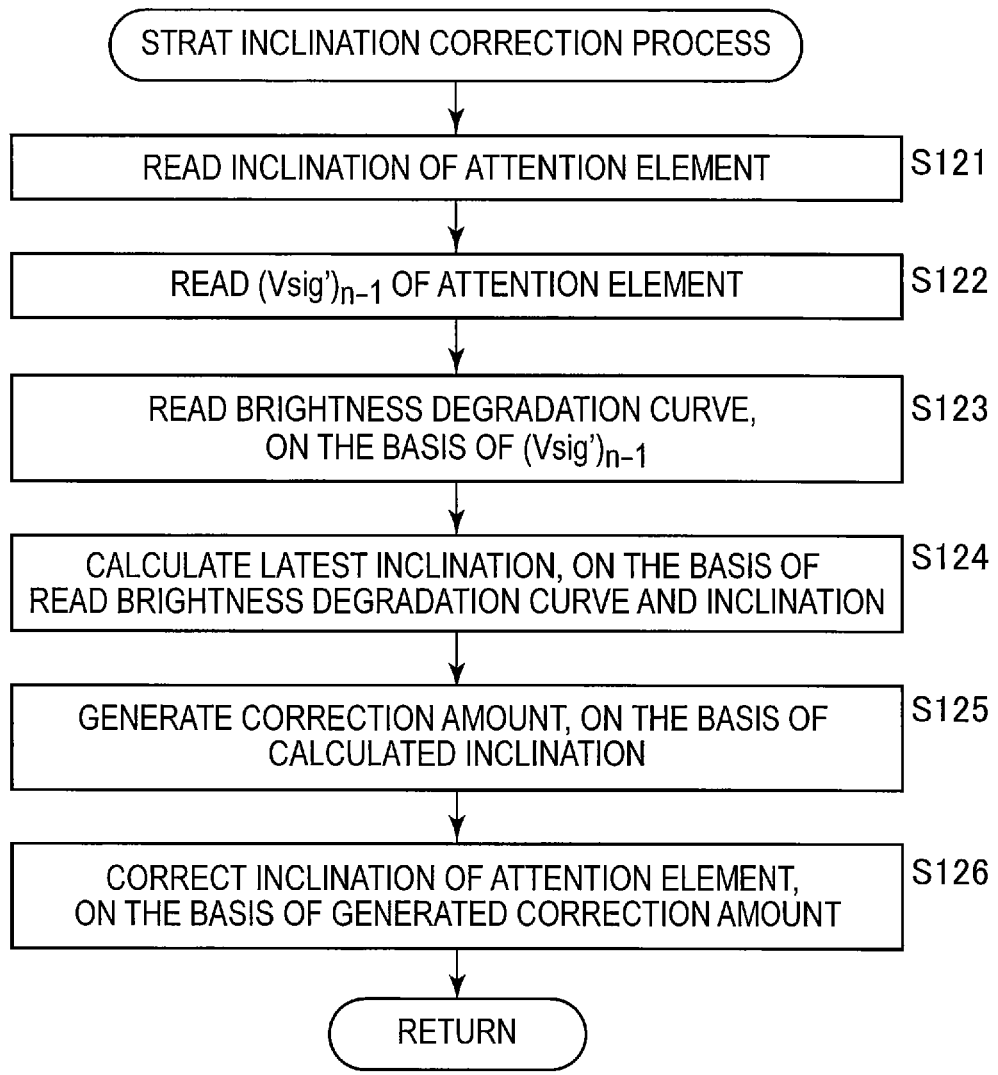
FIG. 28 is a flowchart illustrating the detail of an inclination correction process in step S94 of FIG. 27.

Next, the detail of the inclination correction process in step S94 of FIG. 27 will be descried with reference to a flowchart of FIG. 28.

In step S121, the correction amount generation unit 301 reads the inclination α' of the attention element from the inclination holding unit 103, similar to the correction amount generation unit 101.

In step S122, the correction amount generation unit 301 reads the signal potential $(Vsig')_{n-1}$ of the attention element from the holding unit 284.

In step S123, the correction amount generation unit 301 calculates the current $I_{n-1}$ actually flowing to the attention element, on the basis of the signal potential $(Vsig')_{n-1}$ of the attention element read from the holding unit 284.

In addition, the correction amount generation unit 301 reads a brightness degradation curve corresponding to the calculated current $I_{n-1}$ among a plurality of brightness degradation curves held in the degradation curve holding unit 104, from the degradation curve holding unit 104.

In steps S124 and S125, the correction amount generation unit 301 executes the processes of steps S34 and S35 of FIG. 19, similar to the correction amount generation unit 101.

In step S126, the same process as step S36 of FIG. 19 is executed. In addition, the inclination correction process of FIG. 28 ends, the process returns to step S94 of FIG. 27, and the following process is executed.

[Detail of Gradation Correction Process Executed by Gradation Correction Unit 282]

Next, the detail of the gradation correction process in step S96 of FIG. 27 will be described with reference to a flowchart of FIG. 29.

In step S141, the offset amount calculation unit 321 reads the signal potential $(Vsig')_n$ of the attention element from the holding unit 284.

In step S142, the offset amount calculation unit 321 calculates the offset amount $(\Delta Vsig)_n$ added to $(Vsig)_n$ of the signal potential $(Vsig')_n$ $(=\{\pm\sqrt{(\alpha/\alpha')}\times(Vsig)_n\})$ of the attention element, on the basis of the read signal potential $(Vsig')_n$ of the attention element, the information for offset amount calculation previously stored in the memory not illustrated in the drawings, and the measurement result of the brightness from the brightness sensor 25*b*, and supplies the offset amount to the offset correction unit 322.

In step S143, the offset correction unit 322 adds $(Vsig)_n$ of the signal potential $(Vsig')_n$ $(=\{\pm\sqrt{(\alpha/\alpha')}\times(Vsig)_n\})$ of the attention element from the inclination correction unit 281 and the offset amount $(\Delta Vsig)_n$ from the offset amount calculation unit 321.

In addition, the offset correction unit 322 supplies the signal potential $[\pm\sqrt{(\alpha/\alpha')}\times\{(Vsig)_n\})+(\Delta Vsig)_n\}]$ obtained as the addition result thereof as the signal potential $(Vsig'')_n$ of the attention element to the data driver 24.

Figure 29:
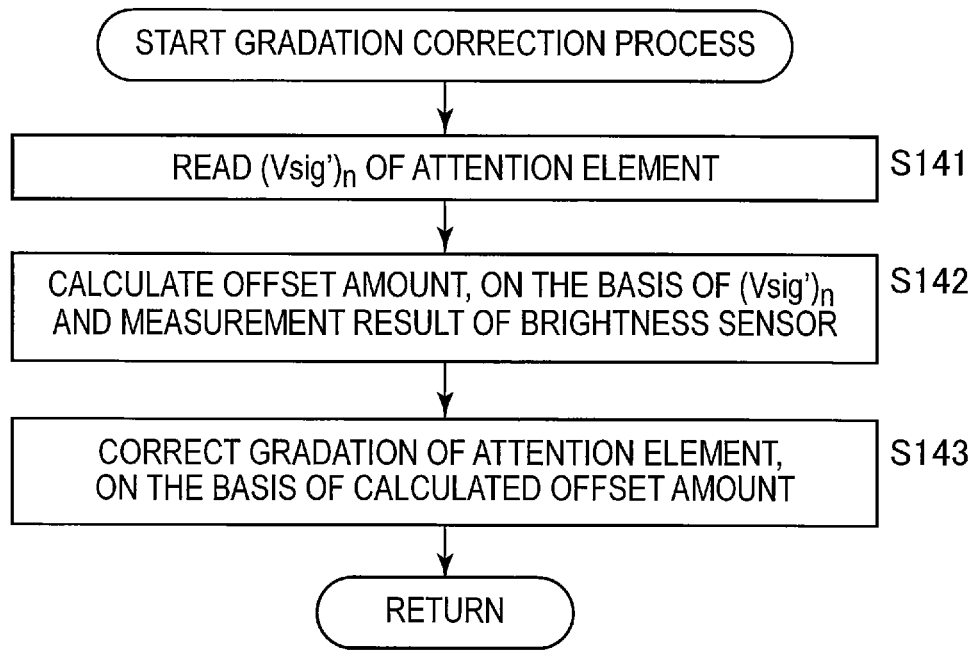
FIG. 29 is a flowchart illustrating the detail of a gradation correction process in step S96 of FIG. 27.

Then, the gradation correction process of FIG. 29 ends, the process returns to step S96 of FIG. 27, and the following process is executed.

Meanwhile, in the first embodiment, only the burn-in correction process is executed for the image signal $S_n$. However, an image process (for example, a color reproduction process or a noise reduction process) different from the burn-in correction process may be executed for the image signal $S_n$ and an image quality of a display image displayed on the display screen 25*a* may be improved. This is the same in the second embodiment.

Here, the display unit 25 to be a display has a gamma characteristic where the brightness of the display screen 25*a* is not proportional to a level (gradation) of an image signal from the outside and changes in an exponential manner.

That is, for example, the display unit 25 has a gamma characteristic illustrated in the following formula (7).

$$Y=X^\gamma \tag{7}$$

In the formula (7), a gradation X shows a level of an image signal and brightness Y shows brightness corresponding to the level of the image signal. In addition, a gamma value γ shows a gamma characteristic of the display unit 25, for example, γ=2.2.

Therefore, a broadcasting station transmits (broadcasts) an image signal $S_n$ after inverse gamma correction to cause the gamma characteristic to be corrected with a linear characteristic.

The image signal $S_n$ after the inverse gamma correction has an inverse gamma characteristic illustrated in the following formula (8).

$$Y=X^{1/\gamma} \tag{8}$$

In order to execute the above-described image process, it is necessary to convert the image signal $S_n$ having the inverse gamma characteristic illustrated in the formula (8) into the image signal $S_n$ having the linear characteristic by performing the gamma correction for the image signal $S_n$. This is because the image process can be easily executed when the image signal $S_n$ is converted into the image signal $S_n$ having the linear characteristic.

However, it is desirable to set the image signal $S_n$ having the gamma characteristic as a correction target of the gradation correction process, when the gradation correction process included in the burn-in correction process is executed.

3. Third Embodiment

Figure 30:
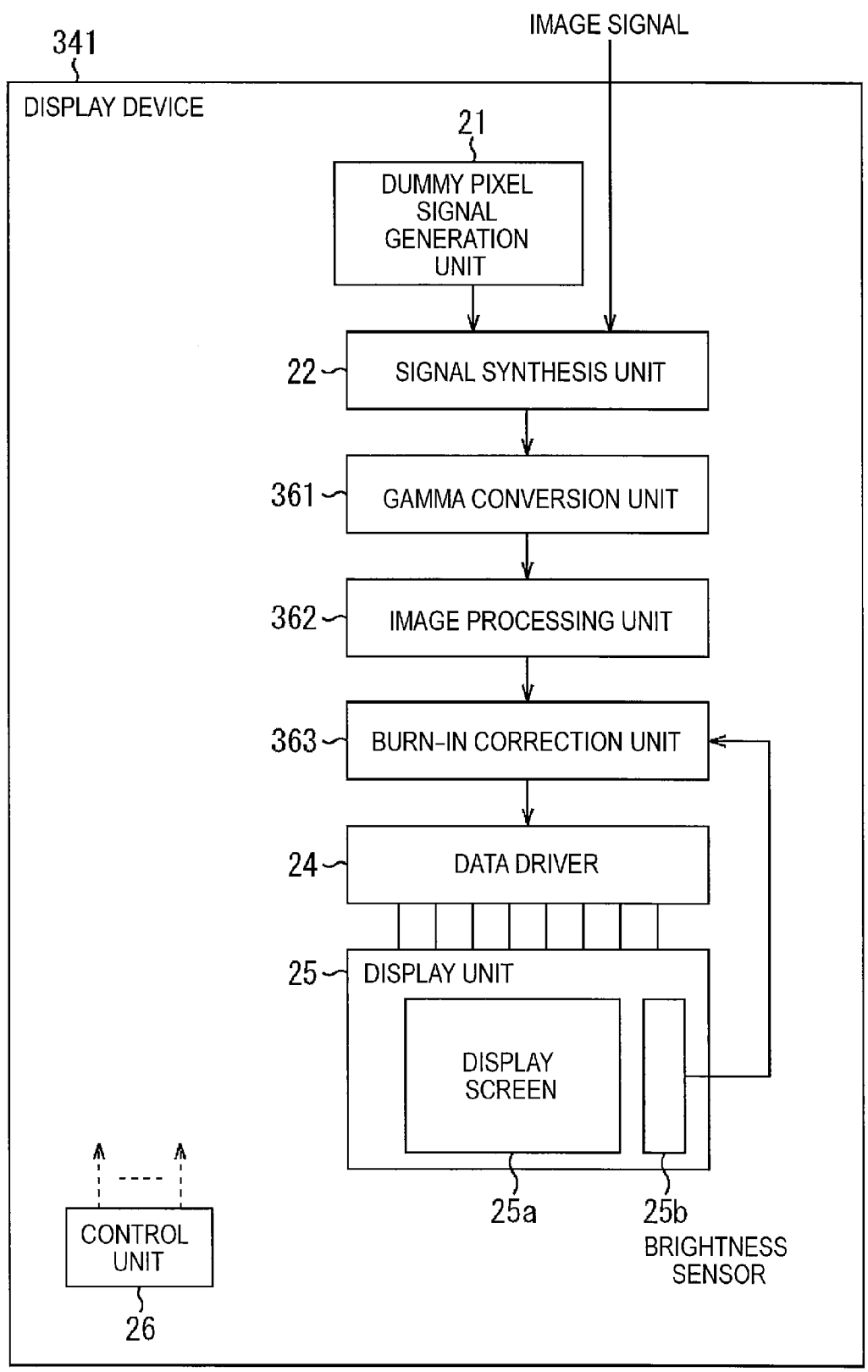
FIG. 30 is a block diagram illustrating a configuration example of a display device to be a third embodiment.

Next, FIG. 30 illustrates a configuration example of a display device 341 to be a third embodiment.

The display device 341 converts the characteristic of the image signal $S_n$ into the linear characteristic by the gamma correction, when the above-described image process is executed, and converts the characteristic of the image signal $S_n$ into the gamma characteristic by the inverse gamma correction, when the gradation correction process is executed. When the inclination correction process is executed, the characteristic of the image signal $S_n$ may be the linear characteristic or the gamma characteristic.

In the display device 341, portions having the same configurations as the case of the display device 1 (FIG. 1) to be the first embodiment are denoted with the same reference numerals and explanation thereof is appropriately omitted hereinafter.

That is, the display device 341 has the same configuration as the display device 1 of FIG. 1, except that a gamma conversion unit 361 and an image processing unit 362 are newly provided and a burn-in correction unit 363 is provided, instead of the burn-in correction unit 23 of FIG. 1.

A synthesis signal $C_n$ is supplied from the signal synthesis unit 22 to the gamma conversion unit 361. The gamma conversion unit 361 performs gamma correction for the synthesis signal $C_n$ from the signal synthesis unit 22 and supplies the synthesis signal $C_n$ after the gamma correction to the image processing unit 362.

Here, the dummy pixel signal generation unit 21 executes the same inverse gamma correction as the inverse gamma correction executed on the image signal $S_n$ at the broadcasting station for the generated dummy pixel signal and supplies the dummy pixel signal to the signal synthesis unit 22. Therefore, the synthesis signal $C_n$ output from the signal synthesis unit 22 has the inverse gamma characteristic illustrated in the formula (8).

When the characteristic of the dummy pixel signal included in the synthesis signal $C_n$ is the linear characteristic, the gamma conversion unit 361 may execute the gamma correction for only the image signal $S_n$ included in the synthesis signal $C_n$ from the signal synthesis unit 22.

The image processing unit 362 executes a predetermined image process (for example, a color reproduction process or a noise reduction process) for the synthesis signal $C_n$ from the gamma conversion unit 361 and supplies the synthesis signal $C_n$ after the image process to the burn-in correction unit 363. The image processing unit 263 may execute the image process for only the image signal $S_n$ included in the synthesis signal $C_n$.

The burn-in correction unit 363 executes the burn-in correction process configured from the inclination correction process and the gradation correction process, for the image signal $S_n$ included in the synthesis signal $C_n$ from the image processing unit 362, on the basis of the measurement result of the brightness from the brightness sensor 25b.

In addition, when at least the gradation correction process is executed, the burn-in correction unit 363 executes the inverse gamma correction for the synthesis signal $C_n$ and executes the gradation correction process for the image signal $S_n$ included in the synthesis signal $C_n$ after the inverse gamma correction.

The third embodiment is significantly different from the first and second embodiments in that the burn-in correction unit 363 executes the gradation correction process for the image signal $S_n$ included in the synthesis signal $C_n$ after the inverse gamma correction.

The burn-in correction unit 363 supplies the synthesis signal $C_n$ including the image signal $S_n$ after the burn-in correction process to the data driver 24.

In FIG. 30, the control unit 26 controls the gamma conversion unit 361, the image processing unit 362, and the burn-in correction unit 363 in addition to the dummy pixel signal generation unit 21, the signal synthesis unit 22, the data driver 24, the display unit 25, and the brightness sensor 25b.

[Detail of Burn-In Correction Unit 363]

Figure 31:
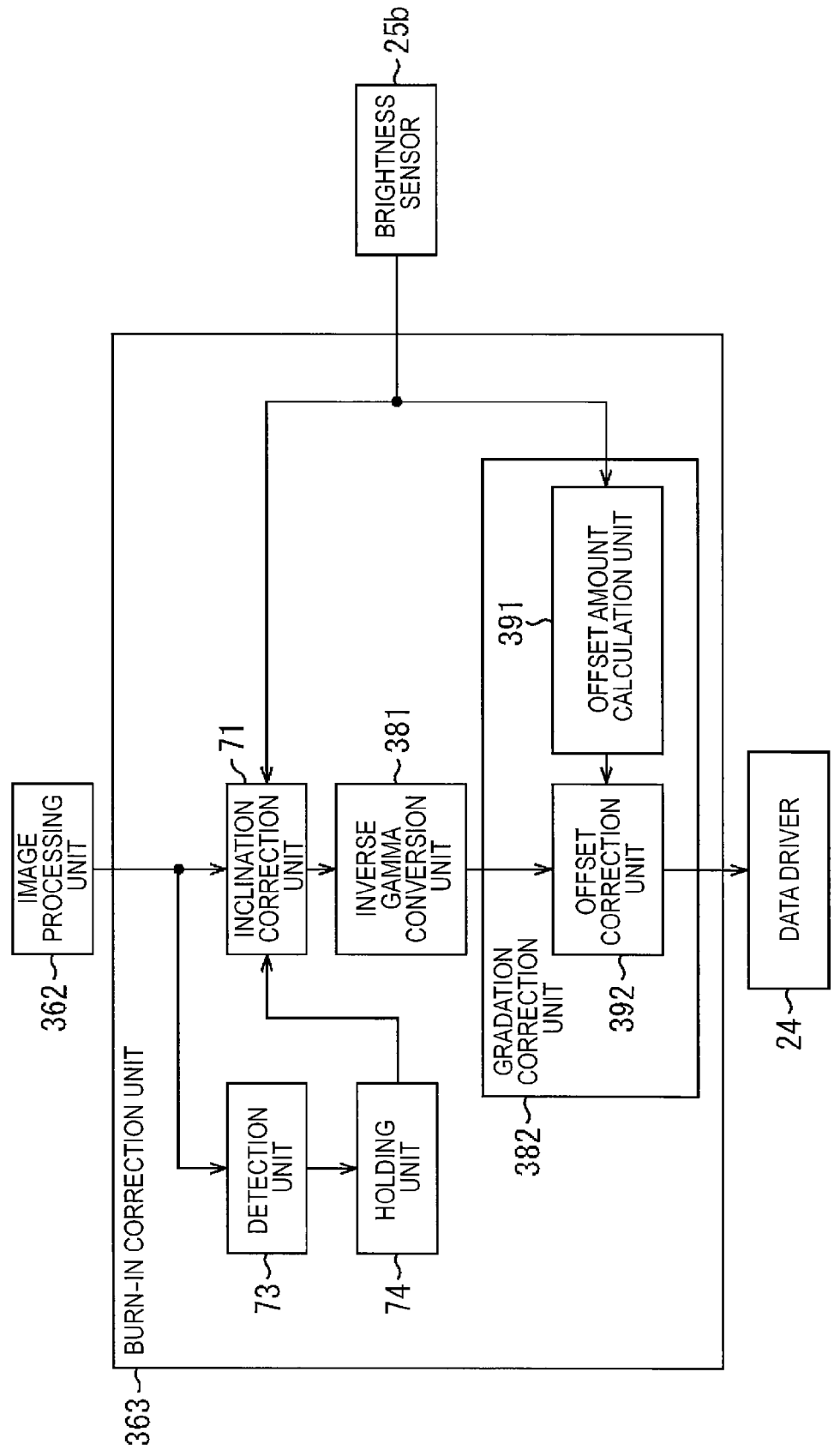
FIG. 31 is a block diagram illustrating a detailed configuration example of a burn-in correction unit of FIG. 30.

Next, FIG. 31 illustrates a detailed configuration example of the burn-in correction unit 363 of FIG. 30.

In the burn-in correction unit 363, portions having the same configurations as the case of the burn-in correction unit 23 of FIG. 6 are denoted with the same reference numerals and explanation thereof is appropriately omitted.

That is, the burn-in correction unit 363 has the same configuration as the case of FIG. 6, except that an inverse gamma conversion unit 381 is newly provided and a gradation correction unit 382 is provided, instead of the gradation correction unit 72 of FIG. 6.

The inverse gamma conversion unit 381 executes the inverse gamma correction for the image signal $S_n$ after the inclination correction process from the inclination correction unit 71 and supplies the image signal $S_n$ after the inverse gamma correction to the gradation correction unit 382.

Thereby, the image signal $S_n$ having the gamma characteristic illustrated in the formula (7) is supplied from the inverse gamma conversion unit 381 to the gradation correction unit 382.

The gradation correction unit 382 adds the same signal potential $(\Delta Vsig)_n$ to $(Vsig)_n$ of the signal potential $(Vsig')$ $(=\pm\sqrt{(\alpha/\alpha')}\times(Vsig)_n)$ of the image signal $S_n$ from the inverse gamma conversion unit 381 and supplies a signal potential $(Vsig")_n$ obtained by the addition thereof to the data driver 24.

That is, the gradation correction unit 382 includes an offset amount calculation unit 391 and an offset correction unit 392.

The offset amount calculation unit 391 calculates the offset amount $(\Delta Vsig)_n$ on the basis of the information for the offset amount calculation previously held in the memory not illustrated in the drawings and the measurement result of the brightness from the brightness sensor 25b and supplies the offset amount to the offset correction unit 392.

The offset amount calculation unit 391 is different from the offset amount calculation unit 161 in that the same offset amount $(\Delta Vsig)_n$ added to $(Vsig)_n$ of the signal potential $(Vsig')_n$ $(=\{\pm\sqrt{(\alpha/\alpha')}\times(Vsig)_n\})$ of each organic EL element for the display is calculated.

A method of calculating the offset amount by the offset amount calculation unit 391 will be described in detail with reference to FIG. 32.

Similar to the offset correction unit 162, the offset correction unit 392 adds $(Vsig)_n$ of the signal potential $(Vsig')_n$ $(=\{\pm\sqrt{(\alpha/\alpha')}\times(Vsig)_n\})$ of the image signal $S_n$ from the inverse gamma conversion unit 381 and the offset amount $(\Delta Vsig)_n$ from the offset amount calculation unit 391.

The offset correction unit 392 is different from the offset correction unit 162 in that the same offset amount $(\Delta Vsig)_n$ from the offset amount calculation unit 391 is added to $(Vsig)_n$ of the signal potential $(Vsig')_n$ of each organic EL element for the display shown by the image signal $S_n$.

The offset correction unit 392 supplies the image signal $S_n$ using the signal potential $(Vsig")_n=[\pm\sqrt{(\alpha/\alpha')}\times\{(Vsig)_n+(\Delta Vsig)_n\}]$ obtained as an addition result thereof as the signal potential to the data driver 24.

[With Respect to Calculation of Offset Amount]

Figure 32:
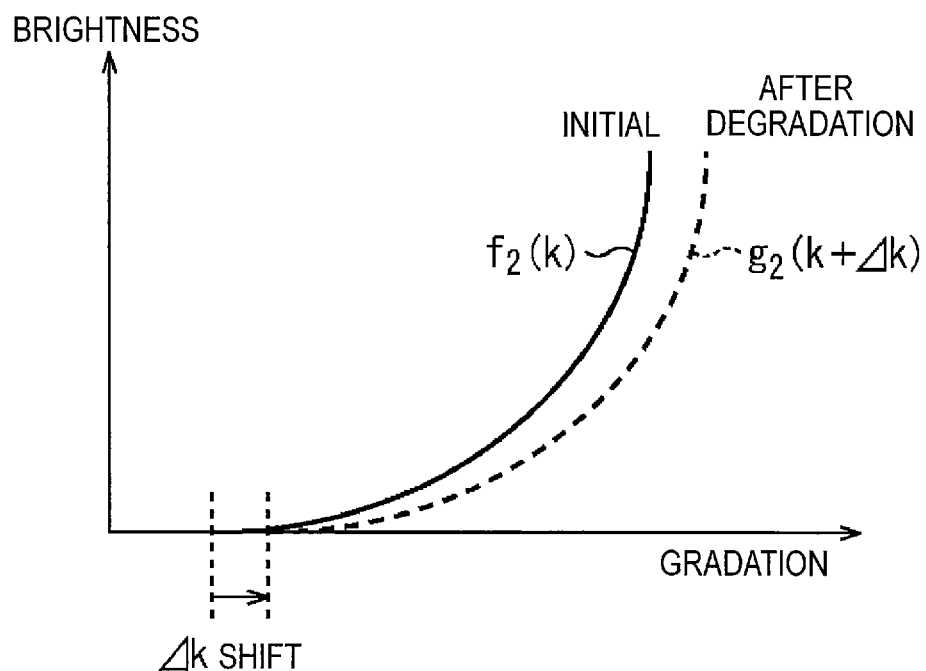
FIG. 32 is another diagram illustrating an example when an offset amount is calculated.

Next, FIG. 32 illustrates an example when the offset amount calculation unit 391 of FIG. 31 calculates the offset amount.

In FIG. 32, a function $f_2(k)$ is a function showing a relation of a gradation k and brightness L before degradation of the current.

The function $f_2(k)$ $(=\alpha\times\beta 2\times k^{2.2})$ is previously held as information for offset amount calculation in the memory not illustrated in the drawings in the offset amount calculation unit 391.

In addition, the function $f_2(k)$ is previously generated on the basis of the measurement result obtained by measuring the brightness of any organic EL element assumed as an organic EL element built in the display unit 25 and is held in the built-in memory not illustrated in the drawings in the offset amount calculation unit 391.

In addition, the function $f_2(k)$ may be generated by the offset amount calculation unit 391, on the basis of the measurement result measured by the brightness sensor 25b before degradation of the current, and may be held in the built-in memory not illustrated in the drawings.

In FIG. 32, a function $g_2(k+\Delta k)(=\alpha\times\beta 2\times(k-\Delta k)^{2.2})$ is a function showing a relation of a gradation k and brightness L after degradation of the current.

The function $g_2(k+\Delta k)$ is generated by the offset amount calculation unit 391, on the basis of the measurement result of the brightness from the brightness sensor 25b. In FIG. 32, a horizontal axis shows a gradation and a vertical axis shows brightness.

The offset amount calculation unit 391 calculates the function $g_2(k+\Delta k)$ by a least-squares method, on the basis of the measurement result of the brightness from the brightness sensor 25b.

In addition, the offset amount calculation unit 391 solves $f_2(k)=g_2(k+\Delta k)$ for the offset amount $\Delta k$, on the basis of the function $f_2(k)$ previously held in the memory not illustrated in the drawings and the calculated function $g_2(k+\Delta k)$.

In addition, the offset amount calculation unit 391 supplies the offset amount $\Delta k$ obtained by solving $f_2(k)=g_2(k+\Delta k)$ to the offset correction unit 392.

In the gradation correction unit 382, the image signal $S_n$ having the gamma characteristic is supplied from the inverse gamma conversion unit 381. For this reason, as illustrated in FIG. 32, the gradation of the attention element can be corrected with the same offset amount $\Delta k$ in any gradation of the attention element.

[Explanation of Operation of Display Device 341]

Figure 33:
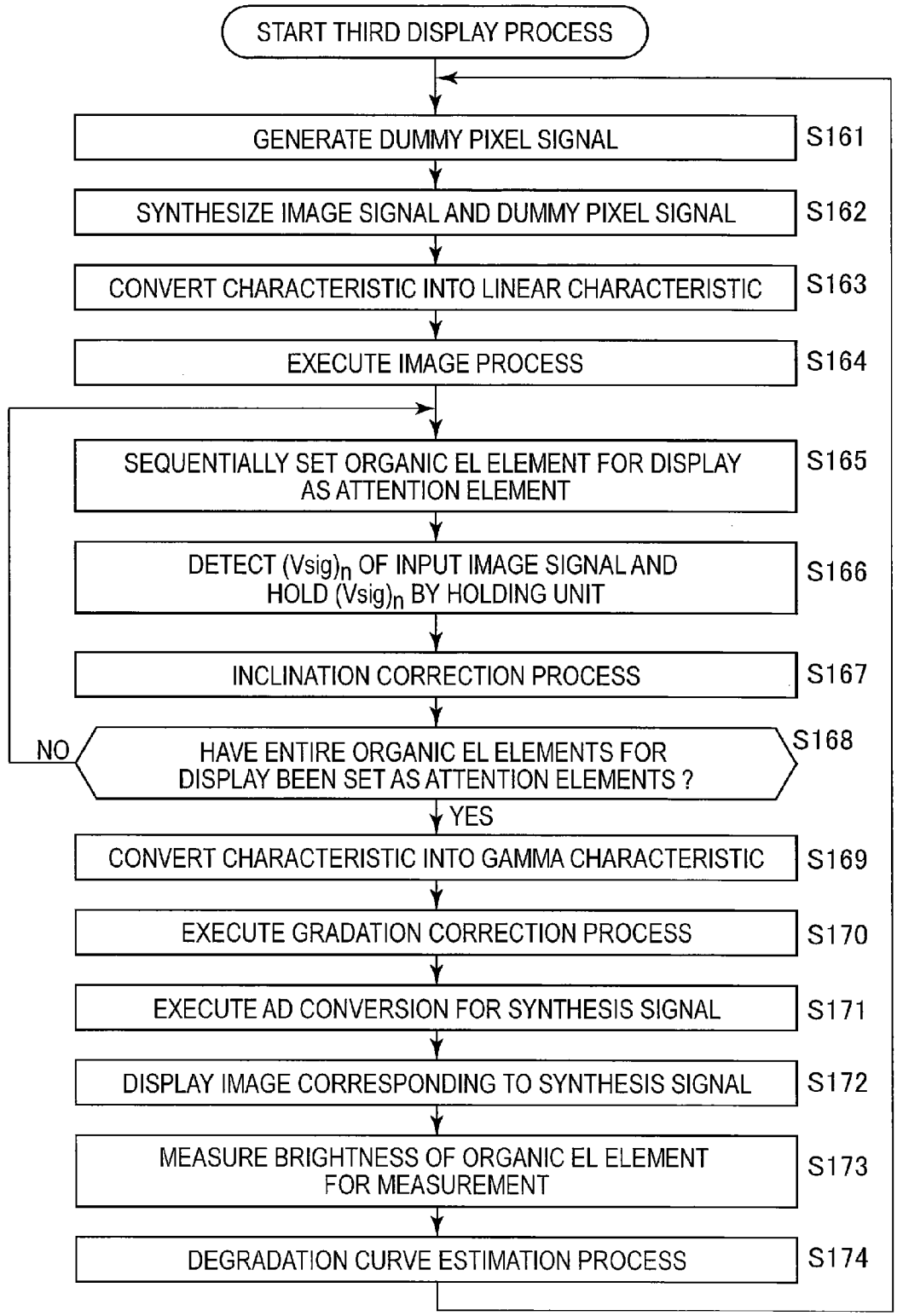
FIG. 33 is a flowchart illustrating a display process executed by a display device of FIG. 30.

Next, a display process (hereinafter, referred to as a third display process) executed by the display device 341 of FIG. 30 will be described with reference to a flowchart of FIG. 33.

The third display process starts when a power supply of the display device 341 is turned on.

In steps S161 and S162, the same processes as steps S1 and S2 of FIG. 18 are executed.

In step S163, the gamma conversion unit 361 executes the gamma correction for the synthesis signal $C_n$ from the signal synthesis unit 22 and supplies the synthesis signal $C_n$ after the gamma correction to the image processing unit 362. Thereby, the characteristic of the synthesis signal $C_n$ (image signal $S_n$) is converted into the linear characteristic.

In step S164, the image processing unit 362 executes a predetermined image process (for example, a color reproduction process or a noise reduction process) for the synthesis signal $C_n$ from the gamma conversion unit 361 of which the characteristic has been converted into the linear characteristic and supplies the synthesis signal $C_n$ after the image process to the burn-in correction unit 363.

In steps S165 to S167, the same processes as steps S3 to S5 of FIG. 18 are executed.

In step S168, the control unit 26 determines whether the entire organic EL elements for the display have been set as the attention elements and when it is determined that the entire organic EL elements for the display have not been set as the attention elements, the control unit 26 causes the process to return to step S165.

In step S165, the control unit 26 pays attention to the organic EL element not yet set as the attention element among the organic EL elements for the display included in the display unit 25, sets the attention paid organic EL element as a new attention element, and causes the process to proceed to step S166 and the same process is repeated hereinafter.

In step S168, when it is determined that the entire organic EL elements for the display have been set as the attention elements, the control unit 26 causes the process to proceed to step S169.

After the entire organic EL elements for the display are set as the attention elements, the synthesis signal $C_n$ including the image signal $S_n$ showing the signal potential $(Vsig')_n$ $(=\pm\sqrt{(\alpha/\alpha')}\times(Vsig)_n)$ of the organic EL element set as the attention element is supplied from the inclination correction unit 71 of FIG. 31 to the inverse gamma conversion unit 381.

In step S169, the inverse gamma conversion unit 381 executes the inverse gamma correction for the image signal $S_n$ after the inclination correction process included the synthesis signal $C_n$ from the inclination correction unit 71 and supplies the image signal $S_n$ after the inverse gamma correction to the gradation correction unit 382. By the inverse gamma correction, the characteristic of the image signal $S_n$ after the inclination correction process is converted from the linear characteristic to the gamma characteristic.

In step S170, the gradation correction unit 382 adds the same signal potential $(Vsig)_n$ to $(Vsig')$ of the signal potential $(Vsig')_n$ $(=\pm\sqrt{(\alpha/\alpha')}\times(Vsig)_n)$ shown by the image signal $S_n$ from the inverse gamma conversion unit 381 of which the characteristic has been converted into the gamma characteristic.

In addition, the gradation correction unit 382 supplies the image signal $S_n$ showing the signal potential $(Vsig'')$ obtained by the addition thereof as the image signal $S_n$ after the gradation correction process to the data driver 24.

That is, the gradation correction unit 382 includes an offset amount calculation unit 391 and an offset correction unit 392.

The offset amount calculation unit 391 calculates the offset amount $(\Delta Vsig)_n$ added to $(Vsig)_n$ of the signal potential $(Vsig')_n$ $(=\pm\sqrt{(\alpha/\alpha\alpha')}\times(Vsig)_n)$ of the image signal $S_n$ after the inclination correction process, on the basis of the information for the offset amount calculation previously held in the memory not illustrated in the drawings and the measurement result of the brightness from the brightness sensor 25b, and supplies the offset amount to the offset correction unit 392.

Similar to the offset correction unit 162, the offset correction unit 392 adds $(Vsig)_n$ of the signal potential $(Vsig')_n$ $(=\{\pm\sqrt{(\alpha/\alpha')}\times(Vsig)_n\})$ of the image signal $S_n$ after the inclination correction process from the inverse gamma conversion unit 381 and the offset amount $(\Delta Vsig)_n$ from the offset amount calculation unit 391.

The offset correction unit 392 supplies the image signal $S_n$ using the signal potential $[\pm\sqrt{(\alpha/\alpha')}\times\{(Vsig)_n+(\Delta Vsig)_n\}]$ obtained as an addition result thereof as the signal potential $(Vsig'')_n$ as the image signal $S_n$ after the gradation correction process to the data driver 24.

In steps S171 to S174, the same processes as steps S8 to S11 of FIG. 18 are executed. In addition, the process returns to step S161 and the same process is repeated hereinafter.

The third display process ends when the power supply of the display device 341 is turned off.

As described above, according to the third display process, the inverse gamma correction is executed for the image signal of which the characteristic has been converted into the linear characteristic. In addition, the gradation correction process is executed for the image signal of which the characteristic has been converted into the gamma characteristic, obtained by the inverse gamma correction.

For this reason, according to the third display process, the gradation can be corrected with the same offset amount, regardless of the signal potential of the attention element, as illustrated in FIG. 32. Therefore, load by the gradation correction process can be alleviated.

In addition, the gradation can be corrected with high precision, as compared with the case in which the gradation is corrected with the same offset amount, regardless of the signal potential of the attention element, in the image signal of which the characteristic has been converted into the linear characteristic.

In the first embodiment, for example, the degradation curve estimation unit 105 estimates the brightness degradation curve for the organic EL element for the display, on the basis of the brightness degradation basis curve held in the built-in memory not illustrated in the drawings and the measurement result of the brightness from the brightness sensor 25b.

Meanwhile, because the brightness degradation curve changes due to the temperature of the organic EL element during the light emission, it is desirable to estimate the brightness degradation curve on the basis of the temperature of the organic EL element.

4. Fourth Embodiment

Configuration Example of Display Device 401

Figure 34:
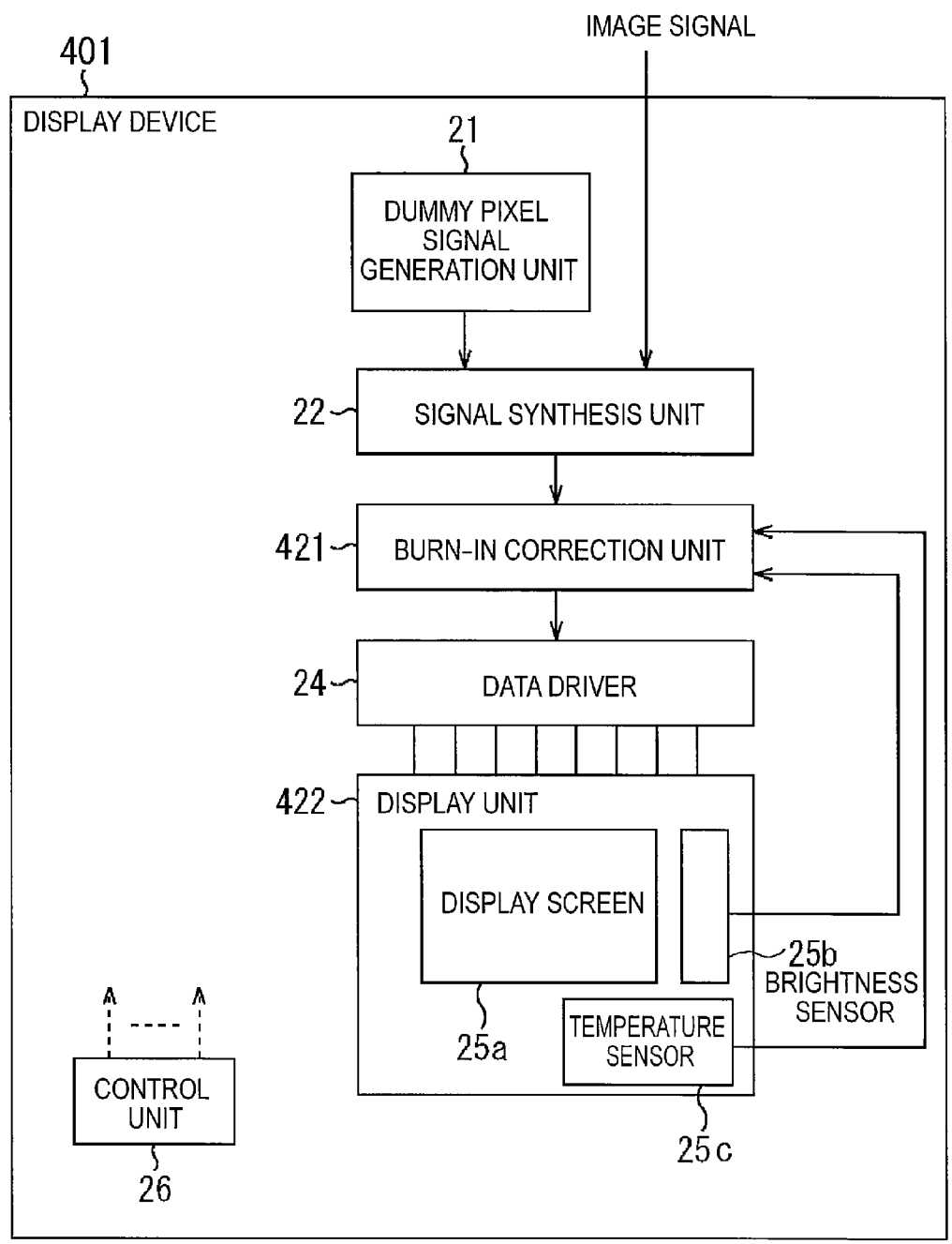
FIG. 34 is a block diagram illustrating a configuration example of a display device to be a fourth embodiment.

Next, FIG. 34 illustrates a configuration example of a display device 401 to be a fourth embodiment.

The display device 401 estimates the brightness degradation curve, on the basis of the temperature of the organic EL element during the light emission.

In the display device 401, portions having the same configurations as the case of the display device 1 (FIG. 1) to be the first embodiment are denoted with the same reference numerals and explanation thereof is appropriately omitted hereinafter.

That is, the display device 401 has the same configuration as the display device 1 of FIG. 1, except that a burn-in correction unit 421 and a display unit 422 are provided, instead of the burn-in correction unit 23 and the display unit 25 of FIG. 1.

A synthesis signal $C_n$ from the signal synthesis unit 22 is supplied to the burn-in correction unit 421. The burn-in correction unit 421 executes the burn-in correction process for the image signal $S_n$ included in the synthesis signal $C_n$ from the signal synthesis unit 22, on the basis of the temperature from a temperature sensor 25c built in the display unit 422. By the burn-in correction process, the burn-in can be prevented from arising at the display screen 25a of the display unit 422.

The display unit 422 has the temperature sensor 25c to measure the temperature of the display unit 422 built therein and the other configuration of the display unit 422 is the same as the configuration of the display unit 25.

The temperature sensor 25c is built in the display unit 422 and measures the temperature of the display unit 422 and supplies the temperature to the burn-in correction unit 421.

[Detail of Burn-In Correction Unit 421]

Figure 35:
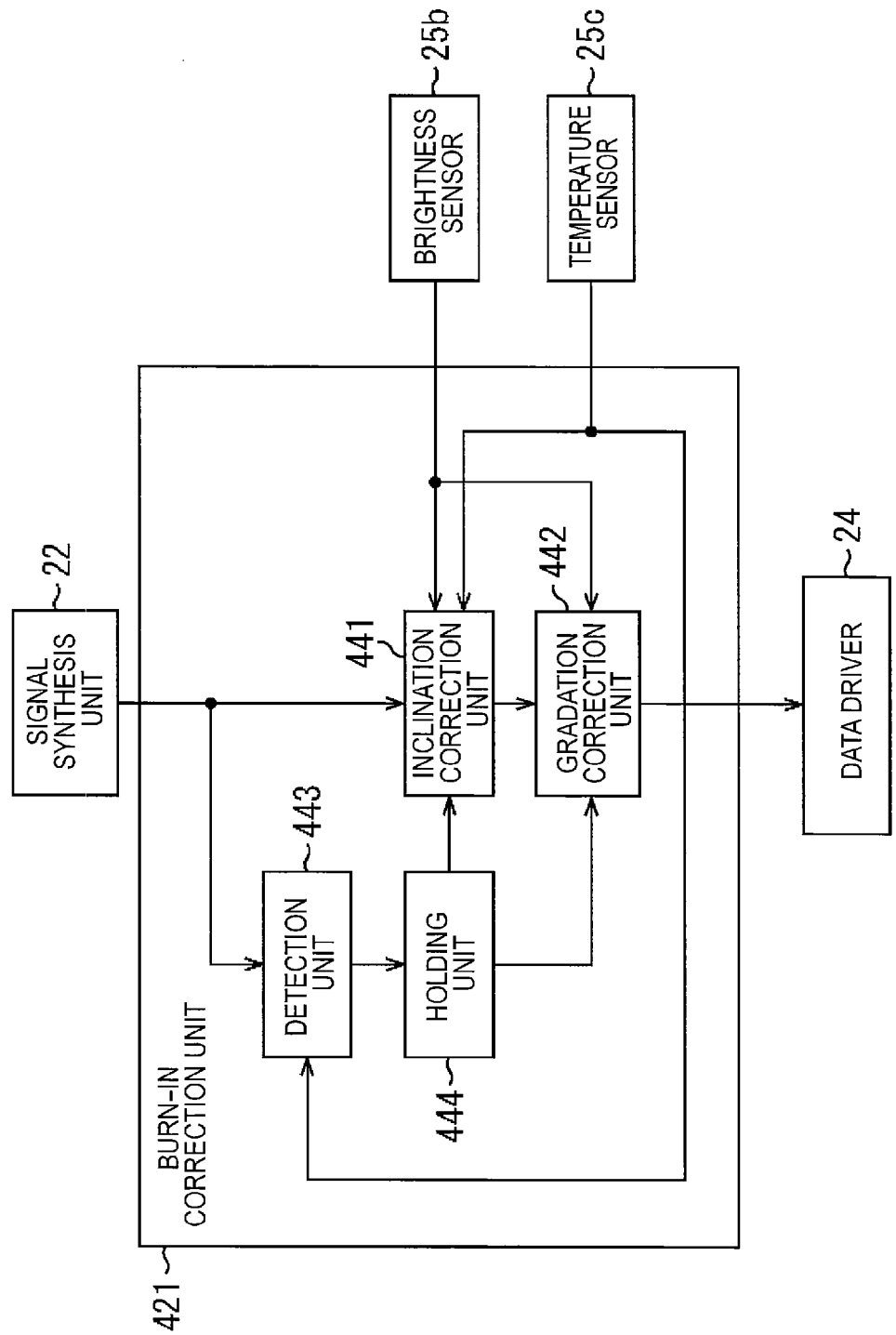
FIG. 35 is a block diagram illustrating a detailed configuration example of a burn-in correction unit of FIG. 34.

Next, FIG. 35 illustrates a detailed configuration example of the burn-in correction unit 421 of FIG. 34.

The burn-in correction unit 421 includes an inclination correction unit 441, a gradation correction unit 442, a detection unit 443, and a holding unit 444.

A synthesis signal $C_n$ from the signal synthesis unit 22 is supplied to the inclination correction unit 441.

The inclination correction unit 441 reads the signal potential $(Vsig)_{n-1}$ of the image signal $S_{n-1}$ input immediately before the image signal $S_n$ included in the synthesis signal $C_n$ from the signal synthesis unit 22 and the temperature $d_{n-1}$ measured by the temperature sensor 25c, from the holding unit 444.

Although described below, the signal potential $(Vsig)_{n-1}$ of the image signal $S_{n-1}$ included in the synthesis signal $C_{n-1}$ supplied from the signal synthesis unit 22 to the inclination correction unit 441 and the internal temperature $d_{n-1}$ of the display unit 25 when the display image corresponding to the image signal $S_{n-1}$ is displayed on the display screen 25a are held in the holding unit 444.

The internal temperature $d_{n-1}$ of the display unit 25 is (almost) the same as the temperature of the organic EL element included in each pixel circuit built in the display unit 25.

The inclination correction unit 441 calculates a correction amount $\pm\sqrt{(\alpha/\alpha')}$ to correct the inclination $\alpha'$ decreased by efficiency degradation with the original inclination $\alpha$, on the basis of the signal potential $(Vsig)_{n-1}$ read from the holding unit 444, the temperature $d_{n-1}$, and the measurement result of the brightness from the brightness sensor 25b.

In addition, the inclination correction unit 441 multiplies the signal potential $(Vsig)_n$ of the image signal $S_n$ included in the synthesis signal $C_n$ from the signal synthesis unit 22 with the calculated correction amount $\pm\sqrt{(\alpha/\alpha')}$. In addition, the inclination correction unit 441 supplies the image signal $C_n$ including the image signal $S_n$ having the signal potential $\{\pm\sqrt{(\alpha/\alpha')}\times(Vsig)_n\}$ obtained as a multiplication result thereof to the gradation correction unit 442.

The gradation correction unit 442 has the same configuration as the gradation correction unit 72 of FIG. 6 and executes the same process as the gradation correction unit 72.

That is, for example, the gradation correction unit 442 reads the signal potential $(Vsig)_n$ of the image signal $S_n$ from the holding unit 444.

In addition, the gradation correction unit 442 calculates $(\Delta Vsig)_n$ corresponding to an offset amount $\Delta k$ to correct the gradation ($k-\Delta k$) decreased by current degradation with the original gradation k, on the basis of the signal potential $(Vsig)_n$ read from the holding unit 444 and the measurement result of the brightness from the brightness sensor 25b.

In addition, the gradation correction unit 442 adds $(\Delta Vsig)_n$ corresponding to the offset amount $\Delta k$ to $(Vsig)_n$ of the signal potential $(Vsig')_n = \{\pm\sqrt{(\alpha/\alpha')}\times(Vsig)_n\}$ of the image signal $S_n$ after the inclination correction process from the inclination correction unit 441.

The gradation correction unit 442 supplies the synthesis signal $C_n$ including the image signal $S_n$ of the signal potential $(Vsig'')_n = [\pm\sqrt{(\alpha/\alpha')}\times\{(Vsig)_n+(\Delta Vsig)_n\}]$ obtained as an addition result thereof, that is, the image signal $S_n$ after the gradation correction process, to the data driver 24.

Similar to the detection unit 73 of FIG. 6, the detection unit 443 detects the signal potential $(Vsig)_n$ of the image signal $S_n$, on the basis of the image signal $S_n$ included in the synthesis signal $C_n$ from the signal synthesis unit 22, supplies the signal potential to the holding unit 444, and holds the signal potential by the holding unit.

In addition, the detection unit 443 supplies the temperature $d_n$ from the temperature sensor 25c to the holding unit 444 and holds the temperature by the holding unit.

The holding unit 444 holds the signal potential $(Vsig)_n$ and the temperature $d_n$ from the detection unit 443.

The reason why the inclination correction unit 441 uses the temperature $d_n$ from the temperature sensor 25c to execute the inclination correction process for the image signal $S_n$ is as follows.

Next, the reason why the inclination correction unit 441 of FIG. 35 uses the temperature $d_n$ from the temperature sensor 25c will be described with reference to FIG. 36.

Figure 36:
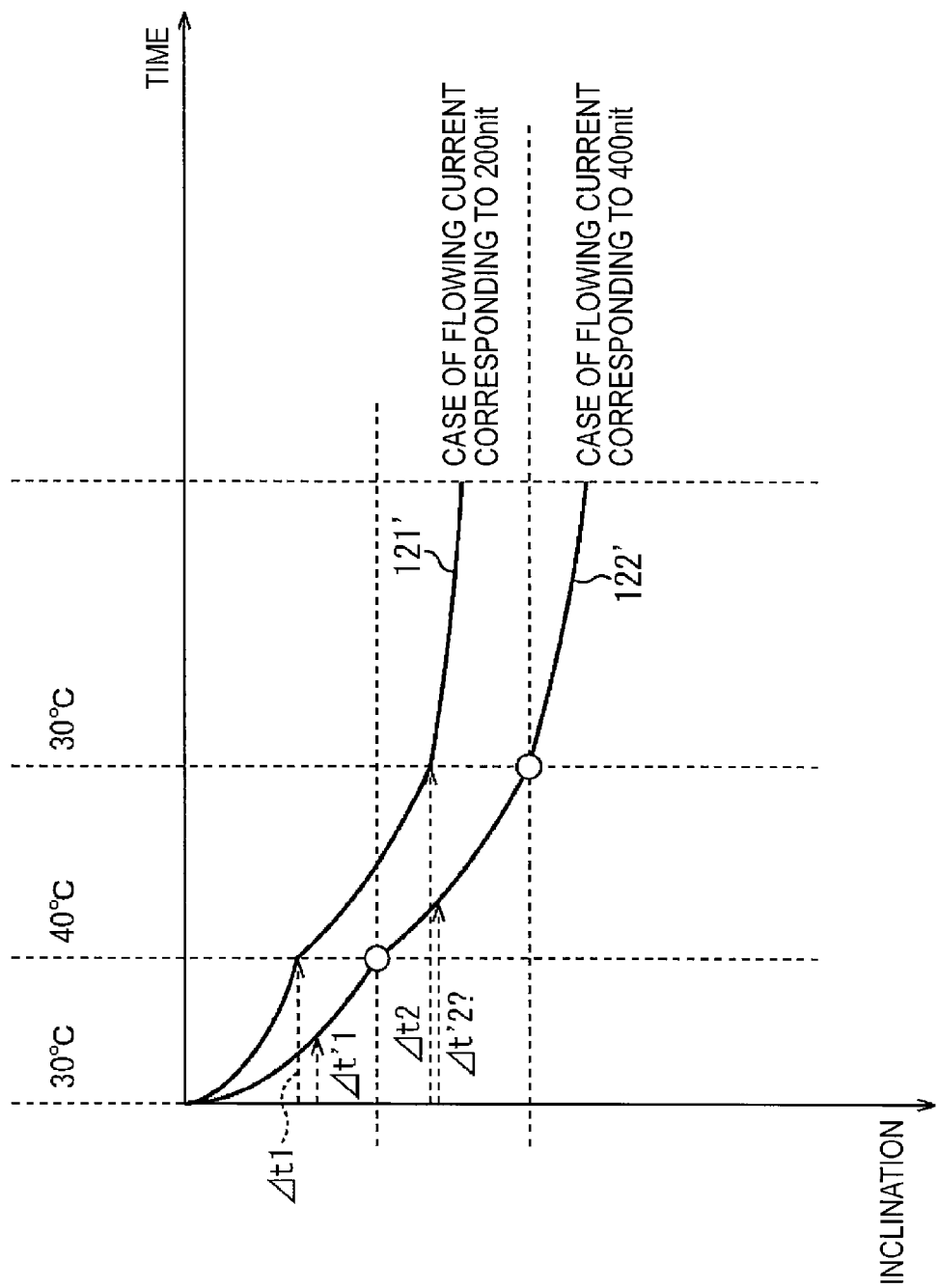
FIG. 36 is a diagram illustrating the reason why a temperature from a temperature sensor is used.

FIG. 36 illustrates an example when the brightness degradation curve changes, according to the change of the temperature of the display unit 422.

In FIG. 36, a horizontal axis shows a time and a vertical axis shows an inclination decreasing according to a time passage.

In FIG. 36, a brightness degradation curve 121' shows a decrease degree of the inclination of the organic EL element when a current I(L=200 nit) has flown to the organic EL element. In the brightness degradation curve 121', the decrease degree of the inclination of the organic EL element becomes different according to the change of the internal temperature of the display unit 422 (the temperature of the organic EL element built in the display unit 422) as illustrated in FIG. 36.

That is, in the brightness degradation curve 121', when the temperature of the organic EL element increases, the inclination of the organic EL element decreases at a faster speed.

In addition, in FIG. 36, a brightness degradation curve 122' shows a decrease degree of the inclination of the organic EL element when a current I(L=400 nit) has flown to the organic EL element. In the brightness degradation curve 122', the decrease degree of the inclination of the organic EL element becomes different according to the change of the internal temperature of the display unit 422, similar to the case of the brightness degradation curve 121'.

Therefore, in the fourth embodiment, in the inclination correction unit 441, the brightness degradation curve is estimated on the basis of the temperature from the temperature sensor 25c in addition to the measurement result of the brightness from the brightness sensor 25b and precision of the estimation of the brightness degradation curve is improved.

[Detail of Inclination Correction Unit 441]

Figure 37:
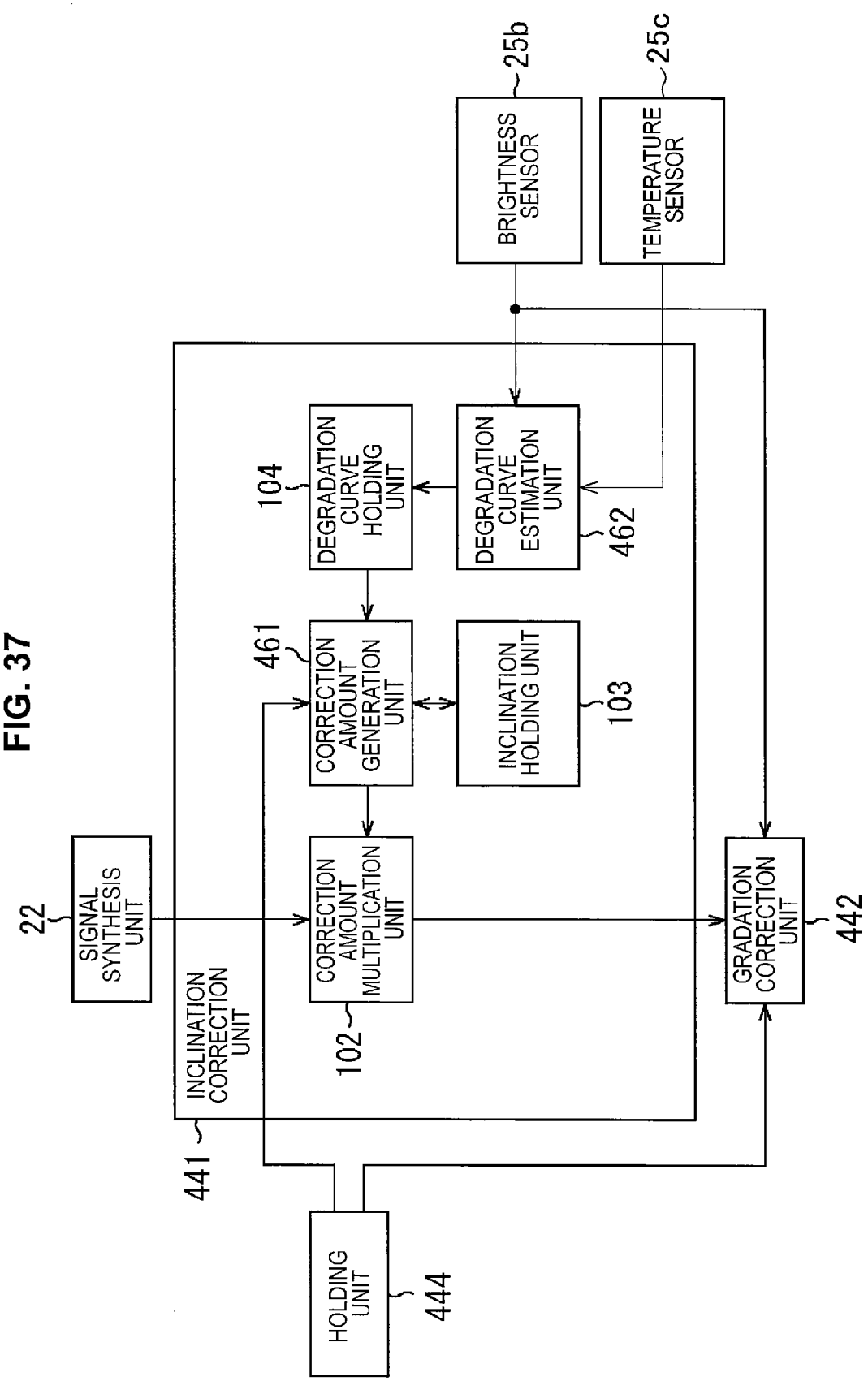
FIG. 37 is a block diagram illustrating a detailed configuration example of an inclination correction unit of FIG. 35.

Next, FIG. 37 illustrates a detailed configuration example of the inclination correction unit 441 of FIG. 35.

In the inclination correction unit 441, portions having the same configurations as the inclination correction unit 71 of FIG. 7 are denoted with the same reference numerals and explanation thereof is appropriately omitted hereinafter.

That is, the inclination correction unit 441 has the same configuration as the case of FIG. 7, except that a correction amount generation unit 461 and a degradation curve estimation unit 362 are provided, instead of the correction amount generation unit 101 and the degradation curve estimation unit 105 of FIG. 7.

Similar to the correction amount generation unit 101 of FIG. 7, the correction amount generation unit 461 reads the inclination α' of the attention element from the inclination holding unit 103.

In addition, the correction amount generation unit 461 reads the signal potential $(Vsig)_{n-1}$ of the attention element and the internal temperature $d_{n-1}$ of the display unit 422 when the display image corresponding to the image signal $S_{n-1}$ is displayed, from the holding unit 444.

The correction amount generation unit 461 calculates the current $I_{n-1}$ flowing to the attention element, on the basis of the signal potential $(Vsig)_{n-1}$ of the attention element read from the holding unit 444.

In addition, the correction amount generation unit 461 reads a brightness degradation curve corresponding to a combination of the calculated current $I_{n-1}$ and the temperature $d_{n-1}$ read from the holding unit 444 among the plurality of brightness degradation curves held in the degradation curve holding unit 104, from the degradation curve holding unit 104.

In the degradation curve holding unit 104 of FIG. 37, for each value of a plurality of different currents I(L=Xnit, d=Y), a brightness degradation curve estimated on the basis of a measurement result obtained by measuring the brightness of the organic EL element for the measurement to which the current I(L=Xnit, d=Y) has flown is hold in a form of being associated with a combination of the current I(L=Xnit) and the temperature d=Y.

Here, the current I(L=Xnit, d=Y) shows a current I(L=Xnit) flowing to the organic EL element for the measurement, when the internal temperature d of the display unit 422 is Y.

The correction amount generation unit 461 calculates the latest inclination α' of the attention element, on the basis of the inclination α' of the attention element read from the inclination holding unit 103 and the brightness degradation curve read from the degradation curve holding unit 104.

In addition, the correction amount generation unit 461 supplies the latest inclination α' of the attention element to the inclination holding unit 103 and holds (stores) the latest inclination by overwriting.

In addition, the correction amount generation unit 461 generates (calculates) a correction amount $\pm\sqrt{(\alpha/\alpha')}$, on the basis of the latest inclination α' of the attention element, and supplies the correction amount to the correction amount multiplication unit 102. A method of generating a correction amount by the correction amount generation unit 461 will be described in detail with reference to FIG. 38.

Similar to the degradation curve estimation unit 105 of FIG. 7, the degradation curve estimation unit 462 has a memory not illustrated in the drawings built therein and a brightness degradation basis curve becoming a basis when a brightness degradation curve showing a decrease degree of the inclination is estimated is previously held in the memory.

The degradation curve estimation unit 462 estimates the brightness degradation curve showing the decrease of the brightness of the organic EL element for the display by the efficiency degradation, on the basis of the measurement result of the brightness from the brightness sensor 25b, the brightness degradation basis curve previously held in the memory not illustrated in the drawings, and the temperature from the temperature sensor 25c.

The degradation curve estimation unit 462 supplies the brightness degradation curve obtained as an estimation result thereof to the degradation curve holding unit 104 and holds the brightness degradation curve by the degradation curve holding unit, in a form of being associated with the current I(L=Xnit) flowing to the organic EL element for the measurement measured by the brightness sensor 25b and the temperature $d_n$ at the time of measurement of the brightness sensor 25b.

A method of estimating the brightness degradation curve by the degradation curve estimation unit 462 will be described in detail with reference to FIGS. 39 and 40.

[Generation of Correction Amount Executed by Correction Amount Generation Unit 461]

Figure 38:
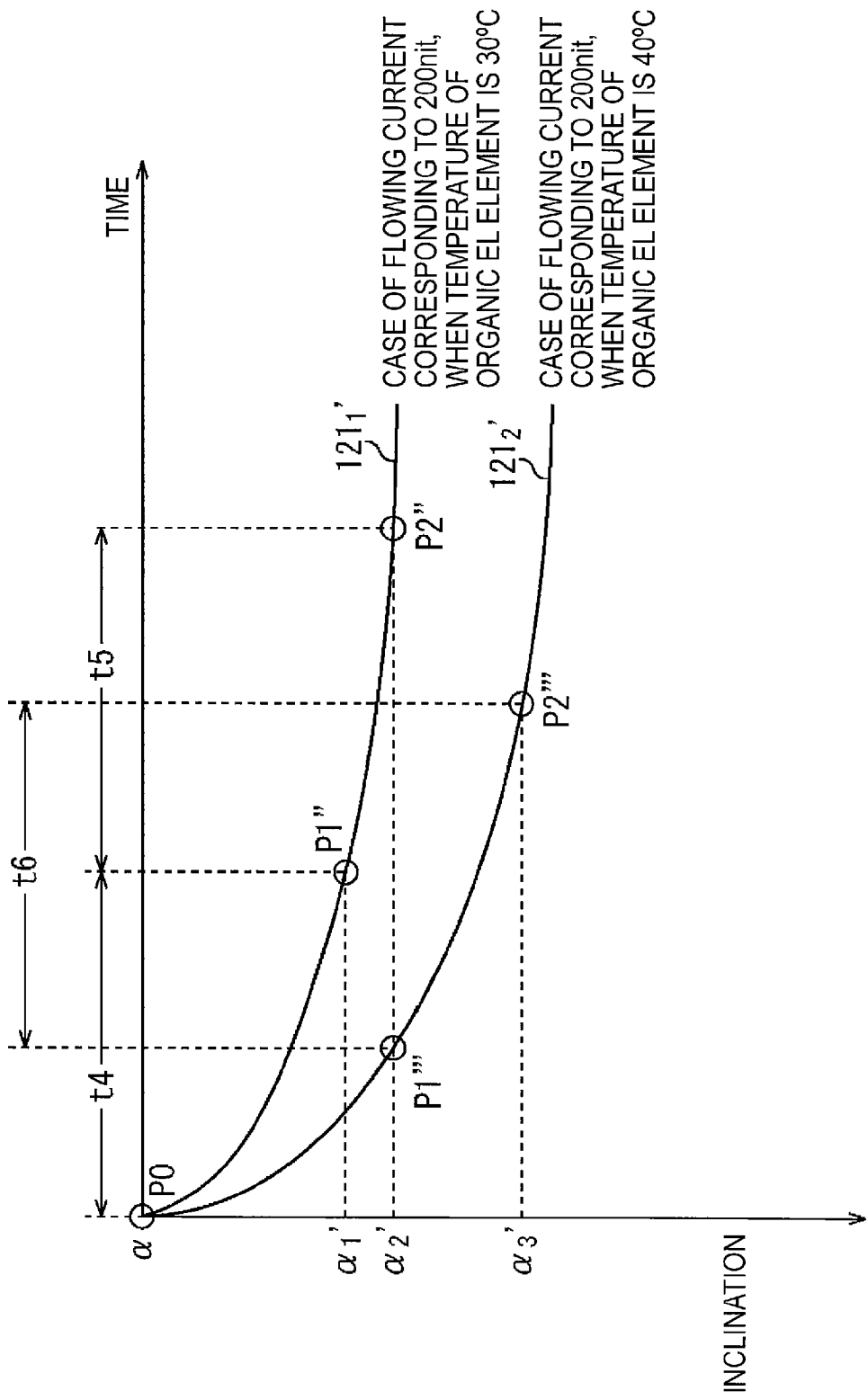
FIG. 38 is another diagram illustrating an example of a brightness degradation curve.

Next, FIG. 38 illustrates an example of the brightness degradation curve held in the degradation curve holding unit 104 of FIG. 37.

In FIG. 38, a brightness degradation curve 121₁' shows a degradation of the inclination when a current I(L=200 nit) has flown in the case in which the temperature of the organic EL element for the measurement is 30 degrees.

In addition, in FIG. 38, a brightness degradation curve 121₂' shows a degradation of the inclination when a current I(L=200 nit) has flown in the case in which the temperature of the organic EL element for the measurement is 40 degrees.

Each of the brightness degradation curves 121₁' and 121₂' is generated (estimated) by the degradation curve estimation unit 462 of FIG. 37, is supplied to the degradation curve holding unit 104, and is held in the degradation curve holding unit.

In FIG. 38, a horizontal axis shows a time and a vertical axis shows an inclination.

The correction amount generation unit 461 of the inclination correction unit 441 reads the signal potential $(Vsig)_{n-1}$ of the attention element and the temperature $d_{n-1}$ of the attention element from the holding unit 444.

In addition, the correction amount generation unit 461 reads the brightness degradation curve corresponding to the current $I_{n-1}$ based on the read signal potential $(Vsig)_{n-1}$ of the attention element and the read temperature $d_{n-1}$ of the attention element among the plurality of brightness degradation curves held in the degradation curve holding unit 104, from the degradation curve holding unit 104.

That is, the correction amount generation unit 461 is different from the correction amount generation unit 101 in that the brightness degradation curve corresponding to the signal potential $(Vsig)_{n-1}$ of the attention element and the temperature $d_{n-1}$ of the attention element is read from the degradation curve holding unit 104. However, the correction amount generation unit 461 executes the same process as the correction amount generation unit 101, except for the above difference.

Specifically, for example, when the current $I_{n-1}$ is the current (I=200 nit) and the temperature $d_{n-1}$ is 30 degrees, the correction amount generation unit 461 reads the brightness degradation curve $121_1'$ associated with the current I(L=200 nit) and the temperature d=30 degrees, from the degradation curve holding unit 104.

Similar to the correction amount generation unit 101, the correction amount generation unit 461 reads the inclination $\alpha'$ of the attention element from the inclination holding unit 103. In addition, the correction amount generation unit 461 executes the same process as the correction amount generation unit 101 of FIG. 9, on the basis of the read inclination $\alpha'$ of the attention element and the brightness degradation curve $121_1'$ read from the degradation curve holding unit 104.

In addition, the correction amount generation unit 461 supplies the correction amount generated in the same way as the correction amount generation unit 101 of FIG. 9 to the correction amount multiplication unit 102.

For example, when the current $I_{n-1}$ is the current I(L=200 nit) and the temperature $d_{n-1}$ is 40 degrees, the correction amount generation unit 461 reads the brightness degradation curve $121_2'$ associated with the current I(L=200 nit) and the temperature d=40 degrees, from the degradation curve holding unit 104.

In addition, similar to the correction amount generation unit 101, the correction amount generation unit 461 reads the inclination $\alpha'$ of the attention element from the inclination holding unit 103. In addition, the correction amount generation unit 461 executes the same process as the correction amount generation unit 101 of FIG. 9, on the basis of the read inclination $\alpha'$ of the attention element and the brightness degradation curve $121_2'$ read from the degradation curve holding unit 104.

That is, for example, in the case of the inclination $\alpha'=\alpha$ of the attention element, when the latest inclination $\alpha'$ of the attention element is calculated on the basis of the brightness degradation curve $121_1'$, the correction amount generation unit 461 executes the following process.

That is, the correction amount generation unit 461 moves a point P0 (point P0 corresponding to the inclination $\alpha'=\alpha$ of the attention element) on the brightness degradation curve $121_1'$ to a point P1″ after a passage of the time t4 for which the current I(L=200 nit, d=30) has flown to the attention element and calculates the latest inclination $\alpha=\alpha_1'$ of the attention element, similar to the correction amount generation unit 101.

In FIG. 38, the same inclinations $\alpha_1'$, $\alpha_2'$, and $\alpha_3'$ as the inclination $\alpha'$ described in FIG. 9 are illustrated as the inclination $\alpha'$ described in a vertical axis to make a correspondence relation with FIG. 9 clear. However, the inclinations are different in actuality.

That is, the inclinations $\alpha_1'$, $\alpha_2'$, and $\alpha_3'$ described in FIG. 38 are generally different from the inclinations $\alpha_1'$, $\alpha_2'$, and $\alpha_3'$ illustrated in FIG. 9.

For example, in the case of the inclination $\alpha'=\alpha_1'$ of the attention element, when the latest inclination $\alpha'=\alpha_2'$ of the attention element is calculated on the basis of the brightness degradation curve $121_1'$, the correction amount generation unit 461 executes the following process.

That is, the correction amount generation unit 461 moves a point P1″ (point P1″ corresponding to the inclination $\alpha'=\alpha_1'$ of the attention element) on the brightness degradation curve $121_1'$ to a point P2″ after a passage of the time t5 for which the current I(L=200 nit, d=30) has flown to the attention element and calculates the latest inclination $\alpha=\alpha_2'$ of the attention element, similar to the correction amount generation unit 101.

For example, in the case of the inclination $\alpha'=\alpha_2'$ of the attention element, when the latest inclination $\alpha'=\alpha_3'$ of the attention element is calculated on the basis of the brightness degradation curve $121_2'$, the correction amount generation unit 461 executes the following process.

That is, the correction amount generation unit 461 moves a point P1‴ (point P1‴ corresponding to the inclination $\alpha'=\alpha_2'$ of the attention element) on the brightness degradation curve $121_2'$ to a point P2‴ after a passage of the time t6 for which the current I(L=200 nit, d=40) has flown to the attention element and calculates the latest inclination $\alpha'=\alpha_3'$ of the attention element, similar to the correction amount generation unit 101.

[Estimation of Brightness Degradation Curve Executed by Degradation Curve Estimation Unit 462]

Next, an example of an estimation method of estimating a brightness degradation curve by the degradation curve estimation unit 462 of FIG. 37 will be described with reference to FIGS. 39 and 40.

Figure 39:
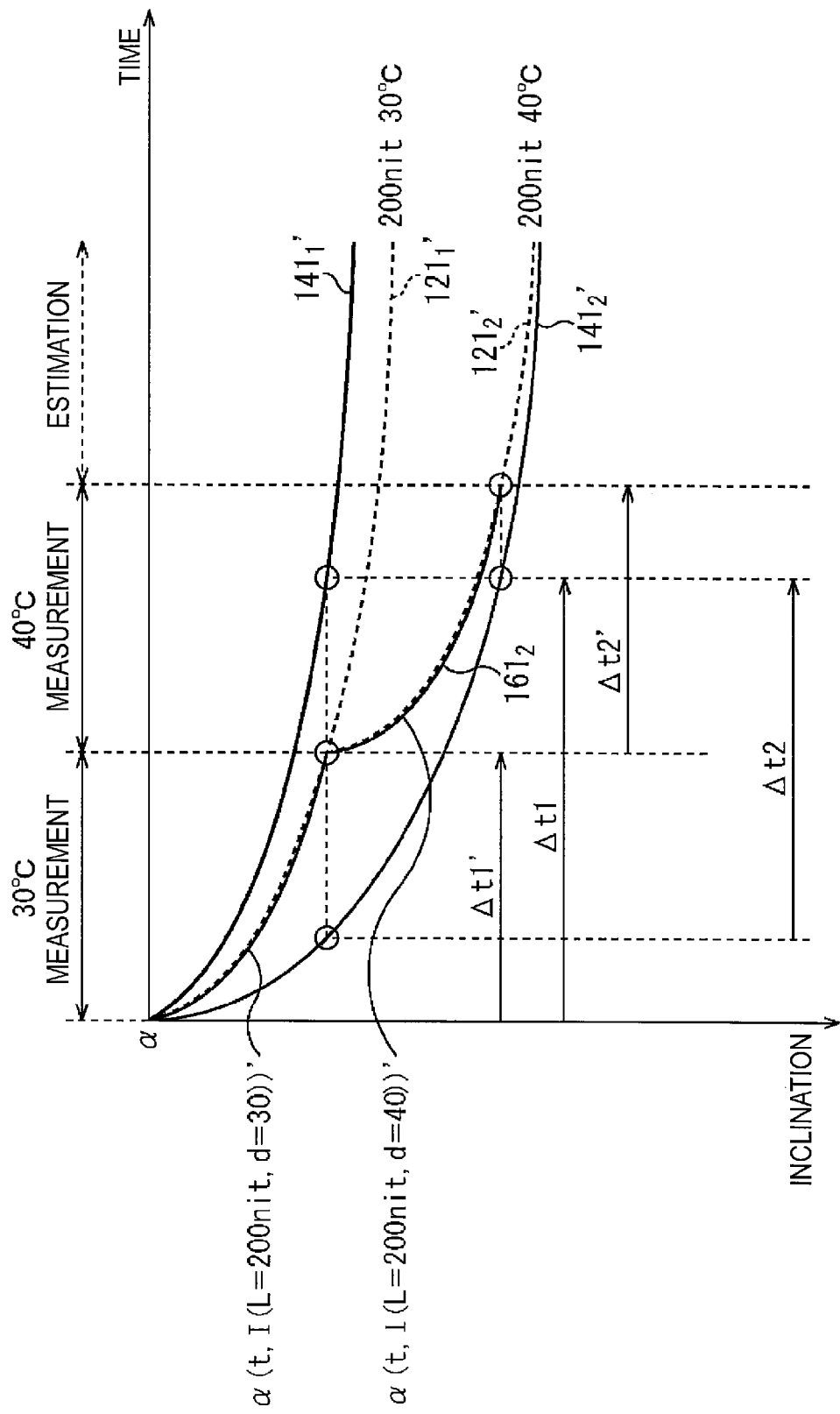
FIG. 39 is a first diagram illustrating an example of an estimation method of estimating a brightness degradation curve by a degradation curve estimation unit of FIG. 37.

FIG. 39 illustrates an example when the degradation curve estimation unit 462 estimates a brightness degradation curve, on the basis of a measurement result of the brightness from the brightness sensor 25b and a measurement result of the temperature from the temperature sensor 25c.

In FIG. 39, a horizontal axis shows a time and a vertical axis shows an inclination.

First, a method of estimating the brightness degradation curve $121_1'$ (FIG. 38) showing a decrease of brightness of the organic EL element for the measurement to which the current I(L=200 nit) flows by the degradation curve estimation unit 462, when the internal temperature of the display unit 422 is 30 degrees, will be described.

The brightness L(t, I(L=200 nit, d=30)) obtained by measuring the brightness of the organic EL element for the measurement to which the current I(L=200 nit, d=30) flows is supplied from the brightness sensor 25b to the degradation curve estimation unit 462.

Here, the current I(L=200 nit, d=30) shows the current I(L=200 nit) flowing to the organic EL element for the measurement, when the internal temperature of the display unit 422 is 30 degrees.

In addition, the internal temperature d=30 of the display unit 422, that is, the temperature d=30 of the organic EL element for the measurement to which the current I(L=200 nit, d=30) flows is supplied from the temperature sensor 25c to the degradation curve estimation unit 462.

The degradation curve estimation unit 462 previously stores a value of the current I(L=Xnit, d=Y) showing the current I(L=Xnit) flowing to the organic EL element when the temperature d is Y, in a built-in memory not illustrated in the drawings. Here, the value of the current I(L=Xnit, d=Y) is the same as the value of the current I(L=Xnit), regardless of the temperature d=Y. However, for the convenience of explanation, the current is represented as the current I(L=Xnit, d=Y).

The degradation curve estimation unit 462 calculates the inclination $\alpha(t, I(L=200 \text{ nit}, d=30))'$ for the time t, by a formula $\alpha(t, I(L=200 \text{ nit}, d=30))'=L(t, I(L=200 \text{ nit}))/I(L=200 \text{ nit}, d=30))$ derived on the basis of the formula 4, on the basis of the value I(L=200 nit, d=30) of the current previously held in a built-in memory not illustrated in the drawings and the measurement result L(t, I(L=200 nit)) from the brightness sensor 25b.

In addition, the degradation curve estimation unit 462 previously holds the brightness degradation basis curve 141$_1$' in the built-in memory not illustrated in the drawings. The brightness degradation basis curve 141$_1$' is an average brightness degradation curve showing the brightness decrease of the organic EL element to which the current I(L=200 nit, d=30) flows. For example, the brightness degradation basis curve 141$_1$' becomes a basis when the brightness degradation curve 121$_1$' is estimated.

The degradation curve estimation unit 462 estimates the brightness degradation curve 121$_1$' for the organic EL element for the measurement when the current I(L=200 nit, d=30) flows, on the basis of the calculated inclination $\alpha$(t, I(L=200 nit, d=30))' and the previously held brightness degradation basis curve 141$_1$'.

That is, for example, the degradation curve estimation unit 462 calculates a time $\Delta t1'$ until the inclination $\alpha$(T, I(L=200 nit, d=30))' is obtained from when the inclination $\alpha$(0, I(L=200 nit, d=30))'=$\alpha$ is obtained, as illustrated in FIG. 39.

In FIG. 39, the same times $\Delta t1'$, $\Delta t1$, $\Delta t2'$, and $\Delta t2$ as the times $\Delta t1'$, $\Delta t1$, $\Delta t2'$, and $\Delta t2$ illustrated in FIG. 10 are illustrated to make a correspondence relation with FIG. 10 clear. However, the time is different in actuality.

That is, the inclinations $\Delta t1'$, $\Delta t1$, $\Delta t2'$, and $\Delta t2$ illustrated in FIG. 39 are generally different from the inclinations $\Delta t1'$, $\Delta t1$, $\Delta t2'$, and $\Delta t2$ illustrated in FIG. 10.

In addition, for example, the degradation curve estimation unit 462 calculates a time $\Delta t1$ until the inclination $\alpha$(T, I(L=200 nit, d=30))' is obtained from when the inclination $\alpha$(0, I(L=200 nit, d=30))'=$\alpha$ is obtained, in the brightness degradation basis curve 141$_1$', as illustrated in FIG. 39.

In addition, the degradation curve estimation unit 462 calculates a temperature acceleration coefficient $\Delta t1'/\Delta t1$ showing a decrease speed of the inclination $\alpha$(t, I(L=200 nit))' for the brightness degradation curve 141$_1$', on the basis of the calculated times $\Delta t1'$ and $\Delta t1$.

The degradation curve estimation unit 462 multiplies the calculated temperature acceleration coefficient $\Delta t1'/\Delta t1$ with a formula A(t, I(L=200 nit, d=30)) showing the brightness degradation basis curve 141$_1$' to estimate the brightness degradation curve 121$_1$', supplies the brightness degradation curve to the degradation curve holding unit 104, and holds the brightness degradation curve by the degradation curve holding unit.

That is, for example, the degradation curve estimation unit 462 supplies the brightness degradation curve 121' showing a new formula ($\Delta t1'/\Delta t1$)×A(t, I(L=200 nit, d=30)) obtained by the multiplication thereof to the degradation curve holding unit 104 and holds the brightness degradation curve by the degradation curve holding unit, in a form of being associated with the combination of the current I(L=200 nit, d=30) and the temperature d=30.

Next, a method of estimating the brightness degradation curve 122$_2$' (FIG. 38) showing the brightness decrease of the organic EL element for the measurement to which the current I(L=400 nit) flows by the degradation curve estimation unit 462, when the temperature of the display unit 422 is 40 degrees, will be described.

For example, the brightness L(t, I(L=200 nit, d=40)) obtained by measuring the brightness of the organic EL element for the measurement to which the current I(L=200 nit, d=40) flows is supplied from the brightness sensor 25b to the degradation curve estimation unit 462.

Here, the current I(L=200 nit, d=40)) shows the current I(L=200 nit) flowing to the organic EL element for the measurement, when the internal temperature of the display unit 422 is 40 degrees.

In addition, the internal temperature d=40 of the display unit 422, that is, the temperature d=40 of the organic EL element for the measurement to which the current I(L=200 nit, d=40) flows is supplied from the temperature sensor 25c to the degradation curve estimation unit 462.

The degradation curve estimation unit 462 calculates the inclination $\alpha$(t, I(L=200 nit, d=30))' for the time t, by a formula $\alpha$(t, I(L=200 nit, d=40))'=L(t, I(L=200 nit))/I(L=200 nit, d=30)) derived on the basis of the formula 4, on the basis of the value I(L=200 nit, d=40) of the current previously held in a built-in memory not illustrated in the drawings and the measurement result L(t, I(L=200 nit)) from the brightness sensor 25b.

In addition, the degradation curve estimation unit 462 previously holds the brightness degradation basis curve 141$_2$' in the built-in memory not illustrated in the drawings. The brightness degradation basis curve 141$_2$' is an average brightness degradation curve showing the brightness decrease of the organic EL element to which the current I(L=200 nit, d=40) flows. For example, the brightness degradation basis curve 141$_2$' becomes a basis when the brightness degradation curve 121$_2$' is estimated.

The degradation curve estimation unit 462 estimates the brightness degradation curve 121$_2$' for the organic EL element for the measurement when the current I(L=200 nit, d=40) has flown, on the basis of the calculated inclination $\alpha$(t, I(L=200 nit, d=40))' and the previously held brightness degradation basis curve 141$_2$'.

That is, for example, the degradation curve estimation unit 462 calculates a time $\Delta t2'$ until the inclination $\alpha$(T, I(L=200 nit, d=40))' is obtained from when the inclination $\alpha$(0, I(L=200 nit, d=40))'=$\alpha$ is obtained, as illustrated in FIG. 39.

In addition, for example, the degradation curve estimation unit 462 calculates a time $\Delta t2$ until the inclination $\alpha$(T, I(L=200 nit, d=40))' is obtained from when the inclination $\alpha$(0, I(L=200 nit, d=40))' is obtained, in the brightness degradation basis curve 141$_2$', as illustrated in FIG. 39.

In addition, the degradation curve estimation unit 462 calculates a temperature acceleration coefficient $\Delta t2'/\Delta t2$ showing a decrease speed of the inclination $\alpha$(t, I(L=200 nit, d=40))' for the brightness degradation curve 141$_2$', on the basis of the calculated times $\Delta t2'$ and $\Delta t2$.

The degradation curve estimation unit 462 multiplies the calculated temperature acceleration coefficient $\Delta t2'/\Delta t2$ with a formula A(t, I(L=200 nit, d=40)) showing the brightness degradation basis curve 141$_2$' to estimate the brightness degradation curve 121$_2$', supplies the brightness degradation curve to the degradation curve holding unit 104, and holds the brightness degradation curve by the degradation curve holding unit.

That is, for example, the degradation curve estimation unit 462 supplies the brightness degradation curve 121$_2$' showing a new formula ($\Delta t2'/\Delta t2$)×A(t, I(L=200 nit, d=40)) obtained by the multiplication thereof to the degradation curve holding unit 104 and holds the brightness degradation curve by the degradation curve holding unit, in a form of being associated with the combination of the current I(L=200 nit, d=40) and the temperature d=40.

The degradation curve estimation unit 462 previously holds a plurality of brightness degradation basis curves (for example, brightness degradation basis curves 141$_1$' and 141$_2$') in a built-in memory not illustrated in the drawings.

However, when the degradation curve estimation unit 462 estimates the brightness degradation curve for the organic EL element for the measurement to which the current I(L=Xnit, d=Y) flows, for each of a plurality of different currents I(L=Xnit, d=Y), it is necessary to hold brightness degradation basis curves of the number corresponding to the number of the plurality of different currents I(L=Xnit, d=Y) in the built-in memory.

In this case, it is necessary to increase a storage capacity of the memory according to the number of brightness degradation basis curves.

Therefore, similar to the case of the degradation curve estimation unit 105, in the degradation curve estimation unit 462, any brightness degradation basis curve of the plurality of brightness degradation basis curves can be held as a master curve that can be used even when any brightness degradation curve is estimated and the storage capacity of the memory can be saved.

In addition, the degradation curve estimation unit 462 may hold one master curve for each of the plurality of different currents I(L=Xnit) and the storage capacity of the memory can be further saved.

Figure 40:
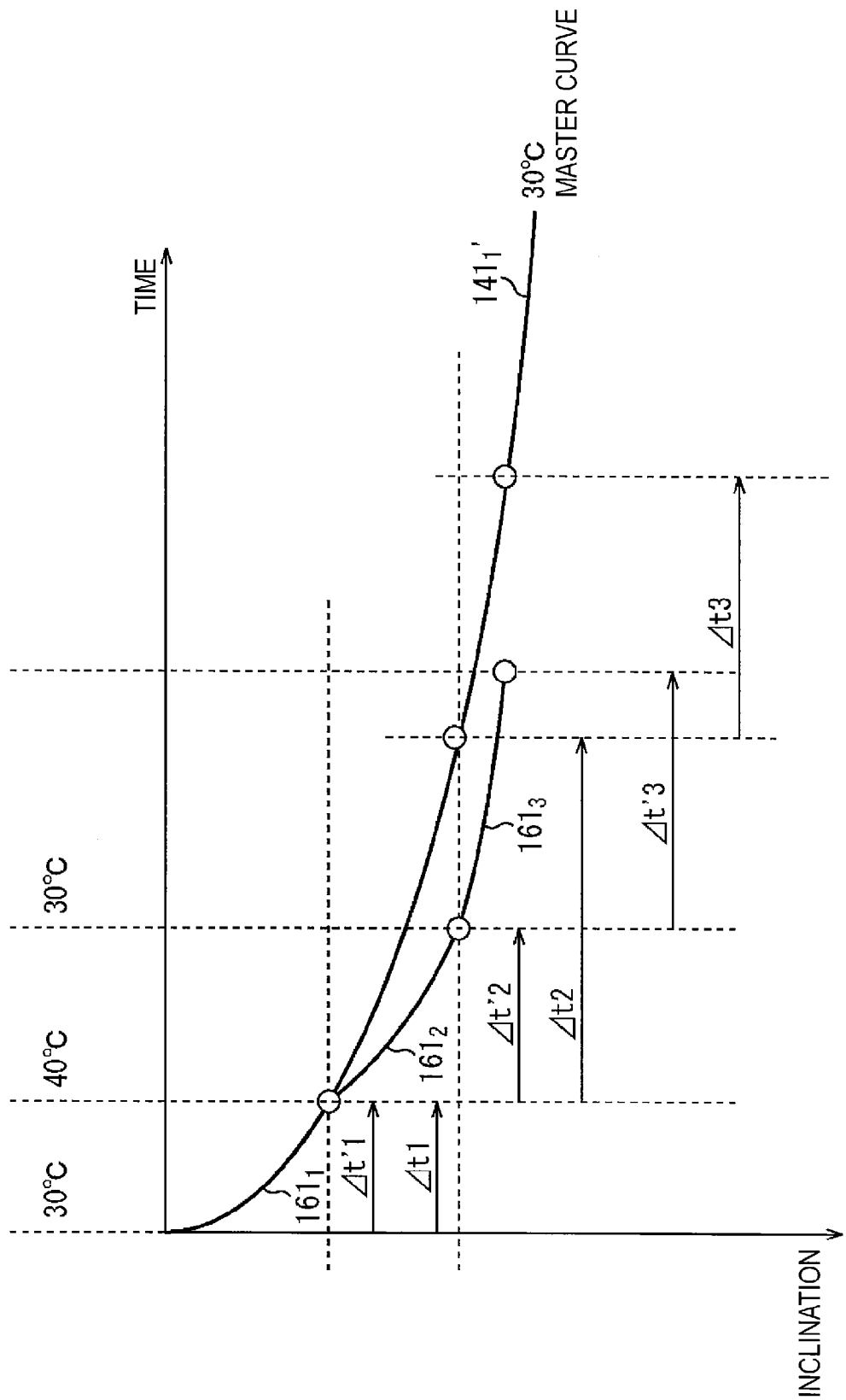
FIG. 40 is a second diagram illustrating an example of an estimation method of estimating a brightness degradation curve by a degradation curve estimation unit of FIG. 37.

Next, FIG. 40 illustrates an example when the brightness degradation curve $141_1'$ is used as the master curve for the current I(L=200 nit).

The brightness degradation curve $141_1'$ illustrated in FIG. 40 shows the master curve for the current I(L=200 nit).

The brightness degradation curve $141_1'$ used as the master curve is used at the time of estimating the brightness degradation curve for the organic EL element for the measurement to which the current I(L=200 dit, d=Y) flows, regardless of the internal temperature d=Y of the display unit 422.

For example, the degradation curve estimation unit 462 calculates a function $161_1$ showing a decrease degree of the inclination, on the basis of the measurement result from the brightness sensor 25b.

In addition, for example, the degradation curve estimation unit 462 acquires a temperature d to be a measurement result from the temperature sensor 25c from the temperature sensor 25c.

In addition, the degradation curve estimation unit 462 calculates the temperate acceleration coefficient $\Delta t1'/\Delta t1$, on the basis of the brightness degradation basis curve $141_1'$ used as the master curve and the function $161_1$. Hereinafter, the degradation curve estimation unit 462 estimates the brightness degradation curve as described above.

In addition, the degradation curve estimation unit 462 determines whether the temperature of the pixel circuit 184 has changed from 30 degrees to 40 degrees, on the basis of the temperature d from the temperature sensor 25c.

In addition, when it is determined that the temperature of the pixel circuit 184 has changed from 30 degrees to 40 degrees, on the basis of the temperature d from the temperature sensor 25c, the degradation curve estimation unit 462 calculates a function $161_2$, on the basis of a measurement result obtained by measurement by the brightness sensor 25b, after the temperature d changes to 40 degrees.

In addition, the degradation curve estimation unit 462 calculates the temperate acceleration coefficient $\Delta t2'/\Delta t2$, on the basis of the brightness degradation basis curve $141_1'$ used as the master curve and the function $161_2$. Hereinafter, the degradation curve estimation unit 462 estimates the brightness degradation curve as described above.

In addition, the degradation curve estimation unit 462 determines whether the temperature of the pixel circuit 184 has changed from 40 degrees to 30 degrees, on the basis of the temperature d from the temperature sensor 25c.

In addition, when it is determined that the temperature of the pixel circuit 184 has changed from 40 degrees to 30 degrees, on the basis of the temperature d from the temperature sensor 25c, the degradation curve estimation unit 462 calculates a function $161_3$, on the basis of a measurement result obtained by measurement by the brightness sensor 25b, after the temperature d changes to 30 degrees.

In addition, the degradation curve estimation unit 462 calculates the temperate acceleration coefficient $\Delta t3'/\Delta t3$, on the basis of the brightness degradation basis curve $141_1'$ used as the master curve and the function $161_3$. Hereinafter, the degradation curve estimation unit 462 estimates the brightness degradation curve as described above.

[Explanation of Operation of Display Device 401]

Next, a display process (hereinafter, referred to as a fourth display process) executed by the display device 401 of FIG. 34 will be described with reference to a flowchart of FIG. 41.

The fourth display process starts when the power supply of the display device 401 is turned on.

In steps S191 and S192, the same processes as steps S1 and S2 of FIG. 18 are executed.

In step S193, the control unit 26 sequentially pays attention to the organic EL element for the display included in the display unit 422 and sets the attention paid organic EL element as the attention element.

In step S194, the detection unit 443 of the burn-in correction unit 421 detects the signal potential $(Vsig)_n$ of the attention element, on the basis of the image signal $S_n$ included in the synthesis signal $C_n$ from the signal synthesis unit 22, supplies the signal potential to the holding unit 444, and holds the signal potential by the holding unit.

In step S195, the detection unit 443 of the burn-in correction unit 421 detects the temperature $d_n$ to be the measurement result from the temperature sensor 25c as the temperature $d_n$ of the attention element, supplies the temperature to the holding unit 444, and holds the temperature by the holding unit. The temperature $d_n$ shows an internal temperature of the display unit 422 when the attention element emits light, on the basis of the signal potential $(Vsig)_n$ of the attention element.

The internal temperature $d_n$ of the display unit 422 is (almost) the same as the temperature $d_n$ of the attention element.

In step S196, the inclination correction unit 441 of the burn-in correction unit 421 executes the inclination correction process using the temperature $d_{n-1}$ for the signal potential $(Vsig)_n$ of the attention element supplied from the signal synthesis unit 22. The detail of the inclination correction process will be described with reference to a flowchart of FIG. 42.

The inclination correction unit 441 supplies the signal potential $(Vsig')_n (=\pm\sqrt{(\alpha/\alpha')}\times(Vsig)_n)$ of the attention element after the correction in the inclination correction process to the gradation correction unit 442.

In step S197, the gradation correction unit 442 of the burn-in correction unit 421 executes the gradation correction process for adding $(\Delta Vsig)_n$ corresponding to the offset amount to $(Vsig)_n$ of the signal potential $(Vsig')_n (=\pm\sqrt{(\alpha/\alpha')}\times(Vsig)_n)$ of the attention pixel supplied from the inclination correction unit 441 and correcting the gradation $(k-\Delta k)$ in the attention pixel with the original gradation k, similar to the gradation correction unit 72.

In step S198, the control unit 26 determines whether the entire organic EL elements for the display included in the display unit 422 have been set as the attention elements and when it is determined that the entire organic EL elements for the display have not been set as the attention elements, the control unit 26 returns the process to step S193.

In step S193, the control unit 26 pays attention to the organic EL element not yet set as the attention element among the organic EL elements for the display included in the display unit 422, sets the attention paid organic EL element as a new attention element, and causes the process to proceed to step S419. Hereinafter, the same process is repeated.

In step S198, when it is determined that the entire organic EL elements for the display included in the display unit 422 have been set as the attention elements, the control unit 26 causes the process to proceed to step S199.

After the entire organic EL elements for the display are set as the attention elements, the synthesis signal $C_n$ including the image signal $S_n$ showing the signal potential $(Vsig'')_n$ $(=\pm\sqrt{(\alpha/\alpha')}\times\{(Vsig)_n+(\Delta Vsig)_n\})$ of the organic EL element set as the attention element is supplied to the data driver 24.

In steps S199 to S201, the same processes as steps S8 to S10 of FIG. 18 are executed.

In step S202, the inclination correction unit 441 executes the degradation curve estimation process for estimating the brightness degradation curve on the basis of the measurement result of the temperature from the temperature sensor 25*c* in addition to the measurement result of the brightness from the brightness sensor 25*b* and holding the brightness degradation curve. The degradation curve estimation process will be described in detail with reference to a flowchart of FIG. 43.

After step S202 ends, the process returns to step S191 and the same process is executed hereinafter.

The fourth display process ends when the power supply of the display device 401 is turned off.

As described above, according to the fourth display process, the inclination correction process is executed on the basis of the temperature of the organic EL element. For this reason, the inclination $\alpha'$ of the organic EL element in which the decrease speed of the inclination becomes different can be corrected with the original inclination $\alpha$ more accurately, according to the temperature of the organic EL element.

In addition, according to the fourth display process, when the temperature of the organic EL element for the measurement changes, the brightness degradation curve at the temperature before the change is estimated on the basis of the measurement result of the brightness obtained before the change of the temperature and the brightness degradation curve at the temperature after the change is estimated on the basis of the measurement result of the brightness obtained after the change of the temperature.

For this reason, the brightness degradation curve can be estimated more accurately for each temperature, using both the measurement results of the brightness obtained before and after the change of the temperature, as compared with the case in which one brightness degradation curve is estimated.

[Detail of Inclination Correction Process Executed by Inclination Correction Unit 441]

Next, the inclination correction process in step S196 of FIG. 41 will be described with reference to a flowchart of FIG. 42.

In step S221, the correction amount generation unit 461 reads the inclination $\alpha'$ of the attention element from the inclination holding unit 103, similar to the correction amount generation unit 101.

In step S222, the correction amount generation unit 461 reads the signal potential $(Vsig)_{n-1}$ of the attention element from the holding unit 444, similar to the correction amount generation unit 101.

In step S223, the correction amount generation unit 461 reads the temperature $d_{n-1}$ of the attention element from the holding unit 444.

In step S224, the correction amount generation unit 461 calculates the current $I_{n-1}$ flowing to the organic EL element corresponding to the attention pixel, on the basis of the signal potential $(Vsig)_{n-1}$ of the attention element read from the holding unit 444.

In addition, the correction amount generation unit 101 reads the brightness degradation curve associated with the combination of the calculated current $I_{n-1}$ and the temperature $d_{n-1}$ read from the holding unit 444 among the plurality of brightness degradation curves held in the degradation curve holding unit 104, from the degradation curve holding unit 104.

In step S225, the correction amount generation unit 461 calculates the latest inclination $\alpha'$ of the attention element, on the basis of the inclination $\alpha'$ of the attention element read from the inclination holding unit 103 and the brightness degradation curve read from the degradation curve holding unit 104, similar to the correction amount generation unit 101.

In addition, the correction amount generation unit 101 supplies the latest inclination $\alpha'$ of the attention element to the inclination holding unit 103 and holds (stores) the latest inclination by overwriting.

In step S226, the correction amount generation unit 461 generates (calculates) the correction amount $\pm\sqrt{(\alpha/\alpha')}$, on the basis of the latest inclination $\alpha'$ of the attention element, and supplies the correction amount to the correction amount multiplication unit 102, similar to the correction amount generation unit 101.

In step S227, the same process as step S36 of FIG. 19 is executed. That is, the correction amount multiplication unit 102 multiplies the signal potential $(Vsig)_n$ of the attention element with the correction amount $\pm\sqrt{(\alpha/\alpha')}$ from the correction amount generation unit 461.

Figure 41:
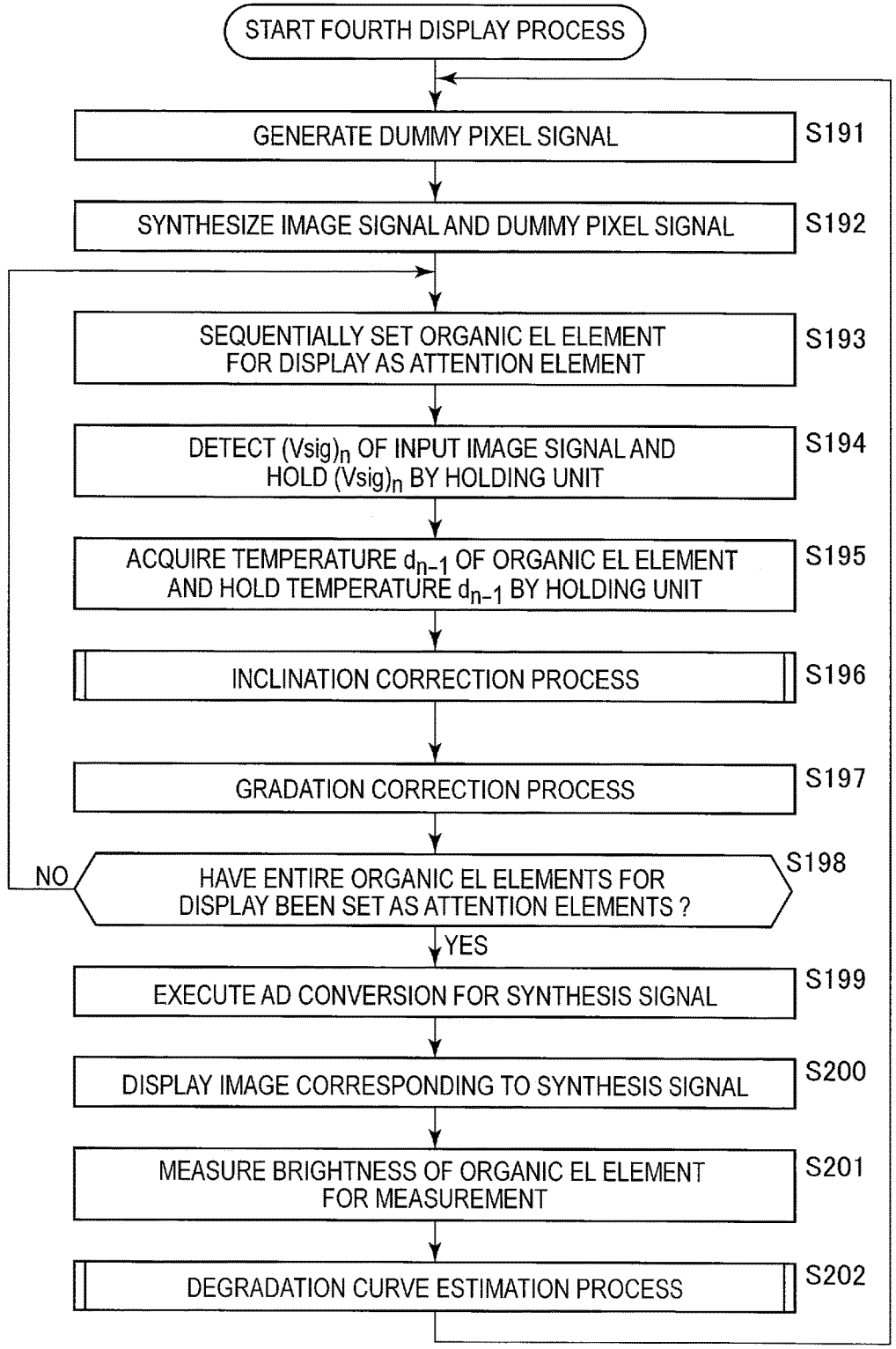
FIG. 41 is a flowchart illustrating a display process executed by a display device of FIG. 34.
Figure 42:
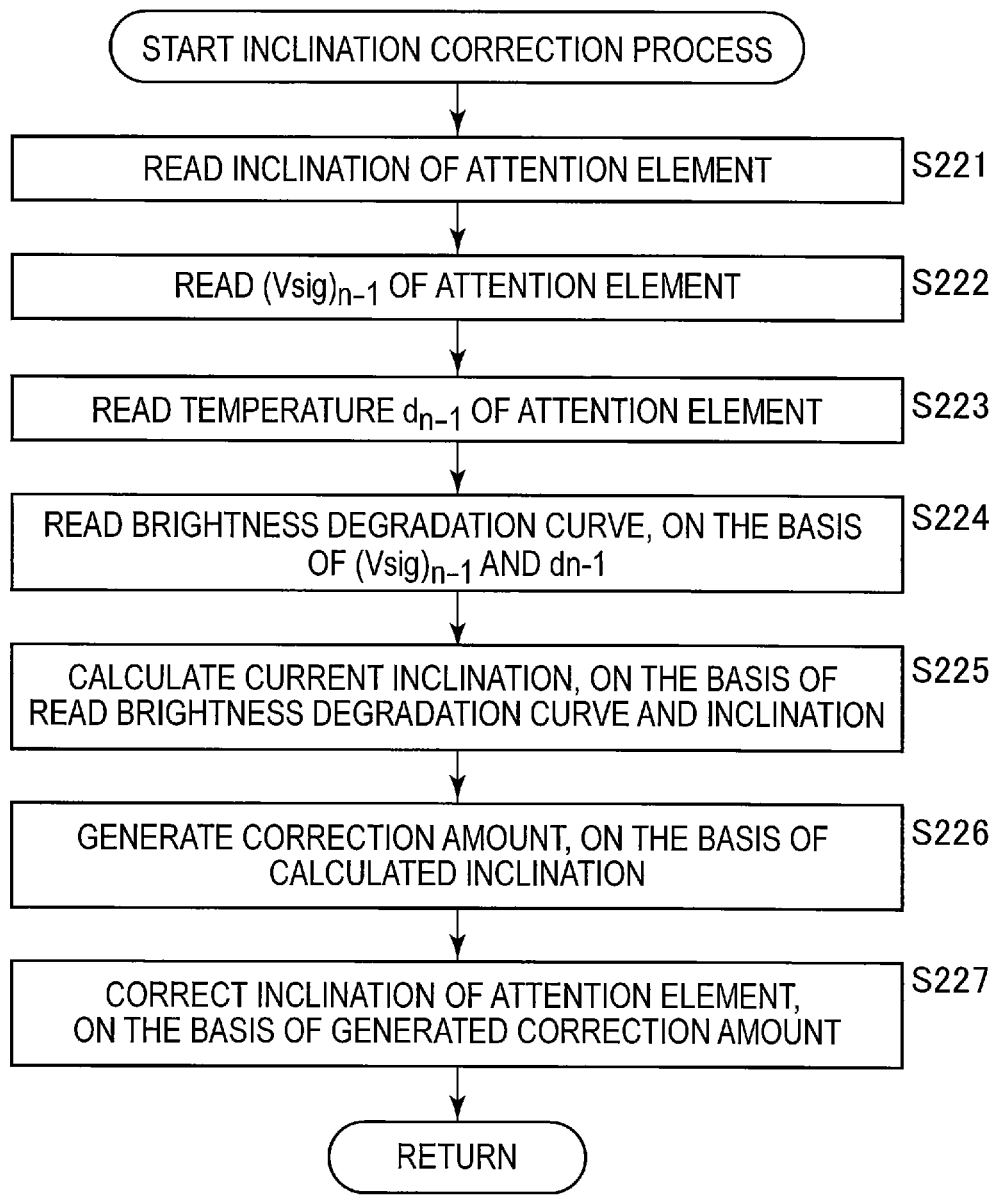
FIG. 42 is a flowchart illustrating an inclination correction process in step S196 of FIG. 41.

Then, the inclination correction process of FIG. 42 ends and the process returns to step S196 of FIG. 41. The correction amount multiplication unit 102 supplies the signal potential $\{\pm\sqrt{(\alpha/\alpha')}\times(Vsig)_n\}$ obtained by the multiplication as the signal potential $(Vsig')_n$ of the attention element in which the inclination $\alpha'$ has been corrected with the original inclination $\alpha$ to the gradation correction unit 442 and the following process is executed.

[Detail of Degradation Curve Estimation Process Executed by Degradation Curve Estimation Unit 462]

Next, the degradation curve estimation process in step S202 of FIG. 41 will be described with reference to a flowchart of FIG. 43.

In step S241, the degradation curve estimation unit 462 acquires the internal temperature d=Y of the display unit 422 from the temperature sensor 25*c*. The temperature sensor 25*c* appropriately measures the internal temperature of the display unit 422 and supplies the temperature d=Y as the measurement result thereof to the degradation curve estimation unit 462.

Figure 43:
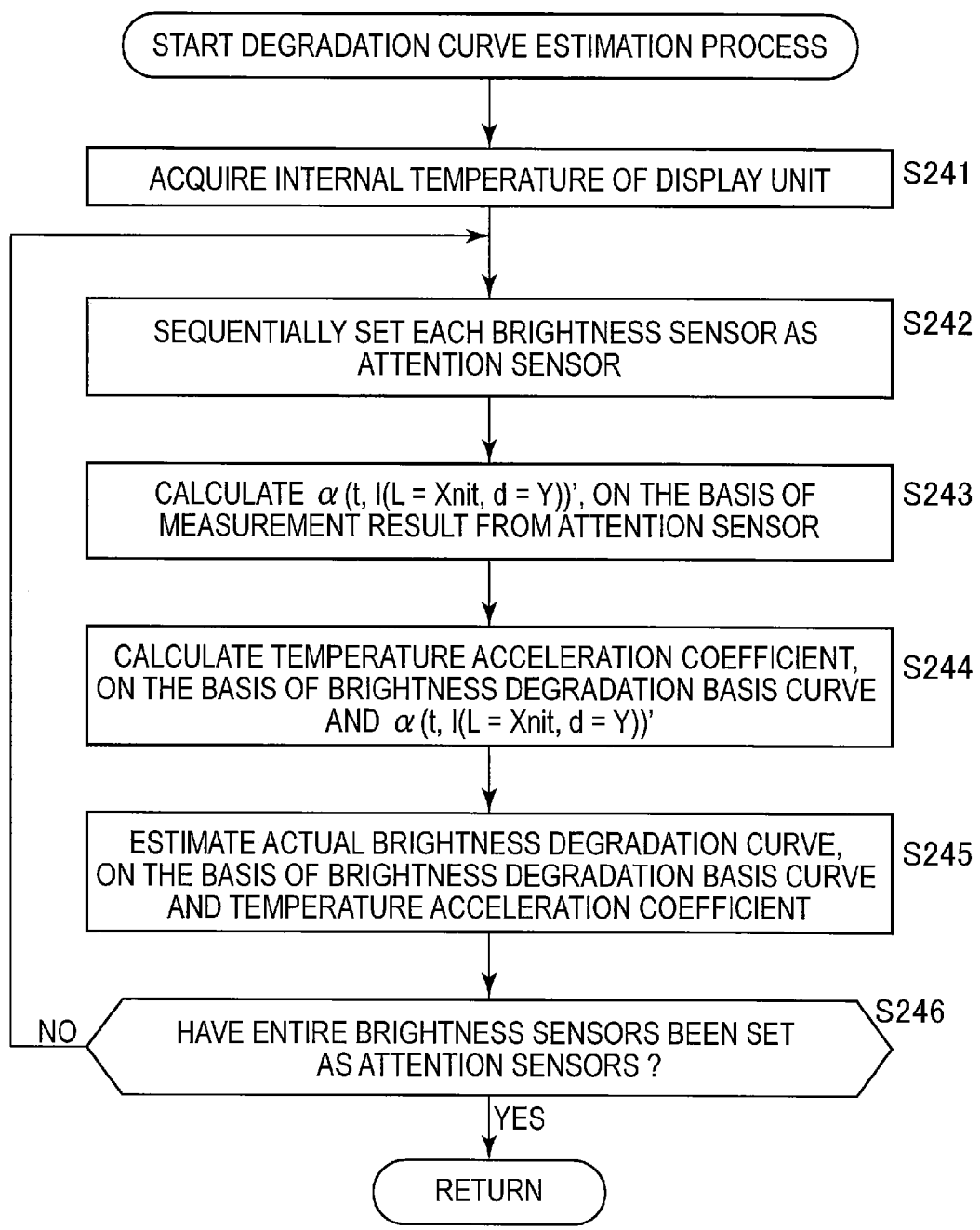
FIG. 43 is a flowchart illustrating a degradation curve estimation process in step S202 of FIG. 41.

When the temperature d=Y acquired in step S241 is the same as the temperature d=Y acquired in step S241 in the previous degradation curve estimation process, steps S242 to S246 may be skipped and the degradation curve estimation process of FIG. 43 may end.

This is based on that, when the temperature d=Y acquired in step S241 is the same as the temperature d=Y acquired in step S241 in the previous degradation curve estimation process, the brightness degradation curve at the time of the internal temperature of the display unit 422 being the temperature d=Y is generated and is completely held in the degradation curve holding unit 104.

In step S242, the degradation curve estimation unit 462 sequentially pays attention to the plurality of brightness sensors 25b and sets the attention paid brightness sensor 25b as the attention sensor.

The brightness $L(t, I(L=Xnit, d=Y))$ obtained by measuring the brightness of the pixel circuit for the measurement to which the current $I(L=Xnit, d=Y)$ flows is supplied from the attention sensor to the degradation curve estimation unit 462.

In addition, Xnit of the current $I(L=Xnit, d=Y)$ is a value that is previously determined for each attention sensor. However, Y of the current $I(L=Xnit, d=Y)$ is a value that changes according to the internal temperature d=Y of the display unit 422.

In step S243, the degradation curve estimation unit 462 calculates the inclination $\alpha(t, I(L=Xnit, d=Y))$, on the basis of the value $I(L=Xnit, d=Y)$ of the current previously held in the built-in memory not illustrated in the drawings and the brightness $L(t, I(L=Xnit, d=Y))$ from the attention sensor.

That is, for example, the degradation curve estimation unit 462 calculates the inclination $\alpha(t, I(L=200 \text{ nit}, d=Y))'$ for the time t, by a formula $\alpha(t, I(L=200 \text{ nit}, d=Y))'=L(t, I(L=200 \text{ nit}, d=Y))/I(L=200 \text{ nit}, d=Y)$ derived on the basis of the formula 4, on the basis of the value $I(L=200 \text{ nit}, d=Y)$ of the current previously held in a built-in memory not illustrated in the drawings and the measurement result $L(t, I(L=200 \text{ nit}, d=Y))$ from the brightness sensor 25b.

In step S244, the degradation curve estimation unit 462 calculates the acceleration coefficient multiplied with the brightness degradation basis curve, on the basis of the calculated inclination $\alpha(t, I(L=Xnit, d=Y))'$ and the brightness degradation basis curve previously held in the built-in memory not illustrated in the drawings.

That is, for example, the degradation curve estimation unit 462 calculates a time $\Delta t1'$ until the inclination $\alpha(T, I(L=200 \text{ nit}, d=30))'$ is obtained from when the inclination $\alpha(0, I(L=200 \text{ nit}, d=30))'=\alpha$ is obtained, as illustrated in FIG. 39.

In addition, for example, the degradation curve estimation unit 462 calculates a time $\Delta t1$ until the inclination $\alpha(T, I(L=200 \text{ nit}, d=30))'$ is obtained from when the inclination $\alpha(0, I(L=200 \text{ nit}, d=30))'=\alpha$ is obtained, in the brightness degradation basis curve 141$_1$', as illustrated in FIG. 39.

In addition, the degradation curve estimation unit 462 calculates the temperature acceleration coefficient $\Delta t1'/\Delta t1$, on the basis of the calculated times $\Delta t1'$ and $\Delta t1$.

In step S245, the degradation curve estimation unit 462 estimates the brightness degradation curve, on the basis of the calculated temperature acceleration coefficient and the brightness degradation basis curve previously held in the memory not illustrated in the drawings, and supplies the brightness degradation curve to the degradation curve holding unit 104, and holds the brightness degradation curve by the degradation curve holding unit.

That is, for example, the degradation curve estimation unit 462 multiplies the calculated acceleration coefficient $\Delta t1'/\Delta t1$ with a formula $A(t, I(L=200 \text{ nit}, d=30))$ showing the brightness degradation basis curve 141$_1$'. In addition, the degradation curve estimation unit 462 supplies the brightness degradation curve 121$_1$' showing a new formula ($\Delta t1'/\Delta t1) \times A(t, I(L=200 \text{ nit}, d=30))$ obtained by the multiplication to the degradation curve holding unit 104 and holds the brightness degradation curve by the degradation curve holding unit 104, in a form of being associated with the value of the current $I(L=200 \text{ nit})$ and the temperature d=30 acquired in step S241.

In step S246, the degradation curve estimation unit 462 determines whether all of the plurality of brightness sensors 25b have been set as the attention elements and when it is determined that all of the plurality of brightness sensors 25b have not been set as the attention elements, the degradation curve estimation unit 462 returns the process to step S242.

In step S242, the degradation curve estimation unit 462 sets the brightness sensor not yet set as the attention sensor among the plurality of brightness sensors 25b as a new attention sensor and causes the process to proceed to step S243. Hereinafter, the same process is executed.

In step S246, when it is determined by the degradation curve estimation unit 462 that all of the plurality of brightness sensors 25b have been set as the attention sensor, the degradation curve estimation process of FIG. 43 ends, the process returns to step S202 of FIG. 41, and the following process is executed.

5. Fifth Embodiment

Configuration Example of Display Device 501

Figure 44:
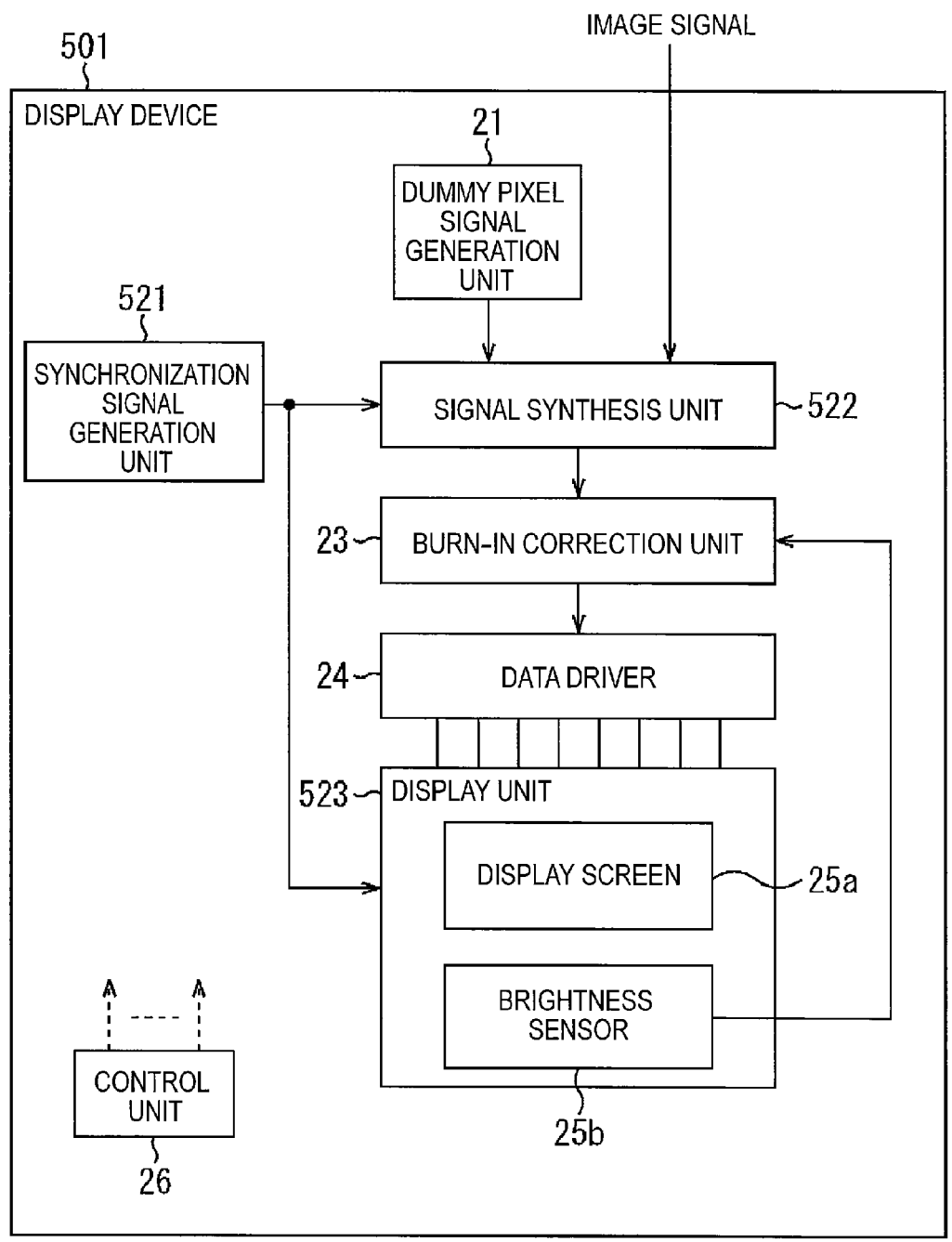
FIG. 44 is a block diagram illustrating a configuration example of a display device to be a fifth embodiment.

Next, FIG. 44 illustrates a configuration example of a display device 501 to be a fifth embodiment.

In the display device 501, portions having the same configurations as the case of the display device 1 (FIG. 1) to be the first embodiment are denoted with the same reference numerals and explanation thereof is appropriately omitted.

That is, the display device 501 has the same configuration as the case of FIG. 1, except that a synchronization signal generation unit 521 is provided and a signal synthesis unit 522 and a display unit 523 are provided, instead of the signal synthesis unit 22 and the display unit 25 of FIG. 1.

In the display screen 25a in the display device 1 of FIG. 1, a display image is displayed in synchronization with a synchronization signal. However, in FIG. 1, a synchronization signal generation unit that generates the synchronization signal is not illustrated. Meanwhile, in the display device 501 of FIG. 44, a synchronization signal generation unit 521 is illustrated for the convenience of explanation.

The synchronization signal generation unit 521 generates a synchronization signal (a horizontal synchronization signal and a vertical synchronization signal) according to control from the control unit 26 and supplies the synchronization signal to the signal synthesis unit 522 and the display unit 523.

An image signal from the outside and a dummy pixel signal from the dummy pixel signal generation unit 21 are supplied to the signal synthesis unit 522.

The signal synthesis unit 522 synthesizes the image signal from the outside and the dummy pixel signal from the dummy pixel signal generation unit 21 in synchronization with the vertical synchronization signal from the synchronization signal generation unit 521 and supplies a synthesis signal obtained as a result thereof to the burn-in correction unit 23.

Figure 45:
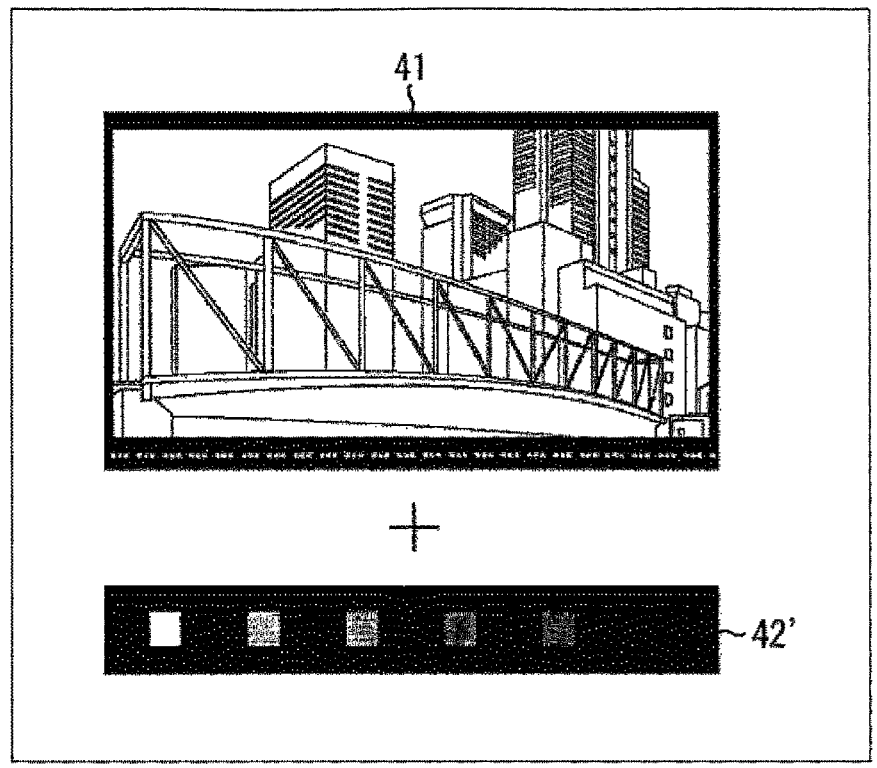
FIG. 45 is a diagram illustrating an example of a synthesis process executed by a signal synthesis unit of FIG. 44.

Next, FIG. 45 illustrates an example of a synthesis process for synthesizing the image signal and the dummy pixel signal by the signal synthesis unit 522 of FIG. 44.

At an upper side of FIG. 45, an example of a display image 41 that is displayed on the display screen 25a of the display unit 523 by light emission of the organic EL element for the display included in the display unit 523 according to the image signal is illustrated.

In addition, at a lower side of FIG. 45, an example of a dummy image 42' that is obtained by light emission of the organic EL element for the measurement included in the display unit 523 according to the dummy pixel signal is illustrated. The dummy image 42' is not displayed on the display screen 25a of the display unit 523 and is used for only measurement of the brightness by the brightness sensor 25b built in the display unit 523.

The signal synthesis unit 522 synthesizes the image signal and the dummy pixel signal, such that the dummy image 42' is arranged at the lower side of the display image 41, as illustrated in FIG. 45.

Figure 46:
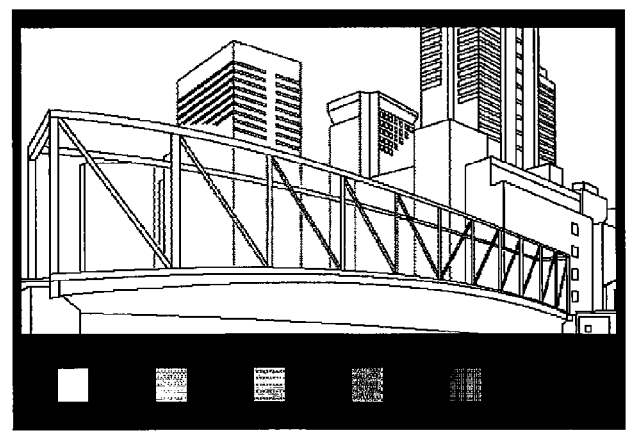
FIG. 46 is a diagram illustrating an example of a synthesis image obtained by a synthesis process.

Thereby, the signal synthesis unit 522 synthesizes the image signal and the dummy pixel signal to generate a synthesis signal showing a synthesis image 43' illustrated in FIG. 46 and supplies the synthesis signal to the burn-in correction unit 23.

In addition, the signal synthesis unit 522 may synthesize the image signal and the dummy pixel signal, such that the dummy image 42' is arranged at the upper side of the display image 41. In this case, in the display unit 523, the brightness sensor 25b is provided at the upper side of the display screen 25a.

Returning to FIG. 44, the display unit 523 has a display screen 25a and a brightness sensor 25b. In the display unit 523, a position relation of the display screen 25a and the brightness sensor 25b is different from a position relation of the case of the display unit 25 of FIG. 1. This will be described in detail with reference to FIG. 51.

In addition, the display unit 523 causes the built-in organic EL element for the display to emit light, in synchronization with the synchronization signal from the synchronization signal generation unit 521, on the basis of the image signal $S_n$ included in the synthesis signal $C_n$ from the data driver 24. Thereby, the display image 41 corresponding to the image signal $S_n$ is displayed on the display screen 25a of the display unit 523.

In addition, the display unit 523 causes the built-in organic EL element for the measurement to emit light, in synchronization with the synchronization signal from the synchronization signal generation unit 521, on the basis of the dummy pixel signal included in the synthesis signal $C_n$ from the data driver 24.

In the display unit 523, the brightness sensor 25b is provided near the pixel circuit including the organic EL element for the measurement and measures the brightness of the organic EL element included in the pixel circuit and supplies a measurement result thereof to the burn-in correction unit 23.

In addition, similar to the display unit 25 illustrated in FIG. 14, pixel circuits 184-(1, 1) to 184-(N, M) are provided in the display unit 523.

In the display unit 25 of FIG. 14, organic EL elements that are included in the pixel circuit 184-(1, M), the pixel circuit 184-(2, M), . . . , and the pixel circuit 184-(N, M) are the organic EL elements for the measurement.

Meanwhile, in the display unit 523, the organic EL elements included in the pixel circuit 184-(N, 1), the pixel circuit 184-(N, 2), . . . , and the pixel circuit 184-(N, M) among the pixel circuits 184-(1, 1) to 184-(N, M) built in the display unit 523 are the organic EL elements for the measurement. This point is different from the display unit 25.

In the display unit 523, a brightness sensor $25b_1$, a brightness sensor $25b_2$, . . . , and a brightness sensor 25b are provided near the organic EL elements included in the pixel circuit 184-(N, 2), . . . , and the pixel circuit 184-(N, M).

Figure 47:
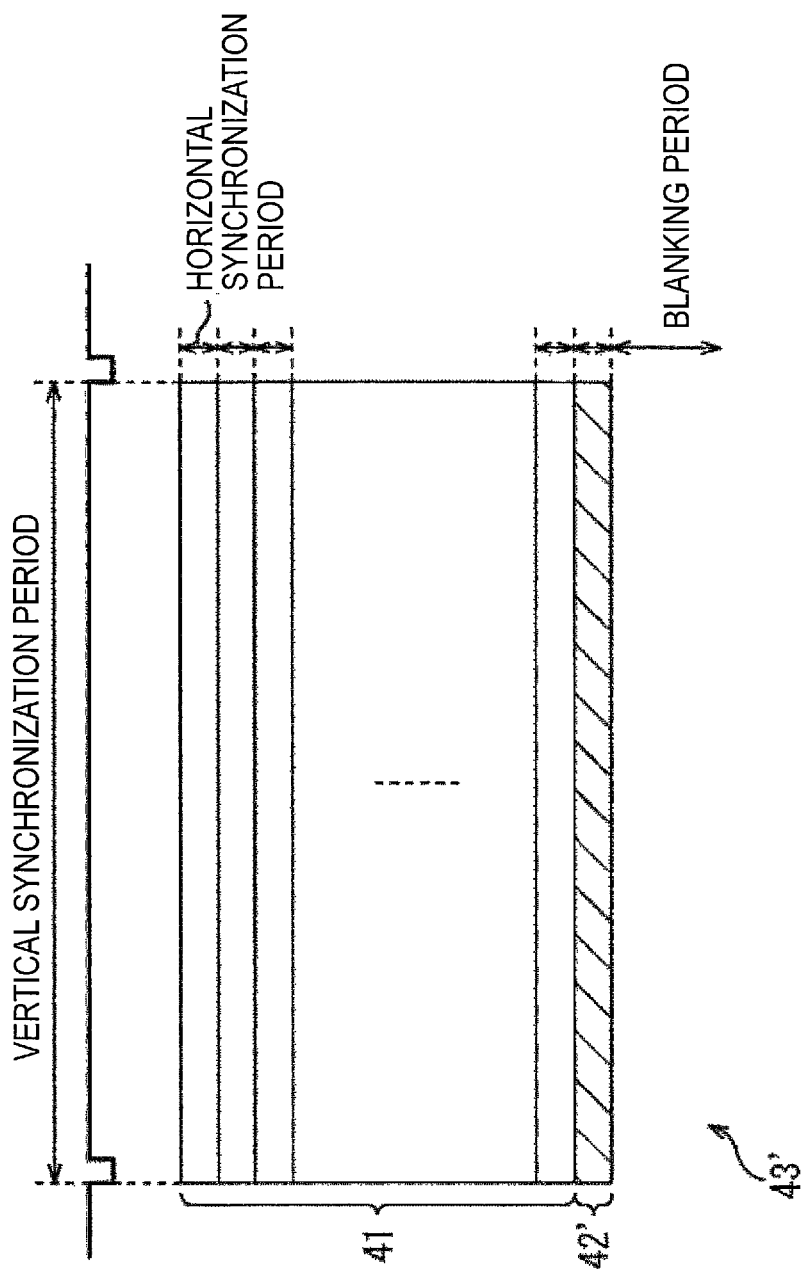
FIG. 47 is a diagram illustrating an example of an aspect of causing an organic EL element to emit light.

Next, FIG. 47 illustrates an example of an aspect where the display unit 523 causes the organic EL element for the display and the organic EL element for the measurement to emit light, in synchronization with the synchronization signal from the synchronization signal generation unit 521.

In FIG. 47, a vertical synchronization period to be a period until display of the next synthesis image 43' starts from when display of the synthesis image 43' starts is illustrated at an upper side. The vertical synchronization period shows a period until a next falling edge is generated from when a falling edge is generated, in the vertical synchronization signal output from the synchronization signal generation unit 22.

In addition, the vertical synchronization period includes a plurality of horizontal synchronization periods and a blanking period, as illustrated in FIG. 47.

The horizontal synchronization period shows a period until a next falling edge is generated from when a falling edge is generated, in the horizontal synchronization signal output from the synchronization signal generation unit 521. In addition, the horizontal synchronization period is a period in which the organic EL element corresponding to each line configuring the synthesis image 43' is caused to emit light.

The display unit 523 causes the organic EL element for the display and the organic EL element for the measurement to emit light in a predetermined vertical synchronization period, on the basis of the synthesis signal $C_n$ supplied from the data driver 24, in synchronization with the vertical synchronization signal and the horizontal synchronization signal from the synchronization signal generation unit 521.

That is, for example, the display unit 523 starts display of each line configuring the synthesis image 43, whenever a falling edge is generated in the horizontal synchronization signal, in synchronization with the horizontal synchronization signal from the synchronization signal generation unit 22, in the vertical synchronization period.

Figure 48:
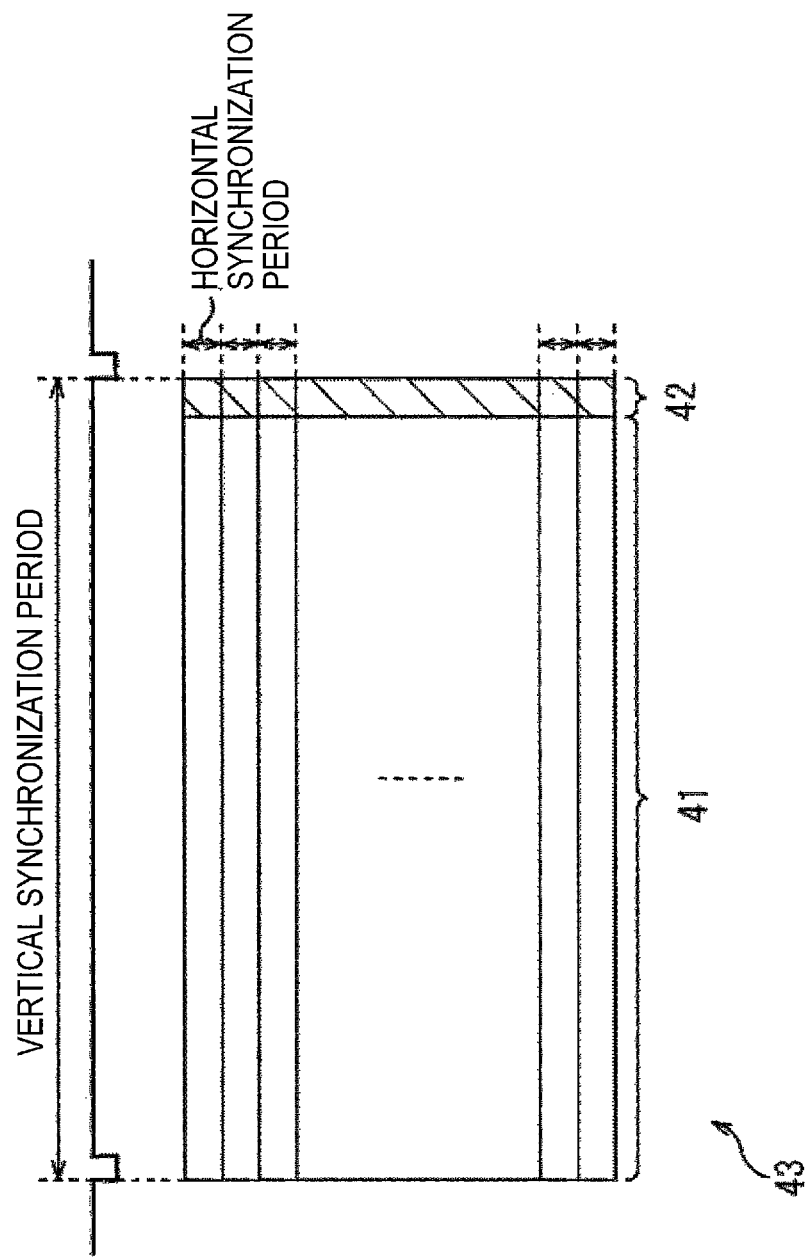
FIG. 48 is another diagram illustrating an example of an aspect of causing an organic EL element to emit light.

Thereby, as illustrated in FIG. 48, each line configuring the display image 41 is displayed on the display screen 25a in raster scan order from the upper side, whenever the falling edge is generated in the horizontal synchronization signal, in the vertical synchronization period.

In addition, in the vertical synchronization period, after the display image 41 is displayed on the display screen 25a, when the falling edge is generated in the horizontal synchronization signal, the organic EL element for the measurement that emits light as the dummy image 42' is caused to emit light.

Then, in the vertical synchronization period, the plurality of horizontal synchronization periods to cause the organic EL element for the display and the organic EL element for the measurement to emit light end and the blanking period starts. After the blanking period ends, a next vertical synchronization period comes and the same process is repeated hereinafter.

In the blanking period, the synthesis signal corresponding to the synthesis image 43 used in a next vertical synchronization period is generated by the synthesis executed by the signal synthesis unit 522. In addition, in the blanking period, the synthesis signal generated by the signal synthesis unit 522 is corrected by the burn-in correction unit 23, the AD conversion is executed on the synthesis signal after the correction by the data driver 24, and the synthesis signal is supplied to the display unit 523.

In the display unit 523, the above-described process is executed using the synthesis signal after the AD conversion supplied from the data driver 24, in the next vertical synchronization period.

The signal synthesis unit 522 executes a synthesis process for coupling the dummy image 42' to the lower side of the display image 41, in the blanking period. That is, the signal synthesis unit 522 may execute the synthesis process for each vertical synchronization period.

Meanwhile, when the synthesis process for coupling the dummy image 52 to the right side of the display image 41 is executed like the signal synthesis unit 22, it is necessary to execute the synthesis process for coupling (a part of) the dummy image 42' displayed in a next horizontal synchronization period, for each horizontal synchronization period.

Next, FIG. 48 illustrates an example of an aspect where the display unit 25 of FIG. 1 causes the organic EL element for the display and the organic EL element for the measurement to emit light, in synchronization with the synchronization signal from the synchronization signal generation unit not illustrated in the drawings.

In FIG. 48, a vertical synchronization period to be a period until display of the next synthesis image 43 starts from when display of the synthesis image 43 starts is illustrated at an upper side. The vertical synchronization period shows a period until a next falling edge is generated from when a falling edge is generated, in the vertical synchronization signal output from the synchronization signal generation unit not illustrated in the drawings.

In addition, the vertical synchronization period includes a plurality of horizontal synchronization periods, as illustrated in FIG. 48. In FIG. 48, the blanking period may be set in the vertical synchronization period.

The display unit 25 causes the organic EL element for the display and the organic EL element for the measurement to emit light in a predetermined vertical synchronization period, on the basis of the synthesis signal $C_n$ supplied from the data driver 24, in synchronization with the vertical synchronization signal from the synchronization signal generation unit not illustrated in the drawings.

That is, for example, the display unit 523 starts display of each line configuring the synthesis image 43, whenever a falling edge is generated in the horizontal synchronization signal, in synchronization with the horizontal synchronization signal from the synchronization signal generation unit 22, in the vertical synchronization period.

Thereby, as illustrated in FIG. 48, each line configuring the display image 41 is displayed on the display screen 25a in raster scan order from the upper side, whenever the falling edge is generated in the horizontal synchronization signal, in the vertical synchronization period.

In addition, in the vertical synchronization period, the organic EL element for the measurement that emits light as a part as the dummy image 42' is caused to emit light, whenever the falling edge is generated in the horizontal synchronization signal.

Then, after the vertical synchronization period ends, the same process is repeated in a next vertical synchronization period.

In this case, the signal synthesis unit 22 needs to execute the synthesis process for coupling the part of the dummy image 42, which corresponds to the organic EL element for the measurement caused to emit light in a next horizontal synchronization period, for each horizontal synchronization period.

Meanwhile, in the signal synthesis unit 522, because the synthesis process may be executed for each vertical synchronization period, load by the process can be alleviated.

Figure 49:
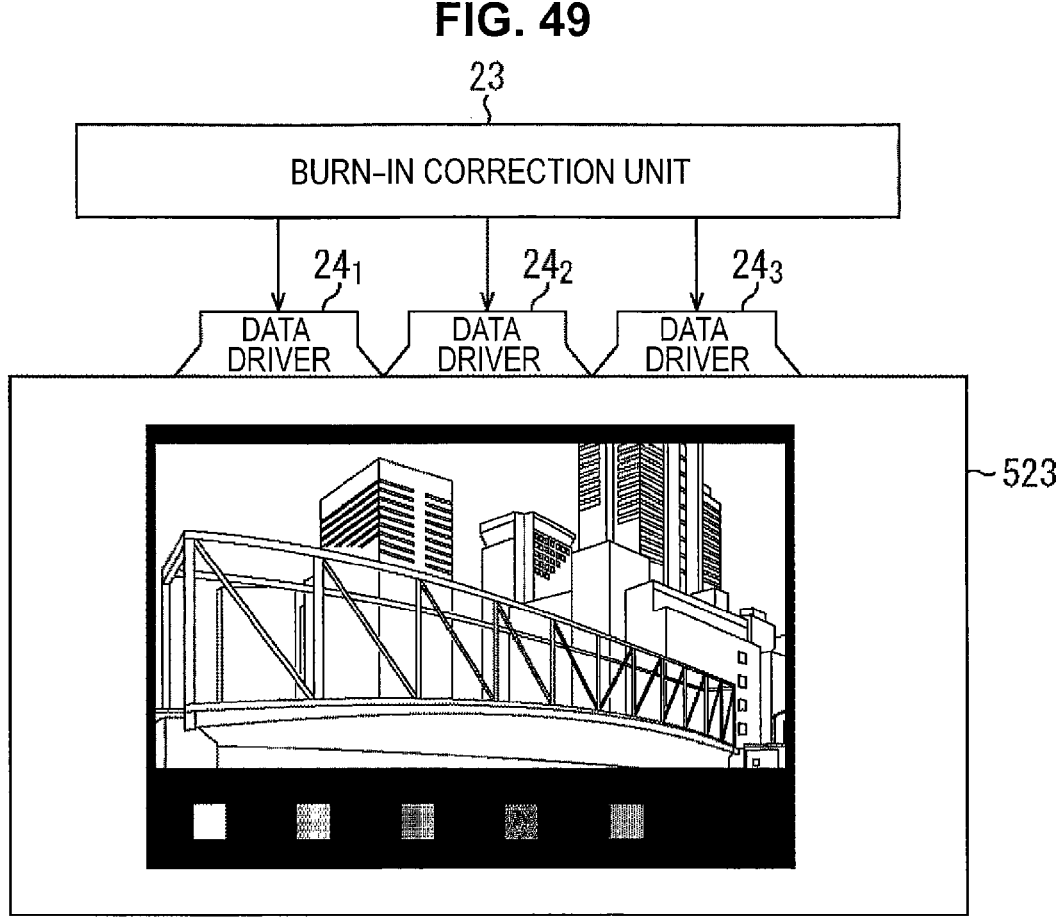
FIG. 49 is a diagram illustrating an example of the case in which three data drivers are provided.

In addition, because the signal synthesis unit 522 couples the dummy image 42' to the lower side of the display image 41, data drivers $24_1$ to $24_3$ for the display image 41 can be used, as illustrated in FIG. 49.

That is, the dummy pixel signal can be supplied using a video signal line to supply an image signal from the data driver 24 to the display unit 523.

FIG. 49 illustrates an example of the case in which the three data drivers 241 to $24_3$ are provided as the data driver 24 for the display image 41.

Figure 50:
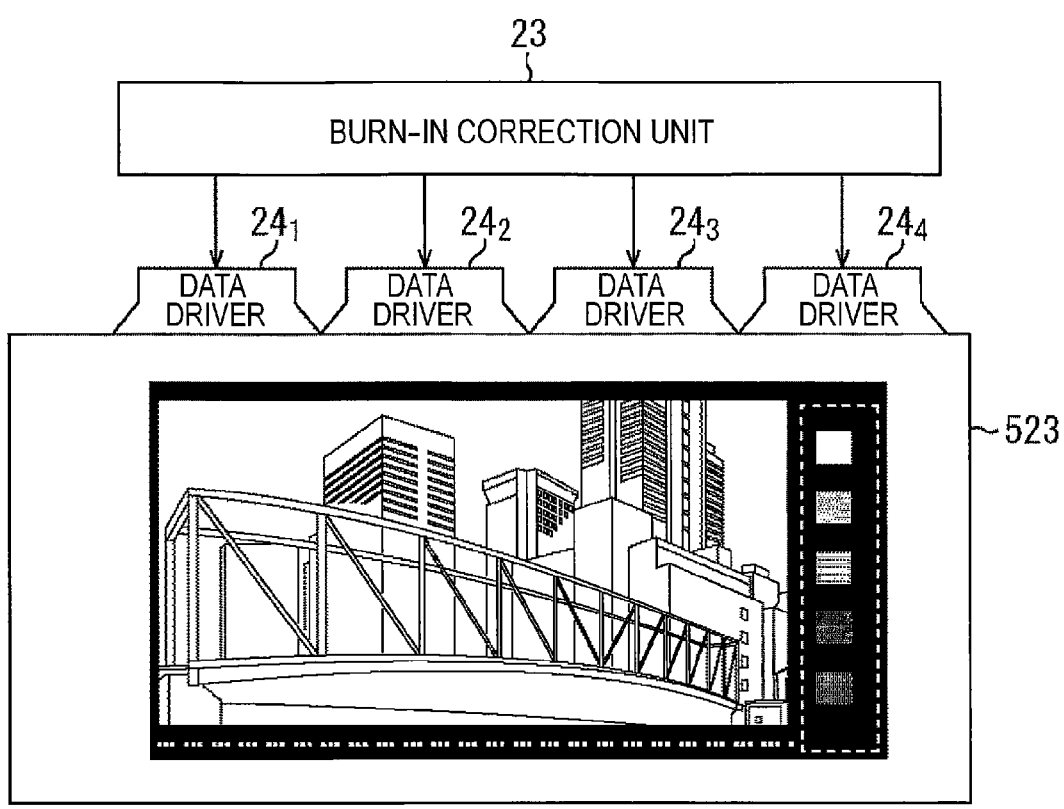
FIG. 50 is a diagram illustrating an example of the case in which four data drivers are provided.

Meanwhile, when the dummy image 42 is coupled to the right side of the display image 41 is executed like the signal synthesis unit 22, it is necessary to newly provide a data driver $24_4$ for the dummy image 42, as illustrated in FIG. 50. That is, it is necessary to newly provide a video signal line to supply a dummy pixel signal from the data driver 24 to the display unit 523.

Therefore, in the display device 501, because the data driver $24_4$ for the dummy image 42 does not need to be newly provided as the data driver 24, a manufacturing cost of the display device 501 can be suppressed low.

[Exterior Example of Display Unit 523]

Figure 51:
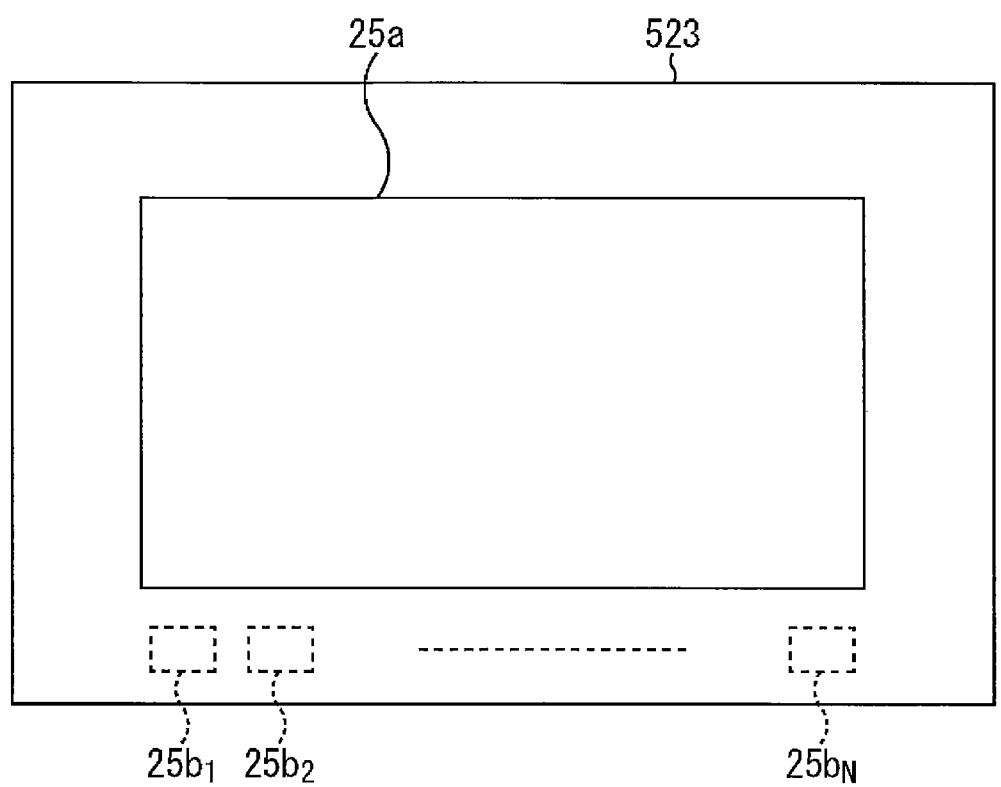
FIG. 51 is a front view of a display unit of FIG. 44.

Next, FIG. 51 illustrates a front view of the display unit 523 of FIG. 44.

The display unit 523 is made of a three-dimensional casing with a rectangular shape and a horizontal selector 181, a write scanner 182, a power supply scanner 183, and a plurality of pixel circuits 184-(1, 1) to 184-(N, M) are built in the casing, similar to the display unit 25 of FIG. 14.

In addition, in the display unit 523, a display screen 25a is provided at the center of the casing, as illustrated in FIG. 51. In addition, in the display unit 523, a plurality of brightness sensors $25b_1$ to $25b_N$ are arranged at the lower side of the display screen 25a in a form of being built in the casing.

The plurality of brightness sensors $25b_1$, $25b_2$, ..., and $25b_N$ are provided near the pixel circuits 184-(N, 1), 184-(N, 2), ..., and 184-(N, M) provided in the casing of the display unit 523.

The plurality of brightness sensors $25b_1$, $25b_2$, ..., and $25b_N$ measure the brightness of the organic EL elements included in the pixel circuits 184-(N, 1), 184-(N, 2), ..., and 184-(N, M).

That is, the display unit 523 has the same configuration as the display unit 25, except that the brightness sensors $25b_1$ to $25b_N$ are provided near the pixel circuits 184-(N, 1), 184-(N, 2), ..., and 184-(N, M) provided in the casing of the display unit 523, instead of the brightness sensors $25b_1$, $25b_2$, ..., and $25b_M$ illustrated in FIG. 14.

[Explanation of Operation of Display Device 501]

Figure 52:
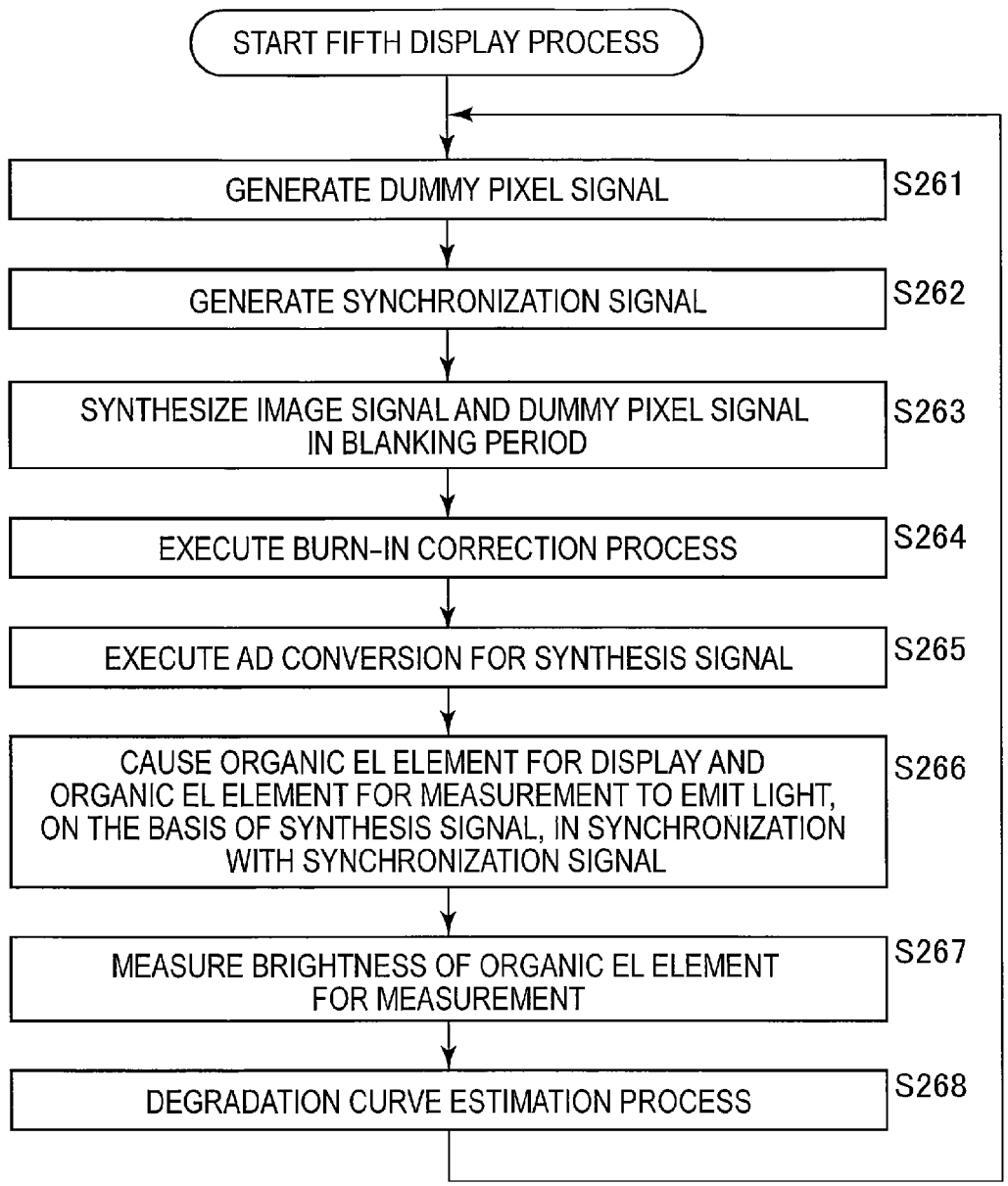
FIG. 52 is a flowchart illustrating a display process executed by a display device of FIG. 44.

Next, FIG. 52 illustrates a display process (hereinafter, referred to as a fifth display process) executed by the display device 501 of FIG. 44.

The fifth display process starts when the power supply of the display device 501 is turned on.

In step S261, the dummy pixel signal generation unit 21 executes the same process as step S1 of FIG. 18. That is, for example, the dummy pixel signal generation unit 21 generates the dummy pixel signal to cause the organic EL element for the measurement built in the display unit 523 to emit light and supplies the dummy pixel signal to the signal synthesis unit 522.

In step S262, the synchronization signal generation unit 521 generates a synchronization signal (a horizontal synchronization signal and a vertical synchronization signal) according to control from the control unit 26 and supplies the synchronization signal to the signal synthesis unit 522 and the display unit 523.

In step S263, the signal synthesis unit 522 synthesizes the image signal and the dummy pixel signal, such that a dummy image 42' is arranged at the lower side of the display image 41, in the blanking period, on the basis of the synchronization signal from the synchronization signal generation unit 521.

In addition, the signal synthesis unit 522 supplies a synthesis signal $C_n$ obtained by the synthesis to the burn-in correction unit 23.

In step S264, the burn-in correction unit 23 executes the burn-in correction process described in steps S3 to S7 of FIG. 18, for the image signal $S_n$ included in the synthesis signal $C_n$ from the signal synthesis unit 522. In addition, the burn-in correction unit 23 supplies the synthesis signal $C_n$ including the image signal $S_n$ after the burn-in correction process to the data driver 24.

In step S265, the data driver 24 executes the same process as step S8 of FIG. 18. That is, for example, the data driver 24 executes AD conversion for the synthesis signal $C_n$ from the burn-in correction unit 23 and supplies the synthesis signal $C_n$ after the AD conversion to the display unit 523.

In step S266, the display unit 523 causes the organic EL element for the display and the organic EL element for the measurement to emit light in a predetermined vertical synchronization period, on the basis of the synthesis signal $C_n$ supplied from the data driver 24, in synchronization with the vertical synchronization signal and the horizontal synchronization signal from the synchronization signal generation unit 521.

That is, for example, the display unit 523 starts display of each line configuring the synthesis image 43, whenever a falling edge is generated in the horizontal synchronization signal, in synchronization with the horizontal synchronization signal from the synchronization signal generation unit 22, in the vertical synchronization period.

Thereby, as illustrated in FIG. 48, each line configuring the display image 41 is displayed on the display screen 25a in raster scan order from the upper side, whenever the falling edge is generated in the horizontal synchronization signal, in the vertical synchronization period.

In addition, in the vertical synchronization period, after the display image 41 is displayed on the display screen 25a, when the falling edge is generated in the horizontal synchronization signal, the organic EL element for the measurement that emits light as the dummy image 42' is caused to emit light.

In steps S267 and S268, the same processes as steps S10 and S11 of FIG. 18 are executed. After step S268 ends, the process returns to step S261 and the same process is executed hereinafter.

The fifth display process ends when the power supply of the display device 501 is turned off.

As described above, according to the fifth display process, because the organic EL element for the measurement is arranged at the upper side or the lower side of the organic EL element for the display, the synthesis process may be executed for each vertical synchronization period. Therefore, load by the synthesis process can be alleviated.

That is, for example, in the case in which the synthesis process is executed for each vertical synchronization period, the synthesis process may be executed with a period of about $\frac{1}{1000}$, as compared with the case in which the synthesis process is executed for each horizontal synchronization period. Therefore, load by the synthesis process can be alleviated.

In addition, because a signal driver for the dummy pixel signal does not need to be newly provided, a manufacturing cost of the display device 501 can be saved.

6. Modification

Figure 53:
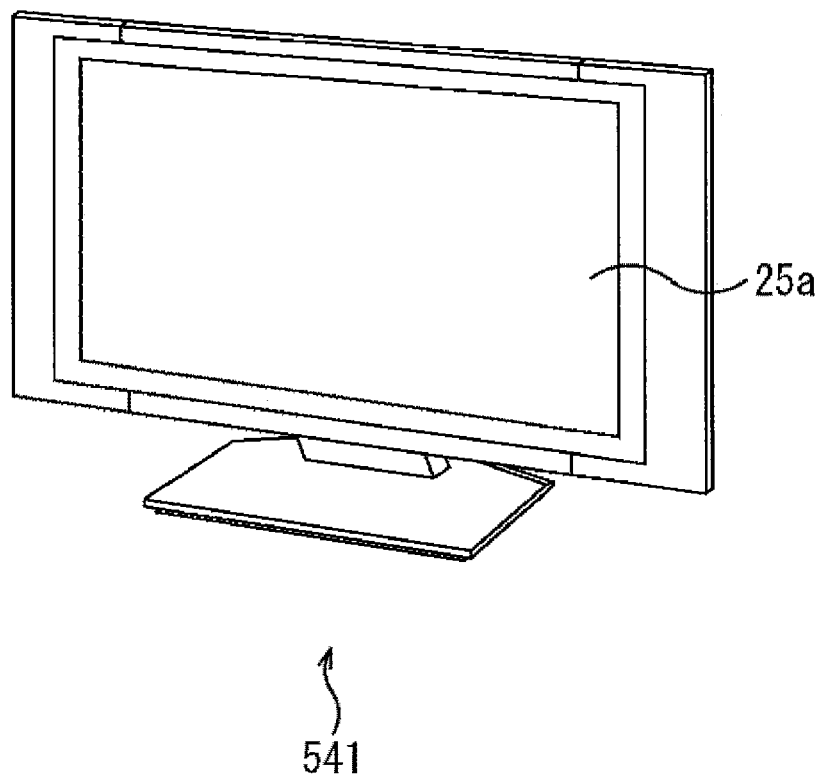
FIG. 53 is a diagram illustrating an example of a television receiver.

In the first embodiment described above, the case in which the present invention is applied to the display device 1 has been described. However, the present invention can be applied to a television receiver 541 in which the display device 1 is built as a module, as illustrated in FIG. 53.

The television receiver 541 has the display device 1 is built therein such that the display screen 25a of the display device 1 is exposed.

In addition, the present invention can be applied to an electronic apparatus such as a personal computer, a mobile phone, and a video camera in which the display device 1 is built such that the display screen 25a of the display device 1 is exposed, in addition to the television receiver 541.

In addition, in the second to fifth embodiments, the present invention can be applied to the electronic apparatus, similar to the first embodiment.

The configuration of the display device has been described by the first to fifth embodiments. However, any combination of the configurations described in the first to fifth embodiments may be adopted as the configuration of the display device.

Additionally, the present technology may also be configured as below.

(1)

A signal processing device including:
a signal synthesis unit that generates a first synthesis signal configured from an image signal to cause a first light emitting element used for displaying an image to emit light and a dummy pixel signal to cause a second light emitting element used for measuring brightness to emit light;
a conversion unit that converts the generated first synthesis signal into a second synthesis signal to cause only the first light emitting element of the first light emitting element and the second light emitting element to emit light at identical brightness, regardless of a degradation degree of the first light emitting element; and
a light emission control unit that causes the first light emitting element and the second light emitting element to emit light, on a basis of the second synthesis signal.

(2)

The signal processing device according to (1),
wherein the conversion unit converts the first synthesis signal into the second synthesis signal, on a basis of a measurement result of brightness by a measurement unit to measure brightness of the second light emitting element.

(3)

The signal processing device according to (1) or (2),
wherein the conversion unit corrects the image signal included in the first synthesis signal to an image signal to cause the first light emitting element to emit light at identical brightness, regardless of the degradation degree of the first light emitting element, and converts the first synthesis signal into the second synthesis signal including the image signal after correction.

(4)

The signal processing device according to (3),
wherein the conversion unit further corrects the dummy pixel signal included in the first synthesis signal to an identical dummy pixel signal with the dummy pixel signal included in the first synthesis signal, and converts the first synthesis signal into the second synthesis signal.

(5)

The signal processing device according to any one of (2) to (4), further including:

a display unit that includes a display screen to display an image and has the first light emitting element, the second light emitting element, and the measurement unit built therein, wherein the light emission control unit causes the first light emitting element to emit light, on a basis of the image signal included in the second synthesis signal, and displays an image on the display screen, and the light emission control unit causes the second light emitting element to emit light, on a basis of the dummy pixel signal included in the second synthesis signal, and causes the measurement unit to measure brightness.

Incidentally, the above mentioned series of processes can, for example, be executed by hardware, or can be executed by software. In the case where the series of processes is executed by software, a program configuring this software is installed in a computer from a medium recording a program. Here, examples of the computer include a computer incorporated into specialized hardware, and a general-purpose personal computer which is capable of executing various functions by installing various programs.

Figure 54:
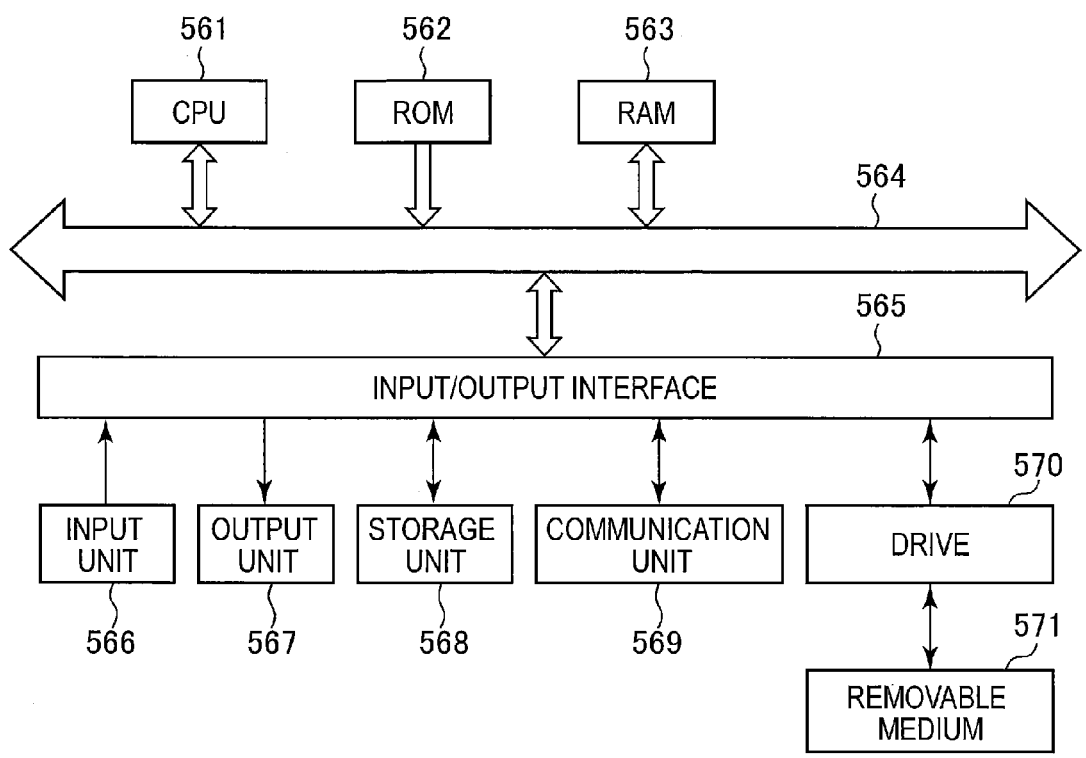
FIG. 54 is a block diagram illustrating a configuration example of a computer.

The series of processes can be executed by a dedicated circuit configured from an application specific integrated circuit (ASIC) or a programmable LSI such as a field programmable gate array (FPGA), in addition to the computer illustrated in FIG. 54.

A CPU (Central Processing Unit) 561 executes various processing according to programs stored in a ROM (Read Only Memory) 562 or a storage unit 568. The RAM (Random Access Memory) 563 appropriately stores the programs executed by the CPU 561, data, and the like. The CPU 561, the ROM 562, and the RAM 563 are connected to each other through a bus 564.

In addition, an input/output interface 565 is connected to the CPU 561 through the bus 564. An input unit 566 and output unit 567 are connected to the input/output interface 565, the input unit 566 including a keyboard, a mouse, a microphone, and the like, the output unit 567 including a display, a speaker, and the like. The CPU 561 executes various processing in accordance with respective instructions input from the input unit 566. Then, the CPU 561 outputs the processing result to the output unit 567.

The storage unit 568 connected to the input/output interface 565 includes, for example, a hard disk, and stores the programs to be executed by the CPU 561 and various data. A communication unit 569 communicates with an external apparatus through a network such as the Internet or a local area network.

In addition, programs may be acquired through the communication unit 569 and stored in the storage unit 568.

A drive 570 is connected to the input/output interface 565. When a removable medium 571 such as a magnetic disk, an optical disk, a magnetic-optical disk, or a semiconductor memory is loaded onto the drive 570, the drive 570 drives the removable medium 411 and acquires programs, data, and the like stored in the removable medium 571. The acquired programs and data are transferred to the storage unit 568 as necessary, and are stored in the storage unit 568.

The recording medium that records (stores) the program to be installed in the computer and made executable by the computer includes: the removable medium 571 which is a package medium including a magnetic disk (including a flexible disk), an optical disk (including a CD-ROM (Compact Disc-Read Only Memory), and a DVD (Digital Versatile Disc)), a magnetic-optical disk (including an MD (Mini-Disc)), a semiconductor memory, and the like; the ROM 562 that temporarily or permanently stores the programs; the hard disk forming the storage unit 568; and the like, as illustrated in FIG. 54. The program is recorded in the recording medium as necessary through the communication unit 569 which is an interface such as a router or a modem, by utilizing a wired or wireless communication medium such as a local area network, the Internet, or digital satellite broadcast.

In the present disclosure, steps of describing the above series of processes may include processing performed in time-series according to the description order and processing not processed in time-series but performed in parallel or individually.

The present disclosure is not limited to any of the first to fifth embodiments described above, and various changes and modifications may be made without departing from the scope of the disclosure.

REFERENCE SIGNS LIST

1 display device
21 dummy pixel signal generation unit
22 signal synthesis unit
23 burn-in correction unit
24, 24$_n$ data driver
25 display unit
25$a$ display screen
25$b$, 25$b_1$ to 25$b_M$ brightness sensor
25$c$ temperature sensor
26 control unit
71 inclination correction unit
72 gradation correction unit
73 detection unit
74 holding unit
101 correction amount generation unit
102 correction amount multiplication unit
103 inclination holding unit
104 degradation curve holding unit
105 degradation curve estimation unit
161 offset amount calculation unit
162 offset correction unit
181 horizontal selector
182 write scanner
183 power supply scanner
184-(1, 1) to 184-(N, M) pixel circuit
201 sampling transistor
202 driving transistor
203 storage capacitor
204 light emitting element
205 wiring line
241 display device
261 burn-in correction unit
281 inclination correction unit
282 gradation correction unit
283 detection unit
284 holding unit
301 correction amount generation unit
321 offset amount calculation unit
322 offset correction unit
341 display device
361 gamma conversion unit
362 image processing unit 363 burn-in correction unit
381 inverse gamma conversion unit
382 gradation correction unit
391 offset amount calculation unit
392 offset correction unit
401 display device
421 burn-in correction unit
422 display unit
441 inclination correction unit
442 gradation correction unit
443 detection unit
444 holding unit
461 correction amount generation unit
462 degradation curve estimation unit
501 display device
521 synchronization signal generation unit
522 signal synthesis unit
523 display unit
541 television receiver

The invention claimed is:

1. A signal processing device comprising:
a processor; and
a memory storing program code executable by the processor to perform operations comprising:
synthesizing an image signal to cause a first light emitting element used for displaying an image to emit light with a dummy pixel signal to cause second light emitting elements used for measuring brightness to emit light, thereby to generate a single first synthesis signal;
converting the generated first synthesis signal into a second synthesis signal to cause the first light emitting element to emit light at a predetermined brightness regardless of a degradation degree of the first light emitting element; and
causing the first light emitting element and the second light emitting elements to emit light, on a basis of the second synthesis signal, wherein
the second light emitting elements are respectively supplied with different currents and respectively emit light at different brightness, and
converting the first synthesis signal into the second synthesis signal is on a basis of a measurement result of brightness by a sensor configured to measure brightness of the second light emitting elements.

2. The signal processing device according to claim 1, wherein converting the generated first synthesis signal comprises correcting the image signal included in the first synthesis signal to an image signal to cause the first light emitting element to emit light at the predetermined brightness, regardless of the degradation degree of the first light emitting element, and converting the first synthesis signal into the second synthesis signal including the image signal after the correction.

3. The signal processing device according to claim 2, wherein the converting the generated first synthesis signal comprises further correcting the dummy pixel signal included in the first synthesis signal to an identical dummy pixel signal with the dummy pixel signal included in the first synthesis signal, and converting the first synthesis signal into the second synthesis signal.

4. The signal processing device according to claim 1, the operations further comprising:
displaying an image by a display screen that has the first light emitting element, the second light emitting elements, and the sensor built therein,
wherein the causes the first light emitting element to emit light is on a basis of the image signal included in the second synthesis signal, and displays an image on the display screen, and
the causes the second light emitting elements to emit light is on a basis of the dummy pixel signal included in the second synthesis signal, and causes the sensor to measure brightness.

5. A signal processing method of a signal processing device to process a signal, the signal processing method comprising:
synthesizing an image signal to cause a first light emitting element used for displaying an image to emit light with a dummy pixel signal to cause second light emitting elements used for measuring brightness to emit light, thereby generating a single first synthesis signal, by the signal processing device;
converting the generated first synthesis signal into a second synthesis signal to cause the first light emitting element to emit light at a predetermined brightness, regardless of a degradation degree of the first light emitting element, by the signal processing device; and
causing the first light emitting element and the second light emitting elements to emit light, on a basis of the second synthesis signal, by the signal processing device,
wherein
the second light emitting elements are respectively supplied with different currents and respectively emit light at different brightness, and
the converting comprises converting the first synthesis signal into the second synthesis signal, on a basis of a measurement result of brightness by a measurement unit to measure brightness of each of the second light emitting elements.

6. A non-transitory computer-readable storage medium having stored thereon a program executable by a computer to perform operations comprising:
synthesizing an image signal to cause a first light emitting element used for displaying an image to emit light with a dummy pixel signal to cause second light emitting elements used for measuring brightness to emit light, thereby generating a single first synthesis signal;
converting the generated first synthesis signal into a second synthesis signal to cause the first light emitting element to emit light at a predetermined brightness, regardless of a degradation degree of the first light emitting element; and
causing the first light emitting element and the second light emitting elements to emit light, on a basis of the second synthesis signal,
wherein
the second light emitting elements are respectively supplied with different currents and respectively emit light at different brightness, and
the converting comprises converting the first synthesis signal into the second synthesis signal, on a basis of a measurement result of brightness by a measurement unit to measure brightness of each of the second light emitting elements.

7. An electronic apparatus that has a signal processing device to process a signal built therein,
wherein the signal processing device includes a processor and a memory storing program code executable by the processor to perform operations comprising:
synthesizing an image signal to cause a first light emitting element used for displaying an image to emit light with a dummy pixel signal to cause second light emitting elements used for measuring brightness to emit light, thereby to generate a single first synthesis signal, converting the generated first synthesis signal into a second synthesis signal to cause the first light emitting element to emit light at a predetermined brightness, regardless of a degradation degree of the first light emitting element, and causing the first light emitting element and the second light emitting elements to emit light, on a basis of the second synthesis signal, wherein the second light emitting elements are respectively supplied with different currents and respectively emit light at different brightness, and converting the first synthesis signal into the second synthesis signal is on a basis of a measurement result of brightness by a sensor configured to measure brightness of each of the second light emitting elements.

8. A signal processing device comprising:

a processor; and a memory storing program code executable by the processor to perform operations comprising:

synthesizing an image signal to cause a first light emitting element used for displaying an image to emit light with a dummy pixel signal to cause second light emitting elements used for measuring brightness to emit light to generate a single first synthesis signal;

converting the generated first synthesis signal into a second synthesis signal to increase an amount of a current flowing to the first light emitting element according to a light emission time of the first light emitting element; and causing the first light emitting element and the second light emitting elements to emit light, on a basis of the second synthesis signal wherein the second light emitting elements are respectively supplied with different current and respectively emit light at different brightness, and converting the first synthesis signal into the second synthesis signal is on a basis of a measurement result of brightness by a sensor configured to measure brightness of each of the second light emitting elements.

* * * * *